(12) United States Patent
Tasher et al.

(10) Patent No.: US 8,330,743 B2
(45) Date of Patent: *Dec. 11, 2012

(54) POWER EFFICIENT CAPACITIVE DETECTION

(75) Inventors: Nir Tasher, Tel Mond (IL); Yehezkel Friedman, Ramat Hasharon (IL); Einat Nosovitsky, Hod Hasharon (IL); Mark Lukoyanichev, Yokneam Elite (IL); Vladlmir Abramov, Rosh Ha'ayin (IL)

(73) Assignee: Nuvoton Technology Corporation, Hsinchu Science Park (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/397,496

(22) Filed: Feb. 15, 2012

(65) Prior Publication Data

US 2012/0150467 A1   Jun. 14, 2012

Related U.S. Application Data

(60) Division of application No. 12/853,570, filed on Aug. 10, 2010, now Pat. No. 8,169,419, which is a continuation of application No. 11/889,435, filed on Aug. 13, 2007, now Pat. No. 7,797,115.

(51) Int. Cl.
*G06F 3/045* (2006.01)
(52) U.S. Cl. .......................... 345/174; 702/57
(58) Field of Classification Search .................. 345/156, 345/173; 341/20, 22, 23; 178/18.01–18.06; 702/57; 324/658, 679; 377/19, 20
See application file for complete search history.

(56) References Cited

U.S. PATENT DOCUMENTS

| | | |
|---|---|---|
| 2,414,107 A | 1/1947 | Kenyon |
| 2,831,162 A | 4/1958 | Gross |
| 3,453,535 A | 7/1969 | Anglin |
| 3,761,805 A | 9/1973 | Dornberger |
| 4,103,252 A | 7/1978 | Bobick |
| 4,243,933 A | 1/1981 | Rollman |
| 4,455,452 A | 6/1984 | Schuyler |
| 4,550,221 A | 10/1985 | Mabusth |
| 4,639,720 A | 1/1987 | Rympalski et al. |
| 4,651,133 A | 3/1987 | Ganesan |
| 4,733,222 A | 3/1988 | Evans |
| 4,825,147 A | 4/1989 | Cook et al. |
| 4,939,382 A | 7/1990 | Gruodis |
| 5,016,008 A | 5/1991 | Gruaz et al. |
| 5,329,239 A | 7/1994 | Kindermann et al. |
| 5,495,077 A | 2/1996 | Miller et al. |
| 5,790,106 A | 8/1998 | Hirano et al. |
| 5,854,625 A | 12/1998 | Frisch et al. |
| 6,191,723 B1 | 2/2001 | Lewis |
| 7,737,957 B2 | 6/2010 | Lee et al. |

(Continued)

FOREIGN PATENT DOCUMENTS

| CN | 1945387 B | 7/2010 |
|---|---|---|
| JP | A-2007-163237 | 6/2007 |

OTHER PUBLICATIONS

Baxter, L. K., "Capacitive Sensors," retrieved from URL:http://www.capsense.com/capsense-wp.pdf, pp. 1-17 (2000).

(Continued)

*Primary Examiner* — Ricardo L Osorio
(74) *Attorney, Agent, or Firm* — Oliff & Berridge, PLC

(57) ABSTRACT

Capacitive detection systems, modules, and methods. In one embodiment, a power saving mode is implemented when deemed appropriate, based on an analysis of previous detection or non-detection of the presence and/or position of an object near a capacitive sensing area.

27 Claims, 19 Drawing Sheets

U.S. PATENT DOCUMENTS

| | | |
|---|---|---|
| 2003/0074587 A1 | 4/2003 | Casebolt et al. |
| 2004/0178997 A1 | 9/2004 | Gillespie et al. |
| 2005/0024065 A1 | 2/2005 | Umeda et al. |
| 2005/0141263 A1 | 6/2005 | Umeda et al. |
| 2008/0165134 A1 | 7/2008 | Krah |
| 2009/0045822 A1 | 2/2009 | Nosovitsky et al. |
| 2009/0045823 A1 | 2/2009 | Tasher et al. |

OTHER PUBLICATIONS

Van Ess, D., "Capacitive Touch Switches Boost Automotive Interface Options," *Planet Analog*, retrieved from URL:http://www.planetanalog.com/showArticle.jhtml?articleID=180201397, pp. 1-6 (2006).

N.A., "Monotonic Function," retrieved from *Wikipedia, the Free Encyclopedia*, URL:http://en.wikipedia.org/w/index.php?title=Monotonic_function&printable=yes, pp. 1-4 (2007).

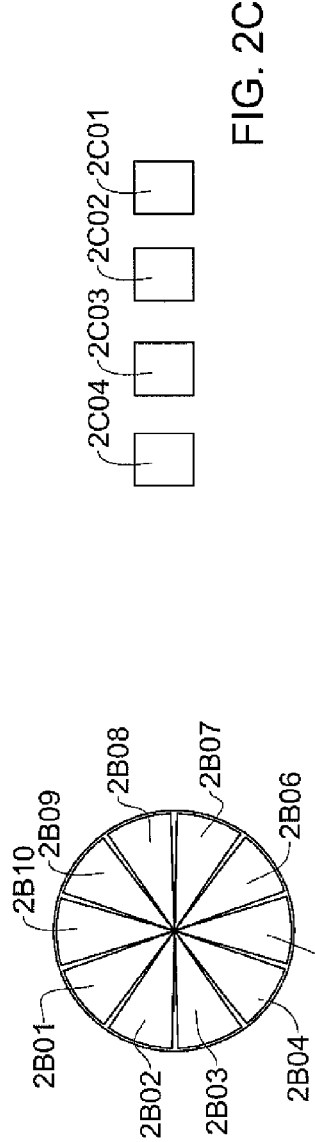
FIG. 2B
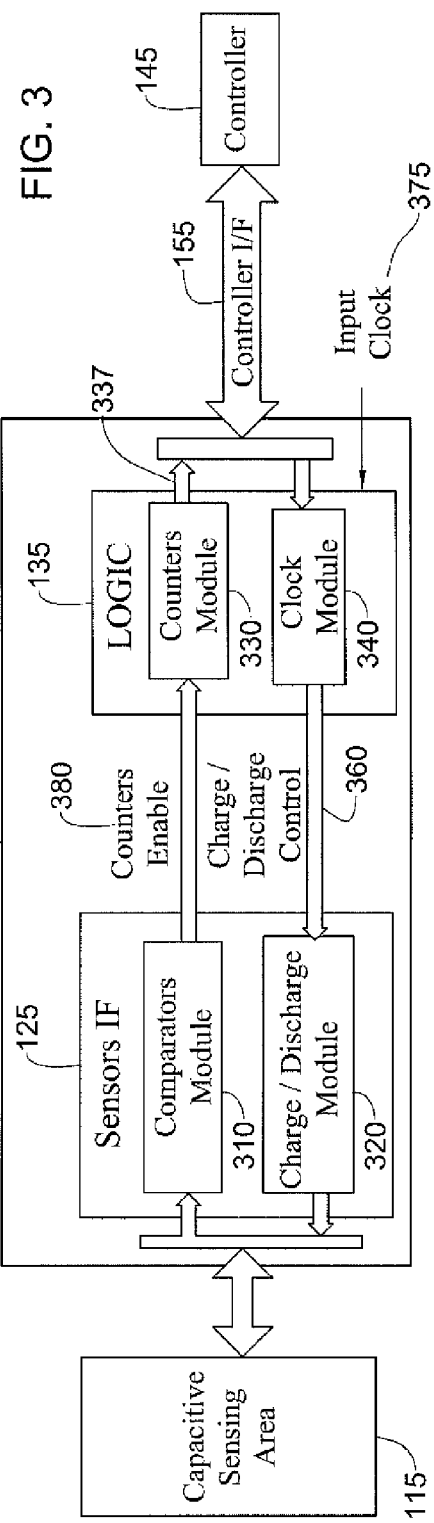
FIG. 2C
FIG. 3

POWER EFFICIENT CAPACITIVE DETECTION

CROSS REFERENCE TO RELATED APPLICATIONS

This application is a divisional of U.S. application Ser. No. 12/853,570 filed on Aug. 10, 2010 which is a continuation of U.S. application Ser. No. 11/889,435 filed on Aug. 13, 2007, both of which are hereby incorporated by reference herein.

FIELD OF THE INVENTION

This invention relates to capacitive sensors.

BACKGROUND OF THE INVENTION

There are many available input devices for an electronic system. Examples of these input devices include: keyboard, joystick, touch screen, mechanical mouse, optical mouse, touch sensitive sensor(s), etc.

Touch sensitive sensors, relying on different technologies, include resistive membrane position sensors, surface acoustic wave sensors, strain gauge sensors, optical sensors, or capacitive sensors. The advantages and disadvantages of the various technologies are discussed in the prior art, however the reader should note that capacitive sensors are typically currently considered to have high sensitivity and reliability. Capacitive sensors are also typically considered to have a long product life and to be cost effective.

SUMMARY OF THE INVENTION

According to the present invention, there is provided a capacitive detection method, comprising: determining whether a predetermined amount of time has elapsed since detection of presence of an object near a capacitive sensing area including at least one capacitive sensor; and if the predetermined amount of time is determined to have elapsed, causing a subsequent attempt for detecting whether an object is near the capacitive sensor area to consume less power, than if the predetermined amount of time had been determined to not have elapsed.

According to the present invention, there is also provided a capacitive detection method, comprising: receiving data corresponding to a plurality of capacitive sensors in a capacitive sensing area; using the received data or a function thereof to detect a position of an object whose presence has been detected as touching the input device; determining whether a difference in the detected position or a function thereof from a preceding detected position or a function thereof is below a predetermined amount; and if the difference is determined to be below the predetermined amount, causing a subsequent attempt for detecting whether an object is present to consume less power, than if the difference had been determined to not be below the predetermined amount.

According to the present invention, there is further provided a capacitive detection method, comprising: charging and discharging at least one time a first plurality of capacitive sensors in a capacitive sensing area whose charging and discharging are enabled; generating data relating to capacitances of the first plurality of charged and discharged sensors; and subsequently, charging and discharging at least one more time a second plurality of capacitive sensors in the capacitive sensing area whose charging and discharging remain enabled after an analysis of the generated data or a function thereof, the first and second pluralities including different numbers of sensors.

According to the present invention, there is provided a capacitive detection method, comprising: charging and discharging at least one time at least one capacitive sensor in a capacitive sensing area; generating data relating to capacitances of the charged and discharged at least one sensor; and subsequently, due to an analysis of the generated data or a function thereof, generating data for each at least one capacitive sensor in the capacitive sensing area, at a value whose change from the previous generating is at least partly unrelated to any variance in sensor capacitance, or at a different frequency than during the previous generating.

According to the present invention, there is also provided a controller module comprising: an interaction module configured to receive data corresponding to at least one capacitive sensor in a capacitive sensing area; and a presence detection module configured to determine whether a predetermined amount of time has elapsed since presence of an object near the capacitive sensing area was detected based on the received data or a function thereof; the interaction module being configured, depending on whether or not the predetermined time has elapsed, to configure, if not already configured, a power saving mode or a normal mode.

According to the present invention, there is further provided a controller module comprising: an interaction module configured to receive data corresponding to a plurality of capacitive sensors in a capacitive sensing area; a position detection module configured to detect position of an object near the capacitive sensing area based on the received data or a function thereof; and means for determining whether a difference in the detected position or a function thereof from a preceding detected position or a function thereof is below a predetermined amount; the interaction module being configured, depending on whether or not the difference is below a predetermined amount, to configure, if not already configured, a power saving mode or a normal mode.

According to the present invention there is provided a capacitive detection module comprising: at least one configuration register for configuring power saving mode or normal mode; a charge/discharge module configured to charge and discharge at least one capacitive sensor in a capacitive sensing area whose charging and discharging are enabled; and a counter module configured to measure, for each capacitive sensor whose charging and discharging are enabled, a time interval measurement relating to a capacitance of a corresponding capacitive sensor; wherein power save mode differs from normal mode in at least one variable selected from a group comprising: number of capacitive sensors with enabled charging and discharging, frequency of counter clock provided to the counter module, and frequency of charging and discharging.

According to the present invention, there is also provided a capacitive detection computer program product comprising a computer useable medium having computer readable program code embodied therein, the computer program product comprising: computer readable program code for causing the computer to determine whether a predetermined amount of time has elapsed since detection of presence of an object near a capacitive sensing area including at least one capacitive sensor; and computer readable program code for causing the computer, if the predetermined amount of time is determined to have elapsed, to cause a subsequent attempt for detecting whether an object is near the capacitive sensor area to consume less power, than if the predetermined amount of time had been determined to not have elapsed.

According to the present invention, there is further provided a capacitive detection computer program product comprising a computer useable medium having computer readable program code embodied therein, the computer program product comprising: computer readable program code for causing the computer to receive data corresponding to a plurality of capacitive sensors in a capacitive sensing area; computer readable program code for causing the computer to use the received data or a function thereof to detect a position of an object whose presence has been detected as touching the input device; computer readable program code for causing the computer to determine whether a difference in the detected position or a function thereof from a preceding detected position or a function thereof is below a predetermined amount; and computer readable program code for causing the computer, if the difference is determined to be below the predetermined amount, to cause a subsequent attempt for detecting whether an object is present to consume less power, than if the difference had been determined to not be below the predetermined amount.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 2B is an illustration of a layout of capacitive sensors in a capacitive sensing area module, according to an embodiment of the present invention;

FIG. 2C is an illustration of four capacitive sensors, according to an embodiment of the present invention;

FIG. 3 is a block diagram of a capacitive detection system, according to an embodiment of the present invention;

DETAILED DESCRIPTION OF EMBODIMENTS

Figure 1:
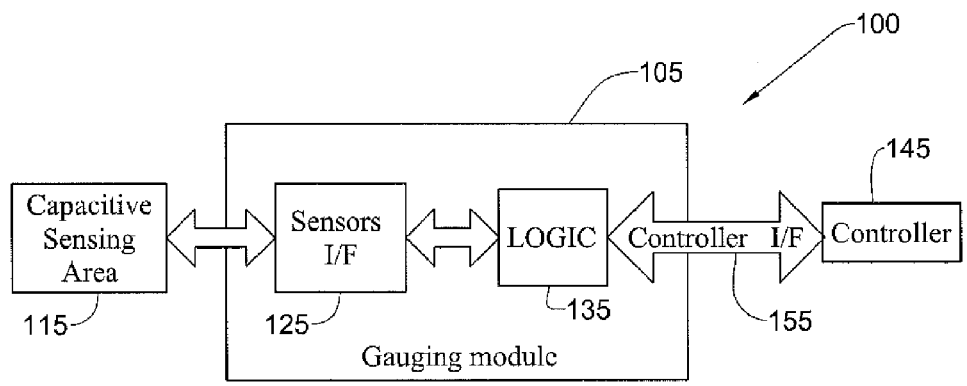
FIG. 1 is a block diagram of a capacitive detection system, according to an embodiment of the present invention.

Described herein are embodiments of the current invention for detection of the presence and/or position of an object using one or more capacitive sensors.

As used herein, the phrase "for example," "such as" and variants thereof describe non-limiting embodiments of the present invention.

In the description herein, the term "in parallel" should be understood to mean within the same time span, not necessarily implying synchronization/perfect overlap in time.

Reference in the specification to "one embodiment", "an embodiment", "some embodiments", "another embodiment", "other embodiments", "various embodiments", or variations thereof means that a particular feature, structure or characteristic described in connection with the embodiment(s) is included in at least one embodiment of the invention. Thus the appearance of the phrase "one embodiment", "an embodiment", "some embodiments", "another embodiment", "other embodiments" "various embodiments", or variations thereof do not necessarily refer to the same embodiment(s).

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Unless specifically stated otherwise, as apparent from the following discussions, it is appreciated that throughout the specification discussions, utilizing terms such as, "processing", "computing", "calculating", "measuring, "determining", "realizing", "applying", "associating", "providing" "generating", "causing", "measuring", "charging", "discharging", "running", "analyzing", "detecting", "changing", "comparing", "storing", "configuring", "receiving", "checking", "performing", "using", "selecting", "deciding", "weighting", "disabling", "enabling", "allowing", "reducing", "taking" or the like, refer to the action and/or processes of any combination of software, hardware and/or firmware.

Some embodiments of the present invention may use terms such as, processor, device, apparatus, system, block, subsystem, element, module, unit, etc, (in single or plural form) for performing the operations herein. These terms, as appropriate, refer to any combination of software, hardware and/or firmware configured to perform the operations as defined and explained herein. The module(s) (or counterpart terms specified above) may be specially constructed for the desired purposes, or it may comprise a general purpose computer selectively activated or reconfigured by a computer program stored in the computer. Such a computer program may be stored in a computer readable storage medium, such as, but not limited to, any type of disk including optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, any other type of media suitable for storing electronic instructions that are capable of being conveyed via a computing system bus.

The method(s)/algorithms/processe(s) or module(s) (or counterpart terms specified above) presented in some embodiments herein are not inherently related to any particular electronic system or other apparatus, unless specifically stated otherwise. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

FIGS. 1, 3, 4, 5, 8, and 16 are block diagrams of a capacitive detection system 100 and/or element(s) of system 100, according to various embodiments of the current invention. It should be understood that the division of the functionality of capacitive detection system 100 and/or of element(s) of system 100 into blocks in a particular block diagram is provided in order to facilitate reader understanding and therefore the division should not be considered binding. In some embodiments of the invention, system 100 and/or element(s) of system 100 may comprise fewer, more, and/or different blocks than illustrated in the figures herein. In some embodiments of the invention, the functionality of system 100 and/or element(s) of system 100 may be divided differently into the blocks illustrated in the figures herein. In some embodiments of the invention, the functionality of system 100 and/or elements of system 100 may be divided into fewer, more and/or different blocks than shown in the figures herein. In some embodiments of the invention, system 100 and/or elements of system 100 may include additional, less and/or different functionality than described herein. In some embodiments of the invention, one or more elements represented as blocks in the figures herein may have more, less and/or different functionality than described herein. Depending on the embodiment, elements represented as blocks shown in any figure herein may be concentrated or distributed relative to one another.

FIG. 1 is a top-level block diagram of capacitive detection system 100, according to an embodiment of the present invention. In the illustrated embodiment, capacitive detection system 100 may be used for presence detection and/or position detection, as will be explained in more detail below. In the illustrated embodiment, system 100 includes a capacitive sensing area module 115, a capacitive gauging module 105 (including for example a sensors interface module 125, and a logic module 135), and a controller module 145. In the illustrated embodiment, a controller interface 155 provides an interface between gauging module 105 and controller module 145.

In some embodiments capacitive detection system 100 is an electronic system or is comprised in an electronic system. In these embodiments, at least capacitive sensing area module 115 is included in an input device for the electronic system, but in some of these embodiments more or all of detection system 100 is included in the input device. The input device can be any suitable input device. For the sake of example, touchpads and keys in keypads/keyboards are discussed below as examples of input devices, however these examples should not be considered limiting.

Each of modules 105 and 145 may be made up of any combination of software, hardware and/or firmware capable of performing the functions as defined and explained herein. Modules 115, 105, and 145 of capacitive detection system 100 may be concentrated or distributed relative to one another. For example assuming a touchpad or key as an input device, in one embodiment controller module 145 may be included in a touchpad or key along with capacitive sensing area module 115 and gauging module 105, whereas in another embodiment, controller module 145 may be located external to the touchpad or key.

In some embodiments, capacitive sensing area module 115 includes n capacitive sensors. In one of these embodiments $n \geq 1$. For example, in one embodiment an individual key in a keypad/keyboard may comprise one capacitive sensing area module 115 including at least one capacitive sensor. For example in one embodiment a touchpad may comprise one capacitive sensing area module 115 including a plurality of capacitive sensors.

In one embodiment each capacitive sensor in capacitive sensing area 115 has two conductors separated by a dielectric material, with most of the energy found between the conductors. A finger or any other object which is near a particular capacitive sensor changes the capacitance of that particular capacitive sensor. (The finger or any other object may be near capacitive sensing area module 115, for example touching the covering of an input device such as a touchpad or key that at least includes capacitive sensing area 115).

In some embodiments, gauging module 105 is configured inter-alia to charge/discharge capacitive sensor(s) in capacitive sensing area 115 one or more times during each accumulation cycle, and generate data which can be used by controller module 145 to detect presence and/or position of a finger or other object. Hereinbelow the data that is provided to controller module 145 from capacitive gauging module 105 is termed in some embodiments "gauging data". For example gauging data may include measurement(s) which are function(s) of the capacitance(s) of the capacitive sensor(s). Continuing with the example, in one embodiment during an accumulation cycle for a given sensor, a single measurement which is a function of the capacitance of the sensor is generated.

Assuming embodiments where n>1 (i.e. there is more than one sensor in capacitive sensing area 115), the plurality of sensors in capacitive sensing area 115 may or may not be divided into sensors associated with different axes, depending on the embodiment. For example in some cases, the plurality of sensors may be divided into sensors associated with different axes when detection of position of the finger or other object with respect to more than one dimension is required and not divided into sensors associated with different axes when detection of position is not required or detection of position is only required with respect to one dimension.

Figure 2A:
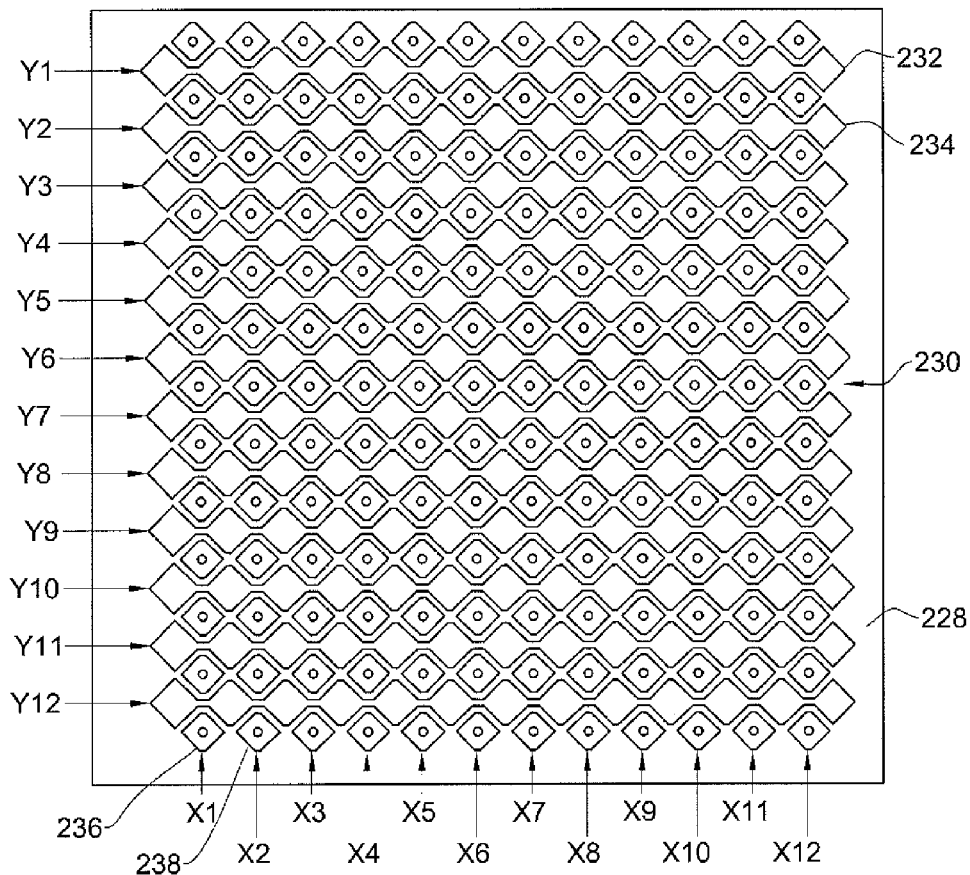
FIG. 2A is an illustration of a layout of capacitive sensors in a capacitive sensing area module, according to an embodiment of the present invention.

In embodiments with a plurality (n>1) of capacitive sensors in capacitive sensing area module 115, the number of capacitive sensors, the shape of the capacitive sensors, and/or the layout of the capacitive sensors in module 115 is/are not limited by the invention. However for the sake of further understanding of the reader, a few embodiments will now be described. In one embodiment, the layout of a plurality of capacitive sensors in capacitive sensing area module 115 resembles the layout described in U.S. Pat. No. 4,550,221 which is hereby incorporated by reference herein. For the convenience of the reader, FIG. 2A illustrates one embodiment of a layout of capacitive sensors in capacitive sensing area module 115 which resembles the layout of capacitive sensors illustrated and described in U.S. Pat. No. 4,550,221.

As shown in the embodiment of FIG. 2A, capacitive sensing area module 115 includes a substrate 228, for example a printed circuit board (PCB) which supports first and second interleaved, closely spaced arrays of conductive plates 230. Conductive plates 230 are covered, for example by a thin insulating layer as the covering. For example, conductive plates 230 may be thin electrically conductive metal plates which are deposited on the top surface of substrate 228. The plates of the first array are arranged in columns and rows. As a non-limiting example the plates of the first array are arranged in FIG. 2A in thirteen columns and twelve rows (hereinbelow referred to as X-sensors). For example sensors 236 and 238 are examples of X sensors. The second array consists of plates also arranged in columns and rows. As a non-limiting example the plates of the second array are arranged in FIG. 2A in twelve columns and thirteen rows (hereinbelow referred to as Y-sensors). For example sensors 232 and 234 are examples of Y sensors. In one embodiment, the size and spacing of plates 230 of rows Y1-Y12 and columns X1-X12 are selected so that when a finger or another object is placed near the sensors, for example in contact with the insulating layer, the presence of the finger or other object changes the capacitance between ambient ground and the plates of at least one of the rows Y1-Y12 (i.e. a change in capacitance in at least one of the Y-sensors) and at least one of the columns X1-X12 (i.e. a change in capacitance in at least one of the X-sensors).

Although the sensors are shown laid out in a grid in FIG. 2A, any appropriate layout may be used. For example, FIG. 2B illustrates a layout of ten capacitive sensors (2B1 through 2B10) in module 115 according to another embodiment of the invention. Although the Y-sensors and X-sensors are shown as diamonds in FIG. 2A, any shape, which allows the sensors to be appropriately spaced, for example circles, squares, etc. may be used instead in other embodiments. For example, FIG. 2C shows four sensors, 2C1 through 2C4 having a different shape. Although twelve X sensors and twelve Y sensors are shown in FIG. 2A, the number of X sensors and Y sensors are not limited by the invention to the number appearing in FIG. 2A. For example in one embodiment there may be twelve X sensors and fifteen Y sensors.

Depending on the embodiment, position detection of an object near capacitive sensing area 115 may be expressed using any appropriate number of dimensions in any appropriate coordinate system. Examples of coordinate systems include Cartesian coordinate system, polar coordinate system, cylindrical coordinate system, spherical coordinate system, geographic coordinate system, etc. For ease of explanation, in the description of embodiments below it is assumed that position detection is expressed in Cartesian coordinates in one dimension or in two dimensions (x, y).

Refer again to the embodiment of FIG. 1 where sensors interface module 125 and logic module 135 are shown as separate blocks of gauging module 105. It should be evident that in some embodiments of the present invention the functionality of sensors interface module 125 and logic module 135 may be represented by a single block and/or that the functionality of either or each of sensors interface module 125 and logic module 135 may be divided into a plurality of blocks.

FIG. 3 illustrates capacitive detection system 100 where sensors interface 125 and logic module 135 are each divided into sub-blocks according to an embodiment of the present invention. In the embodiment illustrated in FIG. 3, sensors interface module 125 includes a comparators module 310 and a charge/discharge module 320, whereas logic module 135 includes a counters module 330 and a clock module 340. Each of modules 310, 320, 330, and 340 may be made up of any combination of software, hardware and/or firmware capable of performing the functions as defined and explained herein.

In the embodiment illustrated in FIG. 3, an input clock 375 is provided to clock module 340, and the source of input clock 375 is not limited by the invention. For example input clock 375 may be the system clock of capacitive detection system 100, the system clock of a system comprising capacitive detection system 100, provided by controller 145, internally generated by module 105, etc. Clock module 340 is configured inter-alia to provide charge/discharge control indication(s) 360 to charge/discharge module 320. Charge/discharge module 320 is configured inter-alia to charge and/or discharge capacitive sensors in capacitive sensing area module 115 based on received charge/discharge control indication(s) 360. Comparators module 310 is configured inter-alia to provide counters enable indication(s) 380 to counters module 330 based on the voltage(s) across charging capacitive sensor(s) and/or across discharging capacitive sensor(s). Counters module 330 is configured inter-alia to run when enabled, thus measuring time interval(s) reflective of the capacitances of charging and/or discharging capacitive sensor(s). The measured time interval(s) 337 (being examples of gauging data) are provided to controller 145 via controller interface 155, and/or may be provided to any other module in capacitive detection system 100 or in a system including capacitive detection system 100.

It is noted that a time interval may be a function of the capacitance of a capacitive sensor, and therefore measurement of a time interval, for example the measured time interval 337 associated with the sensor, may in some cases substitute for measuring capacitance of the sensor. A brief explanation of the relationship between capacitance and time is therefore now provided.

As is well known in the art, the current i through a capacitor is given by:

$$i = C\left(\frac{dv}{dt}\right)$$

where C is the capacitance of the capacitor and $$\frac{dv}{dt}$$

is the change of voltage over time across the capacitor.

Rearranging the equation results in:

$$\frac{dt}{dV} = \frac{C}{i}$$

The rearranged equation states that the reciprocal of the rate of change (derivative) of the voltage across a capacitor, i.e. the time interval during which the voltage across the capacitor changes, is equal to the capacitance of the capacitor divided by the current through the capacitor. The time interval during which the voltage across the capacitor changes is a monotonic function of the capacitance of the capacitor because the time interval is larger for a larger capacitance than for a smaller capacitance. For example, in cases where more than one time interval during which the voltage changes across the capacitor are measured cumulatively, the measurement representing more than one interval may be considered a monotonic function of the capacitance of the capacitor because the measurement is a monotonic function of the average capacitance of the capacitor, being larger for a larger average capacitance than for a smaller average capacitance.

Refer again to FIGS. 1 and 3. In one embodiment gauging module 105 may include independent functionality associated with each capacitive sensor in sensing module 115. In another embodiment, additionally or alternatively, functionality in gauging module 105 may be associated with more than one capacitive sensor assuming that there is a plurality of capacitive sensors in capacitive sensing area 115. In some embodiments where there is a plurality of capacitive sensors in capacitive sensing area module 115, each of modules 310, 320, 330, and 340 may or may not include functionality associated with more than one of the capacitive sensors.

Assume for further illustration of some embodiments of FIG. 3 that each distinct element in comparator module 310 includes m copies (m≧1), each distinct element in charge/discharge module 320 includes l copies (l≧1), each distinct element in counters module 330 includes k copies (k≧1), and each distinct element in clock module 340 includes j copies (j≧1). Depending on the embodiment any two of j, k, l, and m may or may not be identical numbers, and each of j, k, l, and m may or may not be equal to n (where n is the number of capacitive sensors in module 115 as explained above). For example, assuming embodiments where j, k, l, and/or m is/are less than n and n is greater than 1, then in some of these embodiments a particular copy associated with more than one capacitive sensor may be allowed to operate with respect to at least two of the associated sensors in parallel whereas in other embodiments the particular copy may be required to operate with respect to different sensors at non-overlapping times. Continuing with the example, in some cases a particular copy may be configured to operate at a certain time with respect to (one or more) X-sensor(s) and at a different (non-overlapping) time with respect to (one or more) Y-sensor(s). Still continuing with the example, a particular module 310, 320, 330, or 340 may in some cases include copy/ies each of which is/are allowed to operate in parallel with respect to at least two sensors, copy/ies each of which is/are obligated to operate at non-overlapping times with respect to different sensors, and/or copy/ies each associated with only one sensor. As another example in some embodiments, j, k, l, and/or m may equal 1, with n>1, meaning that each element having one copy may operate with respect to all the sensors in capacitive sensing area module 115, for example in parallel for at least two sensors, or for example not in parallel with respect to different sensors. As another example, j, k, l, and/or m may be equal to n, and therefore each element having n copies may have each copy associated with a different capacitive sensor.

Figure 4:
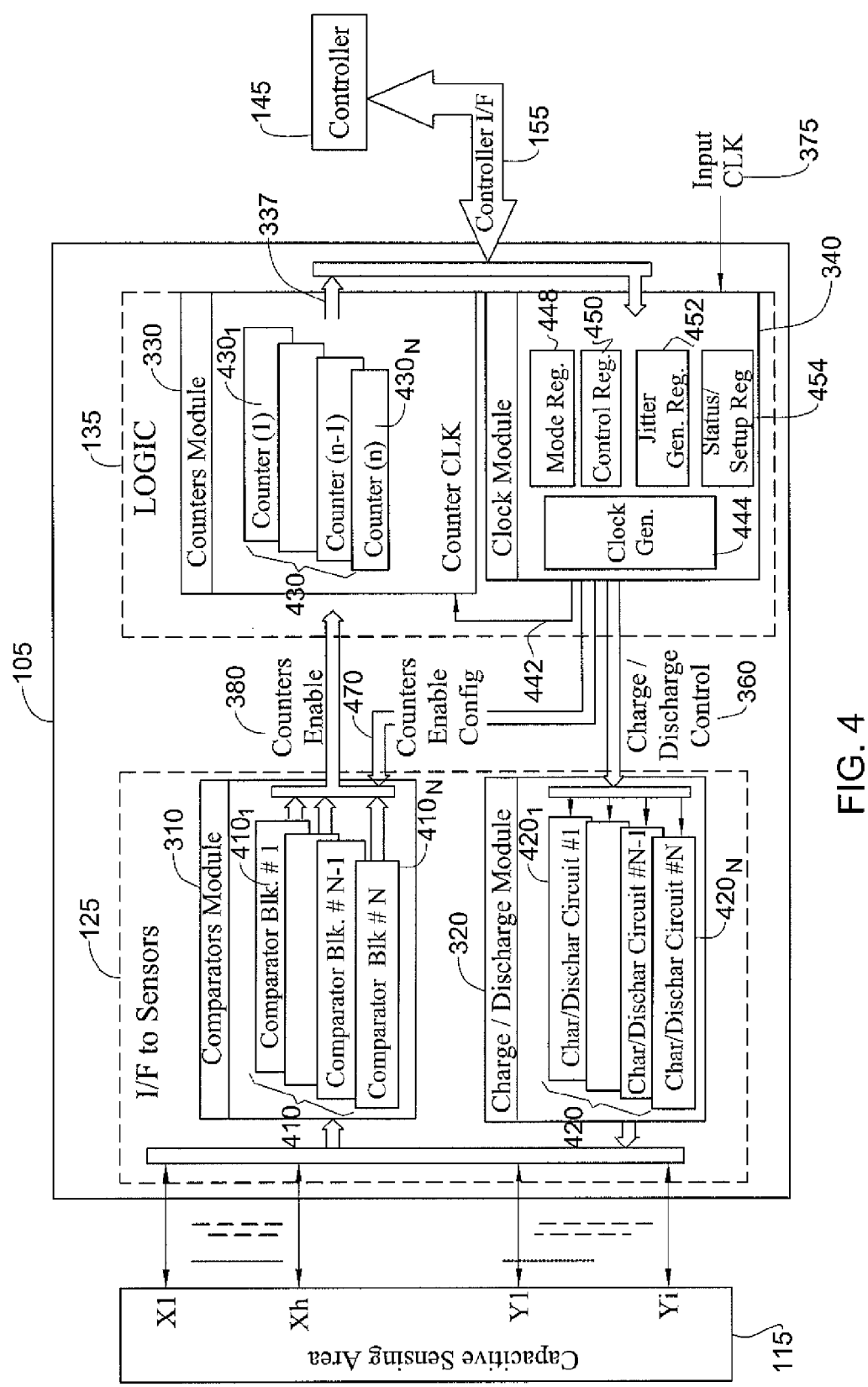
FIG. 4 is a detailed block diagram of a capacitive detection system, according to an embodiment of the present invention.

FIG. 4 is a block diagram of capacitive detection system 100, according to an embodiment of the present invention. In the embodiment illustrated in FIG. 4, there is assumed to be a plurality of capacitive sensors. In the illustrated embodiment, clock module 340 includes elements each having one copy associated with all capacitive sensors in capacitive sensing area module 115 (i.e. j=1 in the illustrated embodiment of FIG. 4), but comparators module 310, charge discharge module 320, and counters module 330 include elements each having a separate copy for each capacitive sensor in capacitive sensing area module 115 (i.e. k, l, and m are each equal to n in the illustrated embodiment of FIG. 4). It should be evident that in other embodiments, j, k, l, and/or m may vary from the numbers shown in the embodiment of FIG. 4.

In the embodiment illustrated in FIG. 4, clock module 340 includes a clock generator module 444 and storage modules ("registers") for storing one or more configurable operational parameters affecting the operation of gauging module 105 and/or controller module 145. For ease of understanding for the reader, the (configuration) registers are divided into a mode register 448, a control register 450, a jitter generator register 452 and a status setup register 454, however this division should not be construed as binding. Each of modules 444, 448, 450, and/or 452 may be made up of any combination of software, hardware and/or firmware capable of performing the functions as defined and explained herein. More details on clock generator module 444 and registers 448, 450, 452 or 454 are provided further below. In one embodiment, operational parameters associated with any of registers 448, 450, 452, or 454 may be configured by controller 145 and/or gauging module 105 as will be described in more detail further below. Although in the embodiment illustrated in FIG. 4, it is assumed that j=1, i.e. that each of registers 444, 448, 450, and 452 in clock module 340 is associated with all of the sensors in capacitive sensing area module 115, this does not necessarily imply that each operational parameter in register 444, 448, 450, and 452 configures the operation vis-à-vis all the sensors, as will be explained in more detail below.

In some embodiments there may be more, less and/or different functionality included in clock module 340 and/or the functionality provided by clock module 340 may be divided into fewer, more and/or different modules than shown in FIG. 4. In some embodiments, functionality which is described hereinbelow as belonging to a particular register 448, 450, 452 or 454 may be provided additionally or alternatively by another of register 448, 450, 452 or 454. In some embodiments, there may be more than one copy of register 448, 450, 452, and/or 454 with each copy of a particular register having configurable parameters associated with one or more different sensor(s). In some embodiments, there may be fewer, more and/or different registers providing the same, enhanced, or degraded functionality as described herein for registers 448, 450, 452, or 454. In some embodiments, some of the operational parameters described herein as being configurable via any of registers 448, 450, 452, and/or 454 may not be configurable, for example some parameters may be implemented (for example hard-coded, hardwired, etc) and/or based on other configurable and/or non-configurable parameters. In some embodiments, there may be fewer, more and/or different operational parameters affecting the operation of gauging module 105 and/or controller module 145 than described herein.

In the embodiment illustrated in FIG. 4 it is assumed that the n capacitive sensors in capacitive sensing area 115 include h X-sensors and i Y-sensors (h, i≧1 and h+i=n). It is also assumed in the embodiment illustrated in FIG. 4 that there is a separate comparator 410 corresponding to each of the capacitive sensors (shown are four of comparators 410, namely $410_1$, $410_2$, $410_{N-1}$, $410_N$); there is a separate charge/discharge circuit 420 corresponding to each of the capacitive sensors (shown are four of charge discharge circuits 420, namely $420_1$, $420_2$, $420_{N-1}$, $420_N$); and there is a separate counter 430 corresponding to each of the capacitive sensors (shown are four of counters 430, namely $430_1$, $430_2$, $430_{N-1}$, $430_N$). In other embodiments, k, l, and/or m may be less than n. In other embodiments, the plurality of sensors illustrated in FIG. 4 may be laid out in one dimension (for example only X sensors or only Y sensors may be included).

In FIG. 4, in addition to charge/discharge control signals 360 and counters enable signal 380 discussed above, illustrated are additional signals between modules in accordance with one embodiment of the invention. In the illustrated embodiment a counter clock 442, for example generated by clock generator 444 is provided to counters 430. In the illustrated embodiment, it is assumed that the same counter clock 442 is provided to each counter 430 but in other embodiments, different counter clocks 442 may be provided to different counters 430. Counter enable configuration signals 470 are provided by clock module 340 to comparators 410. Counter enable configuration signals will be explained in more detail below.

Figure 5:
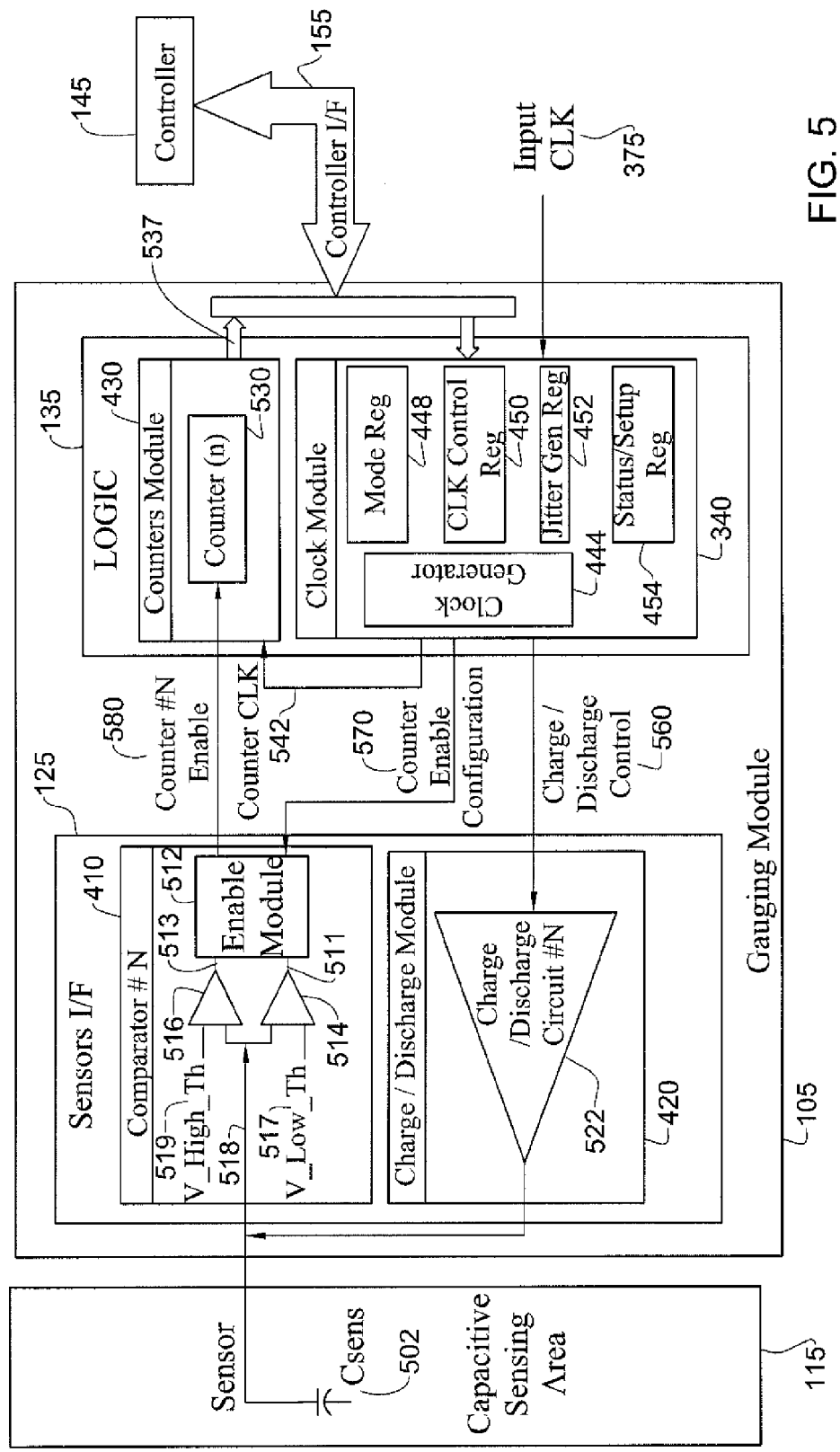
FIG. 5 is a block diagram of a detailed capacitive detection system relevant for one capacitive sensor, according to an embodiment of the present invention.

FIG. 5 illustrates a block diagram of a detailed capacitive detection system relevant for one capacitive sensor 502 from capacitive sensing area 115, according to an embodiment of the present invention. Capacitive sensor 502 is represented by a capacitor (using the capacitor symbol) for simplicity of illustration. Assuming an embodiment with X and Y sensors, sensor 502 may be either an X or Y sensor. For simplicity of illustration the embodiment shown in FIG. 5 assumes that each capacitive sensor in capacitive sensing area module 115 is associated with a separate comparator module 410, counters module 430, and charge/discharge module 420, or that a plurality of capacitive sensors is associated with the same 410, 430, and/or 420 but that each of the associated sensors operates with respect to the shared 410, 430, and/or 420 at a separate time. For simplicity of illustration, the embodiment in FIG. 5 also assumes that all sensors in capacitive sensing area 115 are associated with the same clock module clock generator 444, and registers 448, 450, 452, and 454. For ease of understanding a numerical labels of a signal relating to sensor 502 is distinguished in the description from signals relating to all sensors in capacitive sensing area 115 by beginning with "5" for example counter clock 542, charge/discharge control 560, counter enable configuration 570, counter enable 580, however depending on the embodiment a signal associated with sensor 502 may or may not be distinct from signals relating to other sensors.

In the illustrated embodiment of FIG. 5, charge/discharge module 420 associated with capacitive sensor 502 includes charge/discharge circuit 522. In the illustrated embodiment comparator module 410 associated with capacitive sensor 502 includes first comparator 514 and second comparator 516 and enable module 512. In the illustrated embodiment counter module 430 associated with capacitive sensor 502 includes counter 530.

In the embodiment illustrated in FIG. 5, when charge/discharge control signal 560 emitted by clock module 340 indicates that capacitive sensor 502 should charge, charge/discharge circuit 522 causes capacitive sensor 502 to charge. When charge/discharge control signal 560 indicates that sensor 502 should discharge, charge/discharge circuit 522 causes sensor 502 to discharge. The voltage 518 across capacitive sensor 502 is provided to first comparator 514 and second comparator 516.

It is noted that in the embodiment illustrated in FIG. 5, the timing of the charging and discharging of capacitive sensor 502 may be controlled, independent of the value of voltage 518 across capacitive sensor 502. More details on control of the timing of charging and discharging of sensors in capacitive sensing area 115 in some embodiments are provided further below.

The elements comprised in charge/discharge circuit 522 may vary depending on the embodiment and are not limited to any particular configuration. In one embodiment, charge/discharge circuit 522 includes a current source connected to a positive voltage supply (Vcc), a first switch in series with the current source and a second switch in parallel to capacitive sensor 502. In this embodiment, when charge/discharge control signal 560 indicates charging, the first switch closes and the second switch opens, causing capacitive sensor 502 to be charged by the constant current provided from the current source. Similarly, in this embodiment, when charge/discharge control signal 560 indicates discharging, the first switch opens and the second switch closes, allowing capacitive sensor 502 to discharge through the second switch to ground. The reader will understand that in other embodiments charge/discharge circuit 522 may comprise elements in a different configuration which will provide charging and discharging functionality.

Charge/discharge control signal 560 and charge/discharge circuit 522 are illustrated in the embodiment of FIG. 5 as affecting the charging and discharging of capacitive sensor 502. In another embodiment, there may be separate functionality for affecting the charging of capacitive sensor 502 and for affecting the discharging of capacitive sensor 502.

Continuing with the description of the embodiment of FIG. 5, first comparator 514 compares sensor voltage 518 with a low voltage (reference) level 517, and generates an output 511 which varies depending on whether sensor voltage 518 is higher or lower than low voltage level 517. Second comparator 516 compares sensor voltage 518 with a high voltage (reference) level 519, and generates an output 513 which varies depending on whether sensor voltage 518 is higher or lower than high voltage level 519. In another embodiment, the functionality of comparators 514 and 516 may be combined in a single comparing element.

The terms low and high, when referring to voltage levels 517 and 519, should be understood as relative to one another, and therefore high voltage level 519 is larger than low voltage level 517. The values of low voltage level 517 and high voltage level 519 are not limited by the invention. Voltage values 517 and 519 are constant in some cases over time, and in other cases voltage values 517 and 519 may vary over time. Voltage values 517 and 519 are both non-zero in one embodiment.

In some cases, there may be an advantage to an embodiment where the values of both low voltage level 517 and high voltage level 519 are non-zero. In some of these cases, the usage of a zero value may be less stable from noise than using non-zero values. In some of these cases, alternatively or additionally the value zero may be in the non-linear range of the charging/discharging curve of capacitor 502 and therefore less stable.

In some embodiments, low voltage level 517 and high voltage level 519 are each between zero and the supplied voltage (Vcc). In one (non-limiting) example of one of these embodiments, low voltage level 517 is greater than zero and less than or equal to one third of the positive voltage supply Vcc (i.e. $0<V_{517}\leq Vcc/3$) and high voltage level 519 is equal to or greater than two-thirds of Vcc and less than or equal to Vcc (i.e. $\frac{2}{3}Vcc\leq V_{519}\leq Vcc$). In this embodiment, in some cases, the voltage range between low voltage level 517 and high voltage level 519 corresponds to the "more linear" section of a graph of voltage 518 across sensor 502 during charging or discharging.

Referring again to the embodiment illustrated in FIG. 5, output 511 from first comparator 514, output 513 from second comparator 516, and a counter enable configuration signal 570 are provided to an enable module 512. Enable module 512 outputs a counter enable signal 580 causing a counter 530 associated with sensor 502 to run or not run. In some embodiments, counter 530 is thereby configured to run during the time interval that voltage 518 across sensor 502 ranges between the low voltage level 517 and the high voltage level 519 (where the voltage 518 may be increasing and/or decreasing). In one of these embodiments, counter 530 is configured to run during the time interval in which voltage 518 across sensor 502 (when charging) increases from low voltage level 517 to high voltage level 519. In another of these embodiments, counter 530 is alternatively or additionally configured to run during the time interval in which voltage 518 across sensor 502 (when discharging) decreases from high voltage level 519 to low voltage level 517. In one embodiment, counter enable configuration signal 570 controls whether counter 530 runs when voltage 518 ranges between the low voltage level 517 and the high voltage level 519 during the charging, during the discharging, or during both the charging and discharging of sensor 502. In the discussion herein, it should be understood that depending on the embodiment, the range between low voltage value 517 and high voltage value 519 when counter 530 runs, may or may not include low voltage value 517 and/or high voltage value 519.

As illustrated in the embodiment of FIG. 5, enable module 512 is external to counter 530 but in another embodiment, enable module 512 may be incorporated into counter 530.

As shown in the embodiment of FIG. 5, a counter clock 542 is provided to counter 530. Therefore when counter 530 is running, counter 530 counts the cycles of counter clock 542. The time interval during which the voltage across capacitive sensor 502 ranges between low voltage level 517 and high voltage level 519 is therefore measured by counter 530 in "units" or "counts" of counter clock cycles in the illustrated embodiment (i.e. counter 530 counts the number of counter clock cycles during which counter enable signal 580 is at the "enable" level). In other embodiments, the time interval may be measured in different units than cycles of counter clock 542. For example, in one of these embodiments, counter 542 may instead be an element which measures the time period in units based on seconds (for example, nanoseconds, microseconds, etc).

In order to facilitate reader understanding, the functionality of sensor interface 125 associated with sensor 502 and counter module 430 associated with sensor 502 was divided into the elements shown in FIG. 5 in accordance with one embodiment, but the division should not be considered binding. In some embodiments the functionality may be divided into fewer, more and/or different elements than illustrated in FIG. 5. In some embodiments, the functionality may be divided differently into the elements illustrated in FIG. 5. In some embodiments any element in FIG. 5 may have more, less and/or different functionality than described herein.

Figure 6:
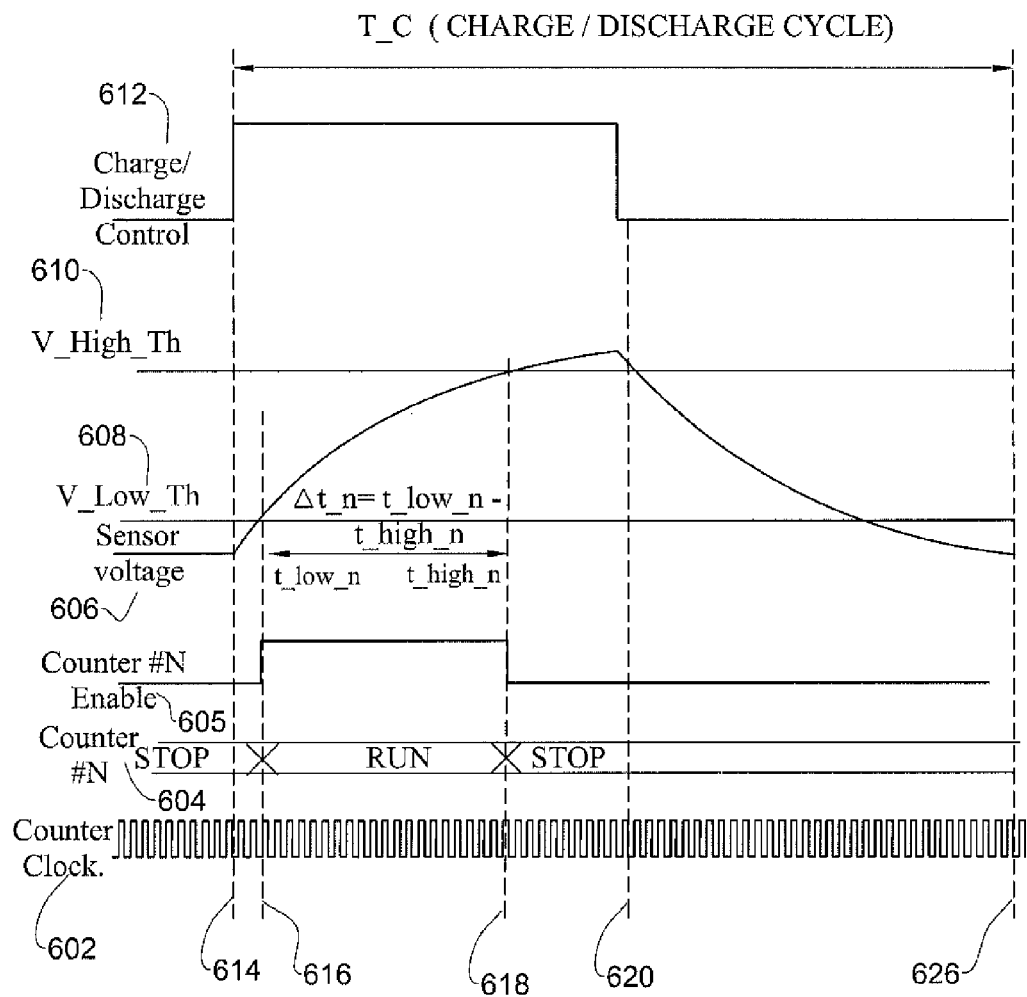
FIG. 6 illustrates timing diagrams related to the operation of a counter while an associated sensor is charging, according to various embodiments of the present invention.
Figure 7:
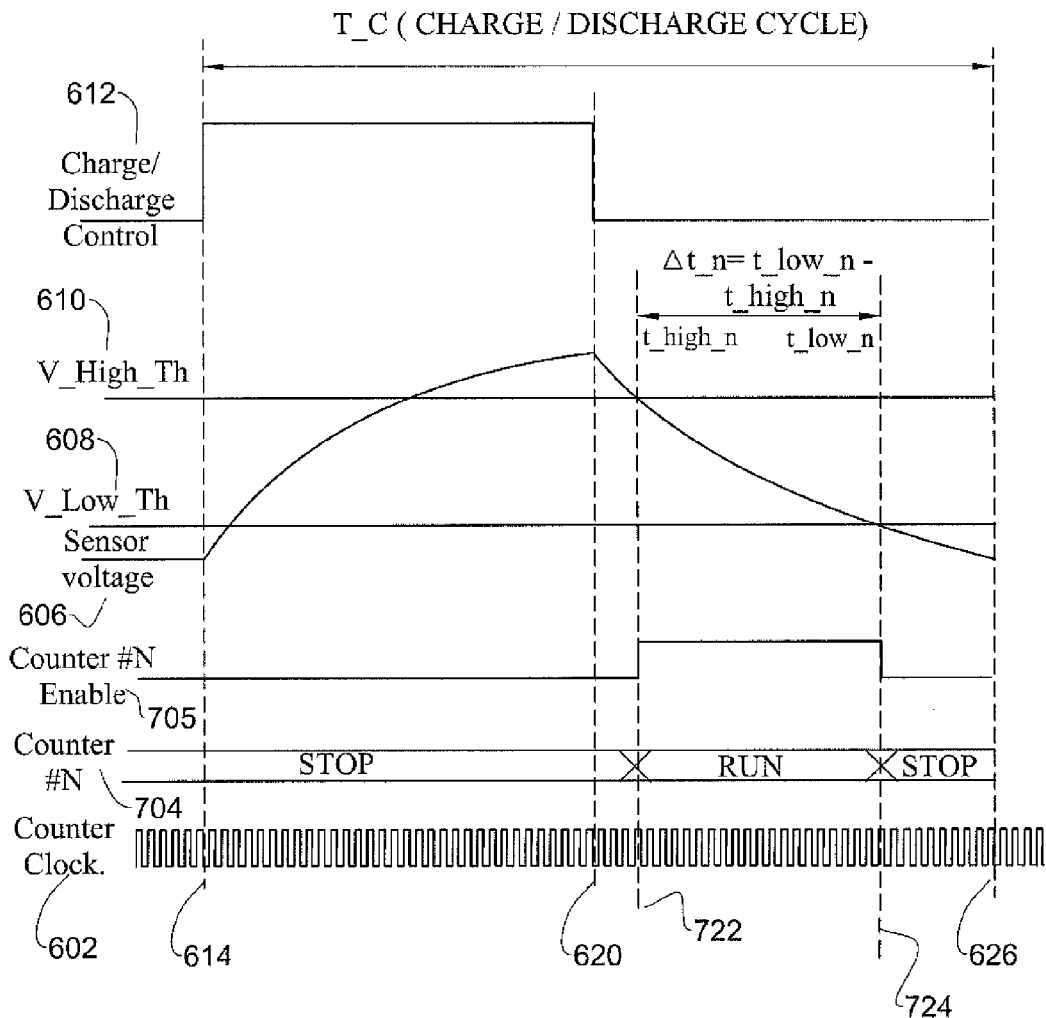
FIG. 7 illustrates timing diagrams related to the operation of a counter while an associated sensor is discharging, according to various embodiments of the present invention.

FIGS. 6 and 7 illustrate timing diagrams related to the operation of counter 530 while sensor 502 is charging and discharging respectively, according to various embodiments of the present invention.

As shown in the embodiment of FIG. 6, a timing diagram 602 illustrates counter clock signal 542 over time. A timing diagram 604 illustrates when counter 530 runs and when counter 530 is not running (stops) over time. A timing diagram 605 illustrates counter enable signal 580 over time, where in the illustrated embodiment counter enable signal 580 is high for enabling and low for disabling. A timing diagram 606 illustrates the voltage 518 across capacitive sensor 502 over time. Timing diagrams 608 and 610 respectively illustrate low voltage level 517 and high voltage level 519 over time. A timing diagram 612 illustrates the charge/discharge control signal 560 over time, where in the illustrated timing diagram charge/discharge control signal 560 is high for charging and low for discharging.

In the embodiment illustrated in FIG. 6 at time 614, charge/discharge control signal 560 changes to a "charge" level (see timing diagram 612) and capacitive sensor 502 begins charging. As capacitive sensor 502 charges, the voltage 518 across capacitive sensor 502 increases over time, as illustrated by timing diagram 606. At time point 616, (t_low_n), the voltage 518 across capacitive sensor 502 reaches low voltage level 517 (illustrated by the crossover of timing diagram 606 and timing diagram 608). Therefore at time point 616, counter enable signal 580 changes to an "enable" level (see timing diagram 605) and counter 530 begins running as illustrated by timing diagram 604. In one embodiment, time point 616 is the time point when low voltage level 517 is reached, whereas in another embodiment time point 616 is the time point when low voltage level 517 is exceeded. At time point 618, (t_high_n), the voltage 518 across capacitive sensor 502 reaches high voltage level 519 (illustrated by the crossover of timing diagram 606 and timing diagram 610). Therefore at time point 618 counter enable signal 580 changes to a "disable" level (see timing diagram 605) and counter 530 stops running—see timing diagram 604. In one embodiment, time point 618 is the time point when high voltage level 519 is reached, whereas in another embodiment time point 618 is the time point when high voltage level 519 is exceeded. The time Δt_n represents the difference in time between time point 616 (t_low_n) and time point 618 (t_high_n), i.e., a time interval during which counter 530 runs. At time point 620, charge/discharge control signal 560 changes to a "discharge" level (see timing diagram 612) and capacitive sensor 502 begins discharging. In one embodiment, during the discharging, counter 530 continues to be disabled (i.e. does not run). In another embodiment during the discharging, counter 530 runs when sensor voltage 518 ranges between low voltage level 517 and high voltage level 519 as described below with respect to FIG. 7. At time point 626, charge/discharge signal 520 completes one charge/discharge cycle, and therefore the illustrated charge/discharge period T_c equals the time difference between time point 614 and time point 626. In one embodiment charge/discharge cycle 520 then repeats (i.e. with charge/discharge control 520 changing to the "charge" level at time point 626 as at time point 614.)

For simplicity of description of the embodiment of FIG. 7, it is assumed that timing diagrams 602, 606, 608, 610, and 612 for counter clock signal 542, sensor voltage 518, low voltage level 517, low voltage level 519, and charge/discharge control signal 560 respectively over time are unchanged from the embodiment described in FIG. 6. A timing diagram 704 illustrates when counter 530 runs and when counter 530 is not running (stops) over time. A timing diagram 705 illustrates counter enable signal 580 over time.

In the embodiment illustrated in FIG. 7 at time 614 charge/discharge control signal 560 changes to a "charge" level (see timing diagram 612) and capacitive sensor 502 begins charging. As capacitive sensor 502 charges, the voltage 518 across capacitive sensor 502 increases over time, as illustrated by timing diagram 606. In one embodiment, counter enable signal 580 is enabled and counter 530 runs during the time interval that voltage 518 across charging sensor 502 ranges between low voltage level 517 and high voltage level 519 as described above with reference to FIG. 6. In another embodiment, counter enable signal 580 is not enabled and counter 530 does not run while sensor 502 is charging. At time point 620, charge/discharge control signal 560 changes to a "discharge" level (see timing diagram 612) and capacitive sensor 502 begins discharging. At time point 722, (t_high_n), the voltage 518 across capacitive sensor 502 reaches high voltage level 519 (illustrated by the crossover of timing diagram 606 and timing diagram 610). Therefore at time point 722, counter enable signal 580 changes to an "enable" level (see timing diagram 705) and counter 530 begins running as illustrated by timing diagram 704. In one embodiment time point 722 is the time point when high voltage level 519 is reached whereas in another embodiment time point 722 is the time point when voltage 518 goes below high voltage level 519. At time point 724, (t_low_n), the voltage 518 across capacitive sensor 502 reaches low voltage level 517 (illustrated by the crossover of timing diagram 606 and timing diagram 608). Therefore at time point 724 counter enable signal 580 changes to a "disable" level (see timing diagram 705) and counter 530 stops running—see timing diagram 704. In one embodiment, time point 724 is the time point when low voltage level 517 is reached whereas in another embodiment time point 724 is the time point when voltage 518 goes below low voltage level 517. The time $\Delta t\_n$ represents the difference in time between time point 722 (t_high_n) and time point 724 (t_low_n), i.e. a time interval during which counter 530 runs. At time point 626, charge/discharge signal 520 completes one charge/discharge cycle, and therefore the illustrated charge/discharge period T_c equals the time difference between time point 614 and time point 626. In one embodiment charge/discharge cycle 520 then repeats (i.e. with charge/discharge control 520 changing to the "charge" level at time point 626 as at time point 614.)

Referring to FIGS. 6 and 7, it should be noted that the values of low and high voltage levels 517 and 519 shown in timing diagrams 608 and 610 respectively are just one example of possible low and high voltage levels 517 and 519. In one embodiment, one or both of low and high voltage levels 517 and 519 are inputted into gauging module 105. In one embodiment, one or both of low and high voltage levels 517 and 519 are implemented, for example hard-coded/hardwired. In some embodiments, one or both of voltage levels 517 and 519 are based on configurable and/or non-configurable operational parameters. For example, in one of these embodiments, the percentage of Vcc equal to each of low and high voltage levels 517 and 519 may be configurable. As another example, in one of these embodiments, low and high voltage levels 517 and 519 may each equal an implemented percentage of Vcc. In some embodiments one or both of voltage levels 517 and 519 are configurable. In some embodiments with configurable parameters, low voltage level 517 and/or high voltage level 519 (or configurable percentages) may be configured independently for each sensor, collectively for each subset of sensors or collectively for all sensors in capacitive sensing area 115. Examples of subsets are given further below.

In some embodiments, counter enable configuration signal 570 may be configured, for example via setup status register 454 (see FIG. 4 or 5), to one of the following "counter enable" modes: enabling when charge/discharge control signal 560 is at "charge" level, enabling when charge/discharge control signal 560 is at "discharge" level, enabling both when charge/discharge control signal 560 is at "charge" level and at "discharge" level. Therefore depending on the mode, counter enable signal 580 may cause counter 530 to run during the time interval that the voltage across charging sensor 502 ranges between low and high levels 517 and 519 (as shown in FIG. 6), during the time interval that the voltage across discharging sensor 502 ranges between low and high levels 517 and 519 (as shown in FIG. 7) or during both of these time intervals. In some of these embodiments, the counter enable mode may be independently set for each sensor in capacitive sensing area 115 or collectively set for each subset of sensors in capacitive sensing area 115, whereas in another of these embodiments the counter enable mode is collectively set for all sensors in capacitive sensing area 115. Examples of subsets are given further below. In other embodiments the counter enable mode is not configurable, for example, the mode may be implemented, or based on configurable and/or non-configurable operational parameters.

For simplicity of description it was assumed in the description of embodiments of FIGS. 6 and 7 that charging occurs when charge/discharge control signal 560 is high and counter 530 runs when counter enable signal 580 is high, but in other embodiments, these operations may be triggered when the triggering signal is low. For example, in one embodiment, charging may occur when charge/discharge control signal 560 is low.

Depending on the embodiment, the charging section of curve 606 and the discharging curve of section 606 (see FIG. 6 or 7) may or may not be mirror images of one another. Therefore depending on the embodiment, the time interval for voltage 518 to range between low voltage level 517 and high voltage level 519 when charging may or may not be the same as the time interval for voltage 518 to range between low voltage level 517 and high voltage level 519.

It should be noted that the period (frequency) of counter clock signal 542 illustrated in timing diagram 602 of FIG. 6 or 7 is but one example of possible periods (frequencies) of counter clock signal 542. In some embodiments, the frequency (period) of counter clock signal 542 is configurable, for example via clock control register 450 (see FIG. 4 or 5). In these embodiments, changing the frequency of counter clock signal 542 may in some cases change the amplitude of the time interval measured by counter 530. In some of these embodiments, the counter clock signal frequency (period) may be independently set for each sensor in capacitive sensing area 115, or collectively set for each subset of sensors in capacitive sensing area 115, whereas in another of these embodiments the counter clock signal frequency (period) is collectively set for all sensors in capacitive sensing area 115. Examples of subsets are given further below. In other embodiments the frequency (period) of counter clock signal 542 is not configurable, for example, the frequency (period) may be implemented (e.g. hard coded/hard wired) or may be based on configurable and/or non-configurable operational parameters. For example, in one embodiment, the period (frequency) of counter clock 542 may be at least partly dependent on the period (frequency) of a gauging clock 846 which will be described below with reference to FIGS. 8 and 9.

Similarly, the frequency (period) of charge/discharge control 560 shown in timing diagram 612 of FIG. 6 or 7 is but one example of possible frequencies (periods) of charge/discharge control 560. In one embodiment, twice the selected frequency of charge/discharge control signal 560 (i.e. half the charge/discharge period) should be sufficient to allow voltage 518 across capacitive sensor 502 to reach the selected high voltage 519 during the charging of capacitive sensor 502 and/or to reach the selected low voltage 517 during the discharging of sensor 502. In some embodiments, the frequency (period) of charge/discharge control signal 560 is configurable, for example via clock control register 450 (see FIG. 4 or 5). In some of these embodiments, the charge/discharge cycle frequency (period) may be independently set for each sensor in capacitive sensing area 115, or collectively set for each subset of sensors in capacitive sensing area 115, whereas in another of these embodiments the charge/discharge cycle frequency (period) is collectively set for all sensors in capacitive sensing area 115. Examples of subsets are given further below. In other embodiments the frequency (period) of charge/discharge signal 560 is not configurable, for example, the frequency (period) may be implemented (e.g. hard coded/hard wired) or may be based on configurable and/or non-configurable operational parameters. For example, in one embodiment, the period (frequency) of charge/discharge signal 560 may be at least partly dependent on the period (frequency) of a gauging clock 846 which will be described below with reference to FIGS. 8 and 9.

As mentioned above, in some embodiments the period (frequency) of counter clock 542 and/or the period (frequency) charge/discharge frequency 560 may be at least partly dependent on an (internal) gauging clock 846 generated by clock generator 444. Depending on the embodiment, gauging clock 846 may not include clock jitter or may include clock jitter always or selectively, for example in order to attempt to reduce electro-magnetic interference. In some embodiments, clock jitter is configurable, for example using a configurable jitter generator register 452 (see FIG. 4 or 5). For example in one embodiment, via jitter generator register 452, clock jitter may be enabled or disabled (i.e. turned on/off) and a jitter value may be configured which will be applied to gauging clock 846.

In some embodiments, it may be implemented that jitter is not added to gauging clock 846 or that jitter is always added to the gauging clock 846. In some embodiments, jitter may additionally or alternatively be based on configurable and/or non-configurable operational parameters. Therefore jitter generator register 452 may in some cases be omitted from capacitive detection system 100.

Figure 9:
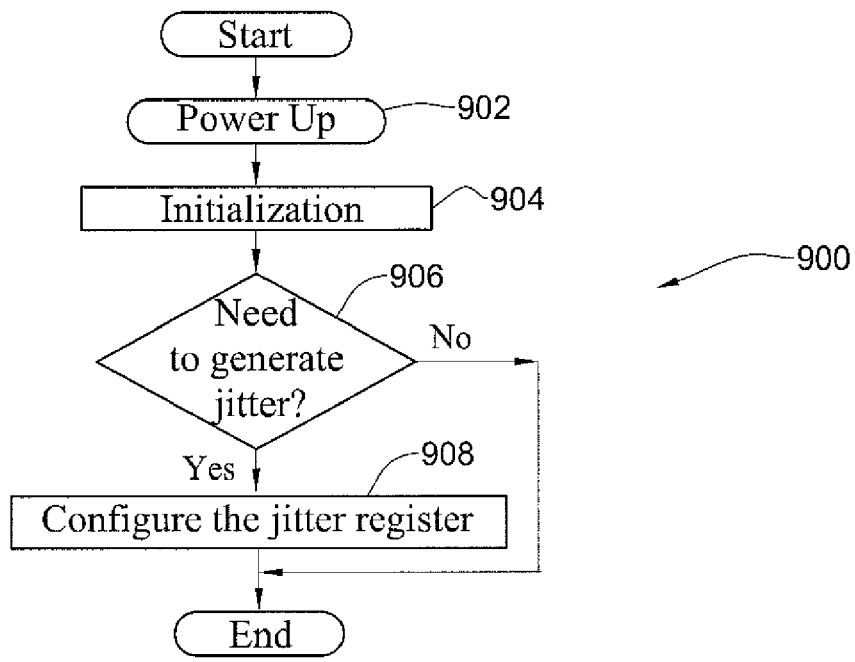
FIG. 9 is a flowchart of a method for configuring jitter, according to an embodiment of the present invention.

Refer to FIG. 9 which is a flowchart of a method 900 for configuring jitter according to an embodiment of the present invention. The stages illustrated in method 900 may be performed in a different order than shown in FIG. 9 and/or more than one stage may be performed simultaneously, in other embodiments.

In the illustrated embodiment of FIG. 9, in stage 902 there is a power up of capacitive detection system 100. In stage 904 there is an initialization. Initialization may include any action(s) appropriate for the embodiment. For example in some embodiments, initialization includes configuration of operational parameter(s) in clock module 340. Continuing with the example, in one embodiment any of the following inter-alfa may be configured: jitter enable/disable, jitter value, clock divider value, high voltage level, low voltage level, counter clock period (frequency), charge/discharge period (frequency), counter enable mode, number of charge/discharge cycles in accumulation cycle, charging and discharging enabling/disabling, auto/manual mode, new set ready halt state, predefined interval between reads, and/or begin cycle. An operational parameter can be configured independently for each sensor, collectively for each subset of sensors, or collectively for all sensors, as discussed above. In stage 906, controller 145 determines whether jitter is desirable. Jitter may be desirable for any reason, depending on the embodiment. In the embodiment illustrated in FIG. 9 it is assumed that as a default jitter is disabled and therefore in stage 908 if there is a need to generate jitter, jitter generator register 452 is configured to enable jitter and set a jitter value, for example as part of the initialization of registers. If there is no need to generate jitter, stage 908 is skipped. Method 900 then ends.

Depending on the embodiment, jitter generator register 452 may never be configured or may be configured each time there is a power up or more frequently.

Figure 8:
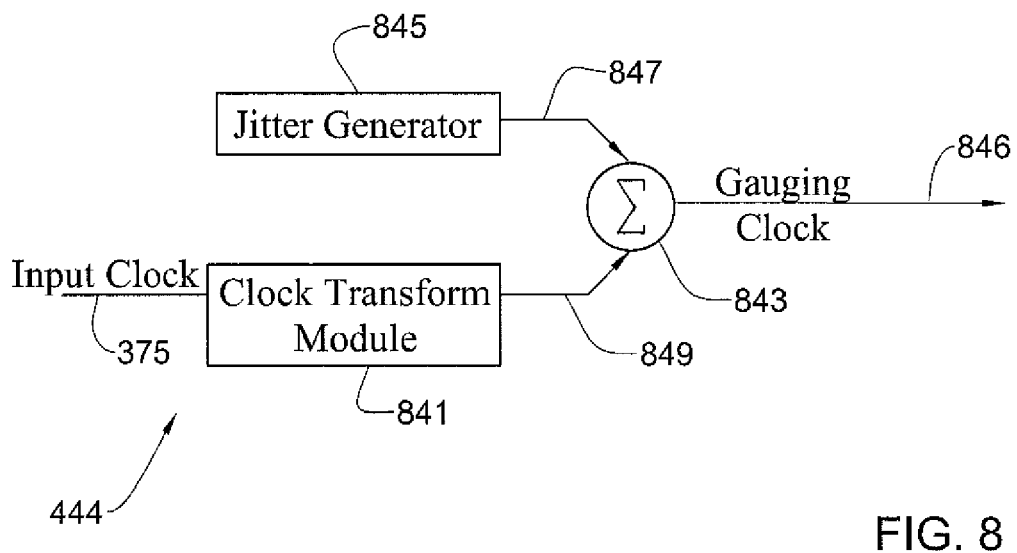
FIG. 8 is a block diagram of a clock generator, according to an embodiment of the present invention.

FIG. 8 is a block diagram of clock generator 444, optionally including jitter, according to an embodiment of the present invention. In the embodiment of FIG. 8, input clock 375 is inputted into clock transform module 841. A jitter generator module 845, if enabled by jitter generator register 452, generates a jitter 847 in accordance with the jitter value in jitter register 452. The transformed clock 849 (outputted by transform module 841 based on input clock 375) and optionally the generated jitter 847 are summed together by mixer module 843 to generate gauging clock 846.

In various embodiments, there may be a common jitter 847 for all sensors in capacitive sensing area 115 or for each subset of sensors in capacitive sensing area 115, or there may be an independent jitter 847 generated for each sensor. Therefore, in various embodiments jitter may be collectively enabled/disabled and jitter value set for all sensors in capacitive sensing area 115 or for each subset of sensors, or jitter may be enabled/disabled and jitter value set independently for each sensor. Examples of subsets are given further below.

In some embodiments of FIG. 8, clock transform module 841 applies an implemented transformation to input clock 375, generating transformed clock 849. For example in one embodiment, a clock divider value "Z" may be implemented which transform module 841 divides into the frequency of input clock 375 to yield the frequency of transformed clock 849. In other embodiments, the applied transformation is configurable. For example, in one embodiment, a clock divider value, "Z", for example in clock control register 450 (see FIG. 4 or 5) may be used to configure the frequency of transformed clock 849 in relation to the frequency of input clock 375 (for example the frequency of generated clock 849 signal=frequency of input clock 375 signal/Z). Continuing with the example, in one embodiment, the frequency (period) of transformed clock 849 is equal to that of input clock 375 as a default unless configured otherwise, for example by setting a clock divider value. In one embodiment, "Z" may be configured to a value greater than 1, and therefore if Z is configured, the frequency of transformed clock 849 is less than the frequency of input clock 375. In another embodiment "Z" may be configured to any value (i.e. causing the frequency of generated clock 849 to be larger, smaller, or equal to that of input clock 375, depending on the value of "Z").

In embodiments with a configurable clock divider value, the clock divider value may be set independently for each sensor in capacitive sensing area 115 or collectively for each subset of sensors in capacitive sensing area 115, whereas in another of these embodiments the clock divider value may be set collectively for all sensors in capacitive sensing area 115. Examples of subsets are given further below.

It should be noted that in an embodiment where no transformation is applied by clock transform 841 or the transformation is a transformation which does not change input clock 375 (for example multiplying by "1), then transformed clock 849 equals input clock 375. In an embodiment where there is no generated jitter, gauging clock 846 equals transformed clock 849.

In one embodiment, gauging clock 846 may be based on configurable and/or non-configurable operational parameters in addition to or instead of input clock 375, jitter 847 generated by jitter generator 845 and/or the transformation applied by clock transform 841. In one embodiment, gauging clock 846 may have an implemented value, for example a hard-coded/hardwired value.

In one embodiment, the frequency of counter clock 542 equals or is some other function of the frequency of gauging clock 846. In one embodiment, the frequency of charge/discharge control 560 equals or is some other function of the frequency of gauging clock 846. For example, the frequency of counter clock 542 and/or the frequency of charge discharge control 560 may increase with increased frequency of gauging clock 846, in some embodiments.

Referring again to FIG. 5, the output from counter 530 associated with sensor 502 is a time interval measurement 537 (for example in units" or "counts" of counter clock cycles or in other units), where time interval measurement 537 is one of time interval measurement(s) 337. Depending on the embodiment, the accumulation cycle may include any number (equal to or greater than one) of charge/discharge cycles during which a single instance of time interval measurement 537 is generated. For example, in one embodiment the time interval may be measured during which voltage 518 across charging capacitive sensor 502 ranges between low voltage level 517 and high voltage level 519 during a single charging of sensor 502, during a single discharging of sensor 502 or during a single charging and discharging of sensor 502. As another example, in one embodiment, counter 530 may run cumulatively, cumulatively measuring time intervals during which the voltage across capacitive sensor 502 ranges between low voltage level 517 and high voltage level 519 during a plurality of charges and/or discharges of capacitive sensor 502. Therefore, depending on the embodiment, time interval measurement 537 generated by counter 530 in one accumulation cycle may include the accumulation of time interval(s) over any number (equal to or greater than one) of charge/discharge cycles during which the voltage 518 across charging and/or discharging capacitive sensor 502 ranges between low voltage level 517 and high voltage level 519. The reader will understand that time interval measurement 537 is an example of gauging data associated with sensor 502, which is provided to controller module 145 for the embodiment illustrated in FIG. 5.

Assuming embodiments where a plurality of time intervals are cumulatively measured for sensor 502, there may or may not be a variation in one or more operational parameters between measurements. For example, depending on the embodiment, any of the following inter-alia may or may not vary between measurements: counter clock 542, charge/discharge control mode, value of low voltage level 517, value of high voltage level 519, and/or charge/discharge control signal 560.

In some cases, there may be an advantage to an embodiment having time interval measurement 537 include an accumulation of a plurality of measured time intervals during which the voltage across a charging and/or discharging sensor 502 ranges between low level 517 and high level 519 (over a plurality of charges and/or discharges of sensor 502). For example, in some of these cases the accumulation of a plurality of measured time intervals improves the likelihood of time interval measurement 537 being affected by small changes in the capacitance of capacitive sensor 502. Continuing with the example, assume there is a small change in capacitance due to an object for example touching the cover of an input device which at least includes capacitive sensing module 115. In this example, if time interval measurement 537 is measured over one charging and/or discharging of sensor 502 a small and possibly negligible change in time interval measurement 537 may in some cases result. Still continuing with the example, however if time interval measurement 537 is instead cumulatively measured over a plurality of charges and/or discharges of sensor 502, a larger and possibly more easily recognizable change in time interval measurement 537 may in some cases result.

In some embodiments, there may be an implemented number of charge/discharge cycles (equal to or greater than one) in the accumulation cycle during which time interval(s) are cumulatively measured by counter 530, or the number of charge/discharge cycles in an accumulation cycle may be dependent on configurable and/or non-configurable operational parameters. In some embodiments, the number of charge/discharge cycles per accumulation cycle may be configurable, for example via clock control register 450 (see FIG. 4 or 5). In some of these embodiments, the number of charge/discharge cycles per accumulation cycle may be independently set for each sensor in capacitive sensing area 115 or collectively set for each subset of sensors in capacitive sensing area 115, whereas in another of these embodiments the number of charge/discharge cycles per accumulation cycle is collectively set for all sensors in capacitive sensing area 115. Examples of subsets are given further below Refer to FIG. 10, which shows timing diagrams when the accumulation cycle includes s charge/discharge cycle(s), according to an embodiment of the present invention.

Figure 10:
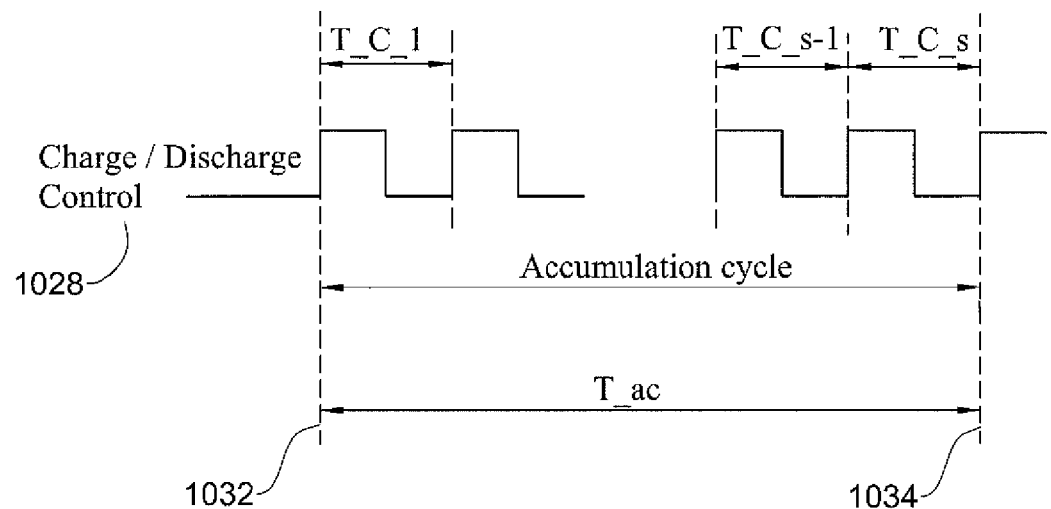
FIG. 10 illustrates timing diagrams of an accumulation cycle, according to an embodiment of the present invention.

At time 1032, an accumulation cycle begins. The accumulation cycle includes s charge/discharge cycles (where $s \geqq 1$), where as explained above in various embodiments s may be configured via clock control register 450, may be implemented, or may be dependent on configurable and/or non-configurable operational parameters. Timing diagram 1028 illustrates the s charge/discharge cycles. During the s charge/discharge cycles, time intervals are cumulatively measured as discussed above. At time 1034, after s charge/discharge cycles the accumulation cycle ends. The period of the accumulation cycle T_ac therefore equals the time difference between time point 1034 and time point 1032. The number of charge/discharge cycles included in the accumulation cycle is not limited by the invention and the number illustrated in FIG. 10 is but one example. In the embodiment illustrated in FIG. 10, it is assumed for simplicity's sake that each charge/discharge cycle is of equal duration, however in another embodiment the durations may vary. In one embodiment, each charge/discharge cycle shown in timing diagram 1028 may be associated with timing diagrams described with reference to FIG. 6 and/or 7.

Referring again to the embodiment of FIG. 4, the operations of gauging module 105 with reference to a plurality of X and/or Y capacitive sensors assumed for the purposes of the current discussion to be included in capacitive sensing area 115 will now be further elaborated on.

Depending on the embodiment there may or may not be variation among sensors in capacitive sensing area 115 in any of the following inter-glia: period (frequency) of counter clock, inclusion or exclusion of jitter and/or jitter value, number of time intervals cumulatively measured (i.e. the number of charge/discharge cycles in the accumulation cycle), value of low voltage level, value of high voltage level, triggering level (high or low) of a signal, counter enable mode (i.e. during sensor charge, discharge or both), period (frequency) of the charge/discharge control signal, etc. For example, in some embodiments variation may in some cases be allowed among sensors whose gauging data are provided to controller 145 separately and/or processed separately by controller 145. As another example, in one embodiment variation may be allowed among sensors because controller 145 knows how to compensate for any variation among sensors and/or because the variations may cancel each other out. As another example, in some embodiments variation due to differences among modules associated with different sensors, may be tolerated as long as the variations do not affect the results of presence and/or position detection performed by controller 145. Continuing with the example, in one of these embodiments, differences in calibration values (for example gauging data generated by different counters when no object for example is near capacitive sensing area 115) may be taken into account by controller 145 so that the differences do not affect the presence and/or position detection.

Depending on the embodiment, the charging and discharging of all n (n>1) sensors in capacitive sensing area 115 may be enabled, or the charging and discharging of at least one of the n sensors may be disabled, for example with at least one sensor remaining discharged. For example in one embodiment considering sensor 502 of FIG. 5, if charging and discharging of sensor 502 is enabled then charge/discharge control 560 is generated, whereas if charging and discharging of sensor 502 is disabled then charge/discharge control 560 is not generated. For example, in some embodiments, the enabling or disabling of the charging and discharging of sensors may be configurable, for example via setup/status register 454. In some of these embodiments, the charging and discharging of each sensor in capacitive sensing area 115 may be independently enabled or disabled, or the charging and discharging for each subset of sensors in capacitive sensing area 115 may be collectively enabled or disabled, whereas in another of these embodiments the charging and discharging of all sensors in capacitive sensing area 115 may be collectively enabled or disabled. Examples of subsets are given further below. For example, in one of these embodiments, the charging and discharging of different subsets may be alternately enabled in sequence, with the charging and discharging of the other subsets remaining disabled until the turn thereof in the sequence. In another embodiment the enabling or disabling of sensor charging and discharging is not configurable, for example, the enabling or disabling may be implemented (for instance charging and discharging may always be enabled) or the enabling/disabling may be based on configurable and/or non-configurable operational parameters.

Depending on the embodiment, the charging and/or discharging of each sensor in capacitive sensing area 115 with enabled charging and discharging may or may not be synchronized (i.e. time 614 and/or 620 for a particular capacitive sensor may or may not be synchronized with the charge and/or discharge times for other sensors). In some embodiments, counters 430 corresponding to the various sensors retain the gauging data thereof until being read or additional memory (counter or otherwise) may be used to store gauging data and therefore synchronization of charging and discharging of sensors with enabled charging and discharging may not necessarily be required in these embodiments. In one of these embodiments, as long as the gauging data for each sensor whose gauging data is being provided in parallel to controller 145 is ready in time for being provided, synchronization among the sensors is not necessarily required. In another of these embodiments, there may additionally or alternatively be allowed asynchrony among sensors with enabled charging and discharging whose gauging data are provided to controller 145 separately and/or processed separately by controller 145.

To further illustrate synchrony or asynchrony, two embodiments are now presented which should not be construed as limiting. In a first embodiment, all sensors with enabled charging and discharging are charged and discharged in parallel, although not necessarily synchronously (i.e. times 614 and 620 of FIG. 6 are not necessarily synchronized for all enable sensors). In a second embodiment, a subset of sensors charge when charge/discharge control signals 360 are high and discharge while charge/discharge control signals 360 are low, whereas a different subset charges when charge/discharge control signals 360 are low and discharges when charge/discharge control signals 360 are high. Continuing with this second embodiment, for example, X sensors (or Y sensors) with enabled charging and discharging may charge on a high level of charge/discharge control signals 360 and discharge on a low level of charge/discharge control signals 360 whereas the Y sensors (or X sensors) with enabled charging and discharging may charge on a low level of charge/discharge control signals 360 and discharge on a high level of charge/discharge control signals 360.

Figure 11:
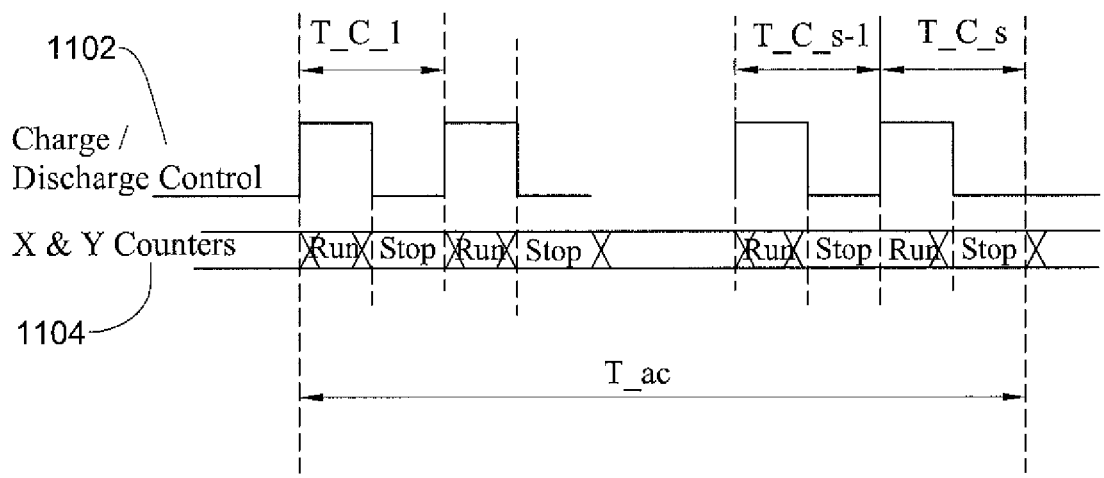
FIG. 11 illustrates timing diagrams relating to counters associated with X sensors and Y sensors, according to an embodiment of the present invention.
Figure 12:
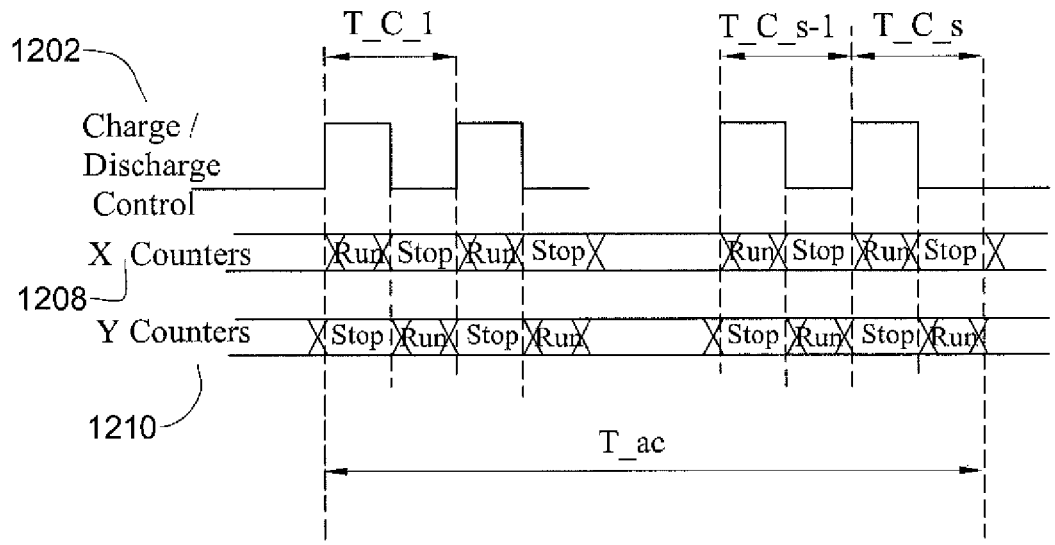
FIG. 12 illustrates timing diagrams relating to counters associated with X sensors and Y sensors, according to an embodiment of the present invention.
Figure 13:
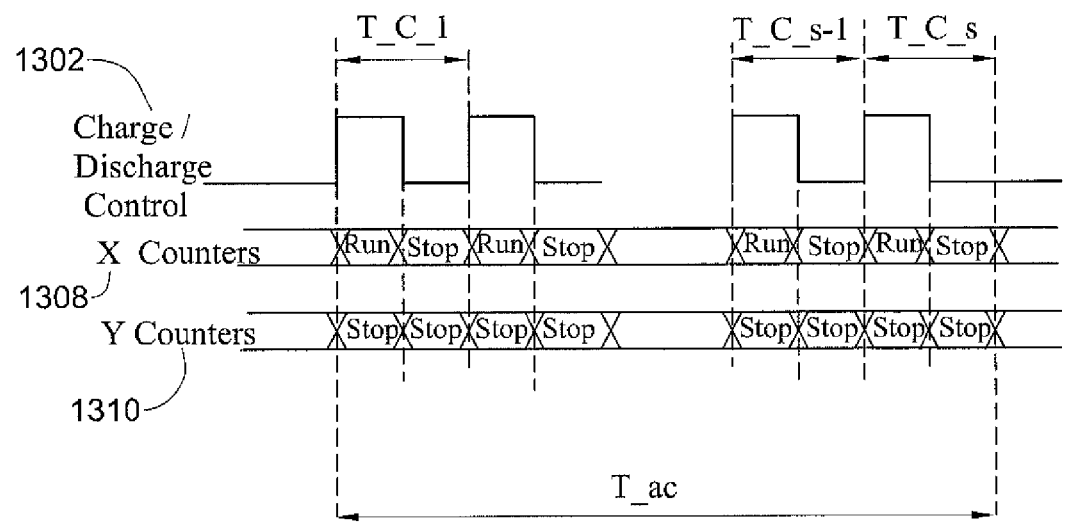
FIG. 13 illustrates timing diagrams relating to counters associated with X sensors and Y sensors, according to an embodiment of the present invention.

As described above with reference to FIGS. 6 and 7, in various embodiments the counter associated with a sensor may (cumulatively) measure the time interval when the voltage of the sensor ranges between the low and high reference levels during the charge and/or during the discharge of the sensor. Also from the discussion above, in one embodiment a sensor with enabled charging and discharging may charge when the charge/discharge signal is high and discharge when the charge/discharge signal is low, whereas in another embodiment a sensor with enabled charging and discharging may charge when the charge/discharge signal is low and discharge when the charge/discharge signal is high. Therefore a plurality of possible timing diagrams is possible when discussing the operation of a plurality of sensors. FIGS. 11, 12 and 13 illustrate examples which should not be construed as typical or exhaustive.

In FIG. 11 are timing diagrams relating to counters 430 corresponding to X sensor(s) and Y sensor(s) with enabled charging and discharging, according to an embodiment of the present invention. As should be understood from the discussion above, charging and discharging of all sensors in capacitive sensing area 115 may be enabled, or charging and discharging of less than all sensors may be enabled depending on the embodiment. For simplicity it is assumed that charge/discharge control signal 360 and the period of the accumulation cycle are the same for all the sensors with enabled charging and discharging.

Timing diagram 1102 illustrates the charge discharge control signal 360 over the time included in one accumulation cycle (where the period of the accumulation cycle equals T_ac). Timing diagram 1104 illustrates the running (enabling) and stopping (disabling) over time of counters 430 relating to X sensor(s) and Y sensor(s) with enabled charging and discharging. In one embodiment, X sensors and Y sensors with enabled charging and discharging are charged (when charge/discharge control signal 360 is high) and discharged (when charge/discharge control signal 360 is low) in parallel although not necessarily synchronously. In this embodiment the counters run when the sensors are charging and the voltage ranges between low voltage level and high voltage level, cumulatively measuring time intervals for the X-sensors and Y sensors with enabled charging and discharging, for example as in FIG. 6. In another embodiment, X sensors and Y sensors with enabled charging and discharging are charged (when charge/discharge control signal 360 is low) and discharged (when charge/discharge control signal 360 is high) in parallel although not necessarily synchronously. In this embodiment the counters run during the discharging (when the voltage ranges between low voltage level and high voltage level), cumulatively measuring time intervals for the X-sensors and Y sensors with enabled charging and discharging.

Depending on the embodiment, earlier accumulation cycles or later accumulation cycles may or may not resemble the accumulation cycle illustrated in FIG. 11. For example, in some cases there may be variation in any operational parameters among accumulation cycles.

In FIG. 12 are timing diagrams relating to counters 430 corresponding to X sensor(s) and Y sensor(s) with enabled charging and discharging, according to an embodiment of the present invention. In the embodiment illustrated in FIG. 12, counter(s) relating to X sensor(s) and counter(s) related to Y sensor(s) run sequentially. As should be understood from the discussion above, charging and discharging of all sensors in capacitive sensing area 115 may be enabled, or charging and discharging of less than all sensors may be enabled depending on the embodiment. For simplicity it is assumed in the embodiment of FIG. 12 that charge/discharge control signal 360 and the period of the accumulation cycle are the same for all the sensors with enabled charging and discharging.

Timing diagram 1202 illustrates the charge discharge control signal 360 over the time included in one accumulation cycle (where the period of the accumulation cycle equals T_ac). Timing diagram 1208 illustrates the running (enabling) and stopping (disabling) over time of counter(s) 430 relating to X sensor(s) with enabled charging and discharging. Timing diagram 1210 illustrates the running (enabling) and stopping (disabling) over time of counter(s) 430 relating to Y sensor(s) with enabled charging and discharging. In one embodiment, X sensors and Y sensors with enabled charging and discharging are charged (when charge/discharge control signal 360 is high) and discharged (when charge/discharge control signal 360 is low) in parallel although not necessarily synchronously. However in this embodiment the counters relating to X sensors run when the sensors are charging and the voltage ranges between low voltage level and high voltage level, cumulatively measuring time intervals for the X-sensors with enabled charging and discharging, for example as in FIG. 6. In this embodiment the counters relating to Y sensors run when the sensors are discharging and the voltage ranges between low voltage level and high voltage level, cumulatively measuring time intervals for the Y-sensors with enabled charging and discharging, for example as in FIG. 7. In another embodiment, X sensors and Y sensors with enabled charging and discharging are charged (when charge/discharge control signal 360 is low) and discharged (when charge/discharge control signal 360 is high) in parallel although not necessarily synchronously. However in this embodiment the counters relating to the X sensors run during the discharging (when the voltage ranges between low voltage level and high voltage level), cumulatively measuring time intervals for the X-sensors with enabled charging and discharging, and the counters relating to the Y sensors run during the charging (when the voltage ranges between low voltage level and high voltage level), cumulatively measuring time intervals for the Y-sensors with enabled charging and discharging. In another embodiment, X sensors with enabled charging and discharging are charged and counters run, cumulatively measuring time intervals, when the charge/discharge control 360 is high and the voltage ranges between low voltage level and high voltage level (for example as in FIG. 6). In this embodiment, Y sensors with enabled charging and discharging are charged and counters run, cumulatively measuring time intervals, when the charge/discharge control 360 is low and the voltage ranges between low voltage level and high voltage level. In another embodiment, X sensors with enabled charging and discharging are discharged and counters run, cumulatively measuring time intervals, when the charge/discharge control 360 is high and the voltage ranges between low voltage level and high voltage level. In this embodiment, Y sensors with enabled charging and discharging are discharged and counters run, cumulatively measuring time intervals, when the charge/discharge control 360 is low and the voltage ranges between low voltage level and high voltage level (for example as in FIG. 7).

Depending on the embodiment, earlier accumulation cycles or later accumulation cycles may or may not resemble the accumulation cycle illustrated in FIG. 12. For example, in some cases there may be variation in any operational parameters among accumulation cycles.

In FIG. 13 are timing diagrams relating to counters 430 corresponding to X sensor(s) and Y sensor(s), according to an embodiment of the present invention. In the embodiment illustrated in FIG. 13, charging and discharging of at least one X sensor is enabled and charging and discharging of all Y sensors is disabled. For simplicity it is assumed in the embodiment of FIG. 13 that charge/discharge control signal 360 and the period of the accumulation cycle are the same for all the sensors with enabled charging and discharging.

Timing diagram 1302 illustrates the charge discharge control signal 360 over the time included in one accumulation cycle (where the period of the accumulation cycle equals T_ac). Timing diagram 1308 illustrates the running (enabling) and stopping (disabling) over time of counter(s) 430 relating to X sensor(s). In one embodiment, the running of counters for X sensor(s) occurs during the charging of the sensor(s) when charge/discharge control 360 is high and the voltage across a sensor ranges between a certain low voltage and a certain high voltage level—see for example FIG. 6. However in another embodiment the running of counter(s) for X sensor(s) occurs during the discharging of the sensor(s) when charge/discharge control 360 is high and the voltage across a sensor ranges between a certain low voltage and a certain high voltage level. Timing diagram 1310 illustrates the stopping (disabling) over time of counter(s) 430 relating to Y sensor(s) due to the charging and discharging being disabled. In another embodiment, charging and discharging of the Y sensor(s) may be enabled and charging and discharging of the X sensor(s) disabled.

Depending on the embodiment, earlier accumulation cycles or later accumulation cycles may or may not resemble the accumulation cycle illustrated in FIG. 13. For example, in some cases there may be variation in any operational parameters among accumulation cycles. Continuing with the example, depending on the embodiment, in earlier accumulation cycles or later accumulation cycles charging and discharging for X sensor(s) may or may not be enabled and charging and discharging for Y sensor(s) may or may not be disabled. For instance in one embodiment, during the following accumulation cycle, charging and discharging of all X sensors may be disabled and charging and discharging of at least one Y sensor may be enabled, charging and discharging of at least one X sensor may be enabled and charging and discharging of all Y sensors may be disabled, charging and discharging of at least one X sensor and at least one Y sensor may be enabled, etc.

Referring again to FIG. 1, controller 145 and controller interface 155 will now be discussed in more detail. As mentioned above, controller 145 may comprise any combination of software, hardware and/or firmware capable of performing the functions as defined and explained herein. For example in one embodiment, controller 145 includes a state machine. For example, in one embodiment, controller 145 includes an embedded (micro) controller.

In one embodiment, capacitive gauging module 105 provides gauging data to controller module 145 via controller interface 155 which allows controller module 145 to detect presence and/or position of a finger or other object. The gauging data may be for example measured time interval(s)

337 as discussed above or for example may be other data that represents (is a function) of capacitances of one or more capacitive sensors in capacitive sensing area 115. For example, the gauging data may be voltages, currents, other time measurements, etc which are functions of capacitance and can therefore be used by controller module 145 to detect presence and/or position of a finger or other object.

Gauging data may be pushed or pulled to controller module 145, depending on the embodiment. For simplicity's sake, the description below refers to controller 145 "reading" the gauging data, or the gauging data being "received", "input" or "provided", and these terms should be understood to include both embodiments where the gauging data is pushed and embodiments where the gauging data is pulled. Depending on the embodiment, controller module 145 may determine when the gauging data should be input into controller module 145, capacitive gauging module 145 may determine when the gauging data should be input into controller module 145, or the timing may be determined by either or both.

Depending on the embodiment, controller 145 may receive gauging data related to all n sensors in capacitive sensing area 115 in parallel (although not necessarily synchronously) or may receive gauging data related to less than all n sensors in parallel (although not necessarily synchronously).

In some embodiments, for example, controller 145 receives in parallel gauging data relating to all sensors, even sensors (if any) with disabled charging and discharging. For example, referring to FIG. 13, in one of these embodiments, controller 145 receives gauging data related to X-sensors and Y-sensors even though charging and discharging are disabled for the Y sensors. In some of these embodiments, the gauging data for sensors with disabled charging and discharging has negligible impact on the processing by controller 145. For example, in one of these embodiments, the values of gauging data related to sensors with disabled charging and discharging are such that the values have negligible impact on detection of presence and/or position. As another example, in one of these embodiments, controller 145 knows which sensors had charging and discharging disabled and therefore can ignore related gauging data.

In some embodiments, for example, controller 145 may receive gauging data in parallel only for sensors with enabled charging and discharging. For example, referring again to FIG. 13, in one of these embodiments, controller 145 may only receive gauging data related to X-sensors. Referring to FIG. 11 or 12, in some embodiments, for example, controller 145 may receive in parallel gauging data related to the X-sensors and Y-sensors whose charging and discharging are enabled, regardless of the counter enable mode of the sensors. In some embodiments, for example controller 145 may receive gauging data in parallel for all sensors whose gauging data is processed together, which in some cases may be at a separate time from gauging data relating to sensors whose gauging data is separately processed together. Continuing with the example, in one of these embodiments and assuming gauging data related to X-sensors is processed separately from gauging data related to Y sensors, gauging data relating to X sensors may be received in parallel and gauging data relating to Y sensors may be received in parallel, where X gauging data and Y gauging data may or may not be received in parallel. Still continuing with the example, in one of these embodiments, controller 145 may receive in parallel gauging data related to X sensors with enabled charging and discharging, or may receive in parallel gauging data related to all X sensors, regardless of whether charging and discharging are enabled or disabled.

In some embodiments, for example, controller 145 may receive gauging data in parallel for all sensors belonging to a subset such as one of the examples given below. For example, if the subset includes all sensors measuring time intervals in parallel, then referring to FIG. 11, in one of these embodiments gauging data related to X-sensors and Y-sensors may be received in parallel, whereas referring to FIG. 12, in another of these embodiments gauging data related to X sensors and Y sensors may be received separately.

For ease of description, sensors whose gauging data are received in parallel by controller 145 are termed a "group" even though the sensors in the group may not necessarily be similar. The group of sensors may include any number of sensors ranging from one to n (where n is the number of sensors in capacitive sensing area 115).

In an embodiment with more than one group of sensors in capacitive sensing area 115, receiving gauging data at separate times for different groups may be advantageous in some cases, for example if there are limitations on the throughput of interface 155.

In some embodiments, controller 145 computes or is configured to know (for example based on a predefined interval between receipts of gauging data) when gauging data relating to a group of sensors is ready, and reads the gauging data then, if desired. For example, in some of these embodiments, the predefined interval may be configurable, may be implemented (for example hardcoded/hardwired) and/or may be dependent on other configurable and/or non-configurable operational parameters. In some embodiments, a "new set ready" indication, for example in setup/status register 454, may be set by gauging module 105 when gauging data for a group is ready. In one of these embodiments, the "new set ready" indication may be cleared by controller 145, for example after controller 145 reads the gauging data. In another of these embodiments the "new set ready" indication may be cleared by gauging module 105, for example after a predefined number of counter clock cycles. In one of these embodiments, controller 145 checks the status of the new set ready indication (polling) and if the "new set ready" indication is set, controller 145 reads the gauging data, if desired. In one of these embodiments, controller 145 receives an interrupt generated by the new set ready indication when gauging data for a group is ready, and if desired, reads the gauging data. In an embodiment where there are more than one group of sensors whose gauging data is separately received by controller 145, each group may be associated with a distinct "new set ready" indication. In one embodiment, controller 145 may choose not to read gauging data when ready.

In some embodiments, the timing of beginning of each accumulation cycle is controlled by controller 145, with these embodiments termed hereinbelow "manual mode". In some embodiments, the timing of the beginning of each accumulation cycle is determined by gauging module 105, with these embodiments termed herein below "auto mode". In some embodiments the mode (auto or manual) is configurable, for example via mode register 448. In some of these embodiments, the mode (auto or manual) may be independently configurable for each sensor, collectively configurable for each subset of sensors, or collectively configurable for all sensors. Examples of possible subsets are given below. In another embodiment, the mode (auto or manual) is not configurable, for example implemented as either auto or manual mode and/or based configurable and/or non-configurable operational parameters.

In some embodiments, operation during auto mode may be halted by controller 145. In one of these embodiments, a halt state indication may be configured for example via mode register 448. In another of these embodiments, alternatively or additionally, operation may be halted by disabling the charging and discharging of sensor(s), for example via status setup register 454. In another of these embodiments, alternatively or additionally, operation may be halted by disabling input clock 375 to gauging module 105. In some embodiments, operation during manual mode may also be halted, for example by gauging module 105. In one of these embodiments, gauging module 105 may halt operation by disabling the charging and discharging of sensor(s), for example via status setup register 454, by setting the halt indication, for example via mode register 448 and/or by disabling input clock 375.

In some embodiments, when operation is halted, no charge/discharge control signals 360 are generated and/or the counter clock 442 is not supplied to the counters 430. In some embodiments, when it is no longer desirable to halt operation, the halt state indication may be cleared and/or the charging of sensor(s) enabled.

In some embodiments, an accumulation cycle may be started in manual mode by controller 145. In one embodiment, a begin cycle indication may be set for example via mode register 448. In another embodiment, alternatively or additionally, an accumulation cycle may be started by enabling the charging and discharging of sensors, for example via status setup register 454.

In some embodiments, controller 145 may configure operational parameters for system 100, for example any of operational parameters in clock module 340. As discussed above, in some embodiments, each particular operational parameter which is configurable (for example any of the following inter-alia: jitter enable/disable, jitter value, clock divider value, high voltage level, low voltage level, counter clock period (frequency), charge/discharge period (frequency), counter enable mode, number of charge/discharge cycles in accumulation cycle, charging and discharging enabling/disabling, auto/manual mode, new set ready, halt state, predefined interval between reads, and/or begin cycle/, may be configured independently for each sensor, collectively for each subset of sensors, or collectively for all sensors. Examples of subsets include inter-alia: all X-sensors, all Y-sensors, all even X-sensors, all even Y sensors, all odd X-sensors, all odd Y-sensors, all X and Y even sensors, all X and Y odd sensors, even X and odd Y sensors, even Y and odd X sensors, sensors in a particular area of the layout in capacitive sensing module 115, X sensors in a particular area of the layout, Y sensors in a particular area of the layout, all sensors charged or discharged in parallel, all sensors with the same counter enable mode, all sensors measuring time intervals in parallel, all sensors which are enabled, all X sensors which are enabled, all Y sensors which are enabled, all sensors whose gauging data are provided to controller 145 in parallel, all sensors whose gauging data are processed by controller 145 together, any combination of the above, etc. These examples of subsets should not be construed as limiting. It should be understood that the term subset does not necessarily imply that the sensors in the subset are similar. In some embodiments, one or more operational parameters may not be configurable, for example operational parameter(s) may be implemented or dependent on other configurable and/or non-configurable operational parameters.

To facilitate reader understanding, an example of "even" and "odd" sensors is presented now with reference back to FIG. 2A and using a convention of top-down and left-to-right. In one embodiment sensor 232 may be considered to be one of the "odd" Y sensors because sensor 232 is the first sensor in the last column, sensor 234 may be considered to be one of the "even" Y sensors because sensor 234 is the second sensor in the last column, sensor 236 may be considered to be one of the "odd" X sensors being the first sensor in the last row, and sensor 238 may be considered to be one of the "even" X sensors being the second sensor in the last row.

In one embodiment, gauging module 105 is capable of configuring at least one of the operational parameters in registers 448, 450, 452, and/or 454, additionally or alternatively to controller 145.

As mentioned above, the operational parameters discussed herein should not be construed as binding. In some embodiments there may be more, less and/or different configurable and/or non-configurable operational parameters than those discussed herein which affect operation of gauging module 105 and/or controller 145.

Figure 14:
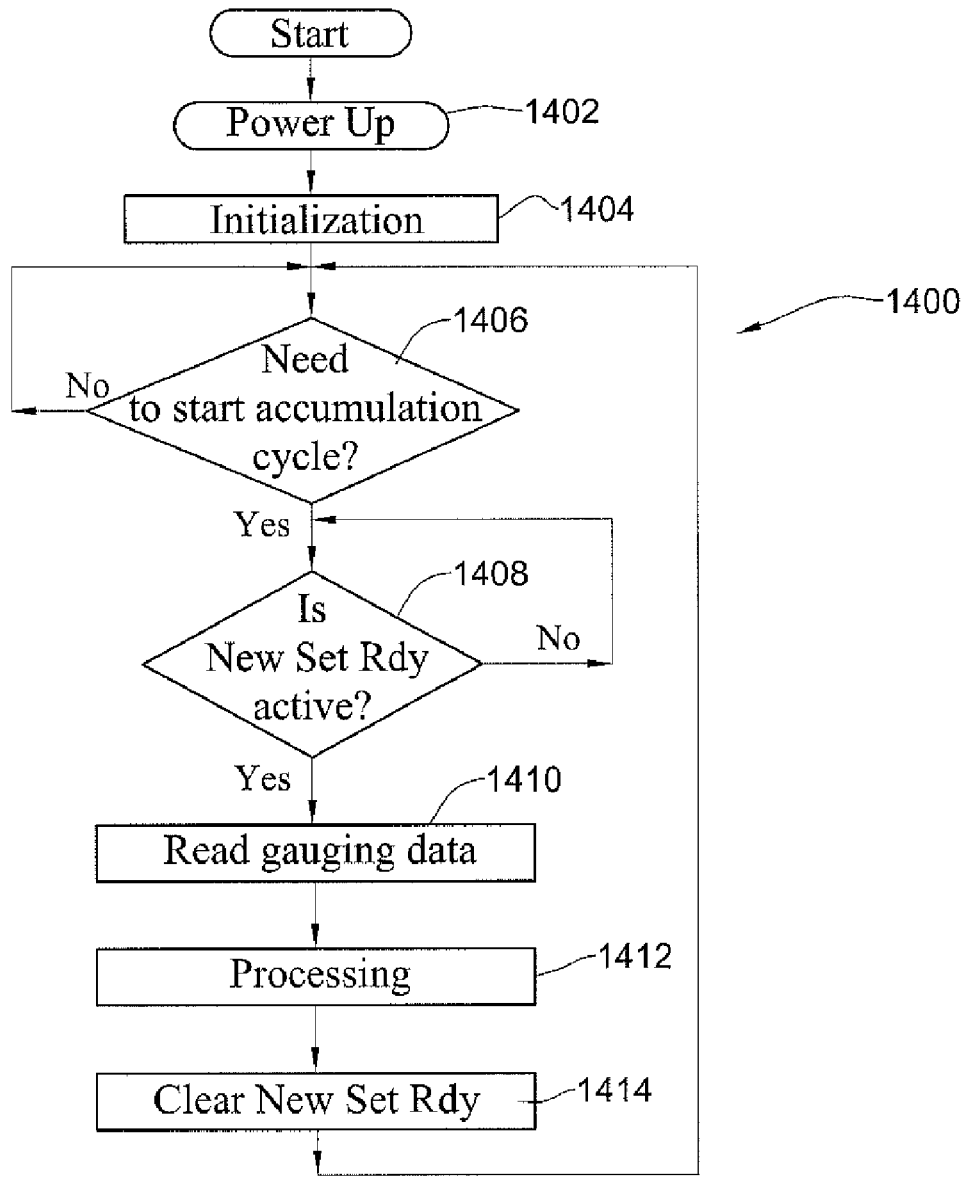
FIG. 14 is a flow chart of a manual mode method, according to an embodiment of the present invention.

FIG. 14 is a flowchart of a manual mode method 1400, according to an embodiment of the present invention. The stages illustrated in method 1400 may be performed in a different order than shown in FIG. 14 and/or more than one stage may be performed simultaneously, in other embodiments.

In stage 1402 of the embodiment illustrated in FIG. 14, there is a power up of capacitive detection system 100. In stage 1404 there is an initialization. Initialization may include any action(s) appropriate for the embodiment. For example in some embodiments, initialization includes configuration of operational parameter(s) in clock module 340. Continuing with the example, in one embodiment any of the following inter-alia may be configured: jitter enable/disable, jitter value, clock divider value, high voltage level, low voltage level, counter clock period (frequency), charge/discharge period (frequency), counter enable mode, number of charge/discharge cycles in accumulation cycle, charging and discharging enabling/disabling, auto/manual mode, new set ready, halt state, predefined interval between reads, and/or begin cycle. An operational parameter can be configured independently for each sensor, collectively for each subset of sensors, or collectively for all sensors, as discussed above. It is assumed that the mode is manual mode. For example in various embodiments, manual mode may be the only mode supported, may be the default mode, or may be the mode configured in stage 1404. In stage 1406, controller 145 determined whether an accumulation cycle should be started. If not (no to stage 1406), then method 1400 waits until an accumulation cycle should be started. If an accumulation cycle should be started (yes to 1406), then controller 145 causes the accumulation cycle to begin. For example, in some embodiments, controller 145 may set a begin cycle indication and/or enable the charging and discharging of sensor(s). Continuing with the example, in one of these embodiments, the begin cycle indication and/or enabling of sensors also causes associated counters 430 to be reset or otherwise become ready for a new count. Continuing with the example, in one of these embodiments, after determining that the begin cycle indication is set, gauging module 105 clears the begin cycle indication.

In some embodiments, during the accumulation period, gauging module 105 charges and discharges sensor(s) one or more times (equaling the number of charge/discharge cycles per accumulation cycle) and cumulatively generates gauging data. For example, in some of these embodiments each charge/discharge period may be associated with timing diagrams as discussed above with reference to FIG. 6 and/or 7, and/or operational parameters may affect operation as discussed above. When the accumulation cycle has ended, gauging module 105 may cease the charging and discharging, for example in one embodiment by ceasing the generation of charge/discharge control signal(s) 360 and/or counter clock 442. Continuing with the example, in one embodiment, gauging module 105 may halt operation by disabling charging and discharging and/or by setting the halt indication as discussed above.

As discussed above, depending on the embodiment, controller 145 may know that gauging data is ready, for example based on a predefined interval between reads, or gauging module 105 may set a "new set ready" indication when the gauging data is ready to be read. Assuming embodiments with the "new set ready" indication, if the "new set ready" indication is not set (no to stage 1408), then method 1400 waits until the "new set ready" indication is set. Assuming embodiments with the "new set ready indication", an interrupt to controller 145 may be generated by the "new set ready" indication or controller 145 may poll and realize that the "new set ready indication" is set (yes to stage 1408). If and when controller 145 desires, controller 145 may read the gauging data relating to the group of sensors associated with the set "new set ready" indication in stage 1410. For example, assuming an embodiment as in FIG. 4, controller 145 may read any of counters 430 corresponding to the group of sensors associated with the set "new set ready" indication. Continuing with the example, in an embodiment where the group includes all n sensors in capacitive sensing area 115, controller 145 reads all counters 430 in counter module 330. Still continuing the example, in an embodiment where the group includes all sensors with enabled charging and discharging, controller 145 reads counters 430 associated with sensors whose charging and discharging are enabled. In stage 1412, controller 145 processes the read gauging data. In stage 1414, assuming the usage of the "new set ready" indication, controller 145 clears the "new set ready indication". In one embodiment, clearing the "new set ready indication" causes counters 430 associated with the group to be reset or otherwise become ready for a new count. In an embodiment without the "new set ready" indication, stage 1414 may be skipped. In various embodiments, stage 1414 may occur before, after or simultaneously with stage 1412. Method 1400 then returns to stage 1406, with controller 145 determining when to trigger the next accumulation cycle.

In one embodiment of method 1400, controller 145 and/or gauging module 105 may configure or reconfigure any of the operational parameters of clock module 340 during any appropriate stage of method 1400.

Figure 15:
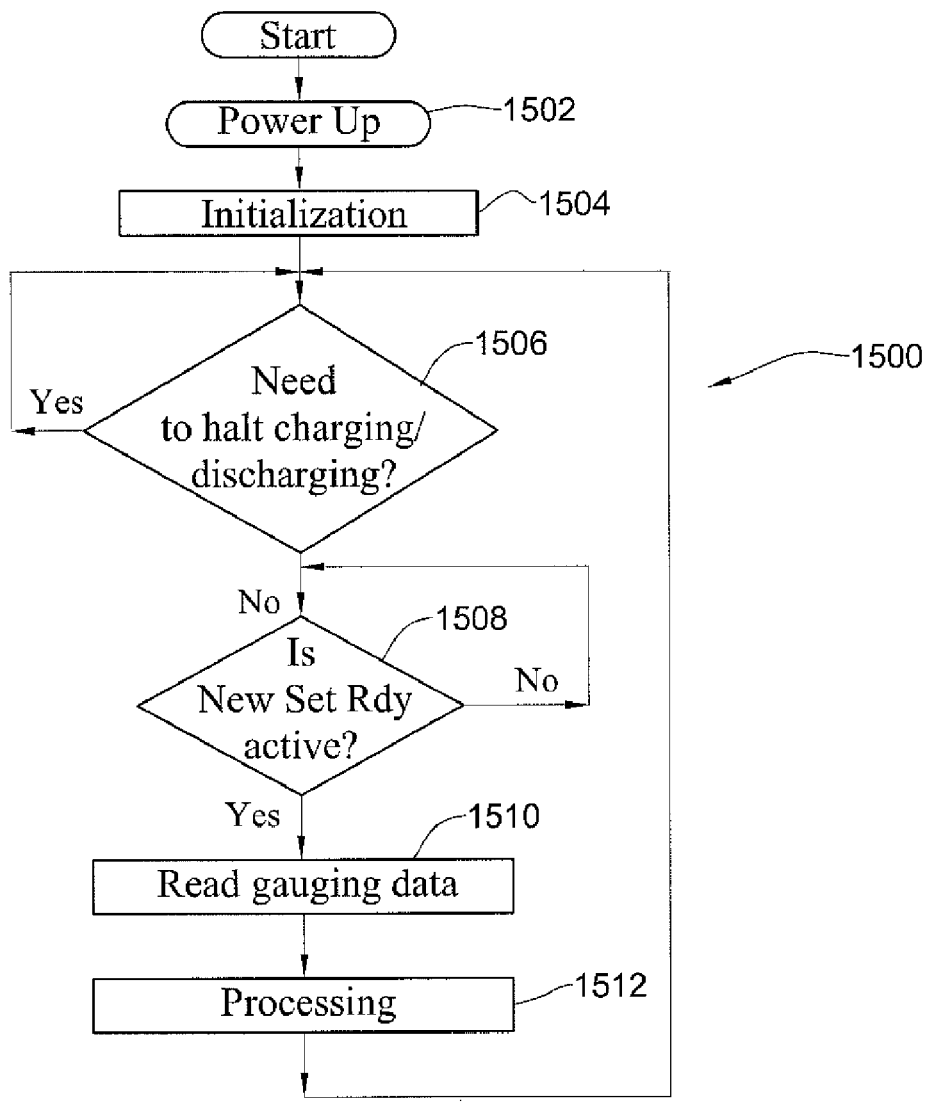
FIG. 15 is a flowchart of an automatic mode method, according to an embodiment of the present invention.

FIG. 15 is a flowchart of an auto mode method 1500, according to an embodiment of the present invention. The stages illustrated in method 1500 may be performed in a different order than shown in FIG. 15 and/or more than one stage may be performed simultaneously, in other embodiments.

In stage 1502 of the embodiment illustrated in FIG. 15, there is a power up of capacitive detection system 100. In stage 1504 there is an initialization. Initialization may include any action(s) appropriate for the embodiment. For example in some embodiments, initialization includes configuration of operational parameter(s) in clock module 340. Continuing with the example, in one embodiment any of the following inter-glia may be configured: jitter enable/disable, jitter value, clock divider value, high voltage level, low voltage level, counter clock period (frequency), charge/discharge period (frequency), counter enable mode, number of charge/discharge cycles in accumulation cycle, charging and discharging enabling/disabling, auto/manual mode, new set ready, predefined interval between reads, halt state and/or begin cycle. An operational parameter can be configured independently for each sensor, collectively for each subset of sensors, or collectively for all sensors, as discussed above. It is assumed that the mode is auto mode. For example in various embodiments, auto mode may be the only mode supported, may be the default mode, or may be the mode configured in stage 1504.

In stage 1506, controller 145 determines whether to halt charging and discharging. If controller 145 decides to halt charging and discharging (yes to stage 1506), then controller 145 causes charging and discharging to be halted, for example by disabling charging and discharging and/or by setting the halt indication as discussed above. If the decision is not to halt charging (no to stage 1506) then controller 145 does not cause charging and discharging to be halted. If the decision is to cease the halting of the charging and discharging (no to stage 1506), the controller 145 ceases halting charging and discharging, for example by clearing the halt indication and/or by enabling charging and discharging as discussed above. As long as operation has not been halted by controller 145, then in some embodiments during each accumulation cycle gauging module 105 charges and discharges sensor(s) one or more times (equaling the number of charge/discharge cycles per accumulation cycle) and cumulatively generates gauging data. For example, in some of these embodiments, each charge/discharge period may be associated with timing diagrams as discussed above with reference to FIG. 6 and/or 7, and/or operational parameters may affect operation as discussed above.

As discussed above, depending on the embodiment controller 145 may know that gauging data is ready, for example based on a predefined interval between reads, or gauging module 105 may set a "new set ready" indication when the gauging data is ready to be read. Assuming embodiments with the "new set ready" indication, if the "new set ready" indication is not set (no to stage 1508), method 1500 waits until the "new set ready" indication is set. Assuming embodiments with the "new set ready indication", an interrupt to controller 145 may be generated by the "new set ready" indication or controller 145 may poll and realize that the "new set ready indication" is set (yes to stage 1508). If and when controller 145 desires, controller 145 may read the gauging data relating to the group of sensors associated with the set "new set ready indication" in stage 1510 of the illustrated embodiment. For example, assuming an embodiment as in FIG. 4, controller 145 may read gauging data generated by counters 430. Continuing with the example, in an embodiment where the group includes all n sensors in capacitive sensing area 115, controller 145 may read gauging data generated by all counters 430 in counter module 330. Still continuing the example, in an embodiment where the group includes all sensors with enabled charging and discharging, controller 145 may read gauging data generated by counters 430 associated with sensors whose charging and discharging are enabled. In stage 1512, controller 145 processes the read gauging data. In some embodiments, gauging module 105 does not wait for controller 145 to read and process the gauging data before resetting counters 430 (or otherwise having counters 430 becoming ready for a new count) and beginning a new accumulation cycle. In some of these embodiments where there is a new set ready indication, gauging module 105 clears the new set ready indication, for example after a few counter clock cycles. In some of these embodiments where there is a new set ready indication, controller 145 may clear the new set ready indication after reading the data if not already cleared. In some of these embodiments, there may be memory, for example counters and/or other types of memory, for storing gauging data from the immediately preceding accumulation cycle while a current accumulation cycle is being executed and new gauging data is being generated. For example in some of these embodiments with memory, controller 145 always reads gauging data from the memory or reads gauging data from the memory if a new accumulation cycle has begun since the gauging data was ready. For example, in some of these embodiments with memory and counters 430, gauging data generated by counters 430 in a previous accumulation cycle may be set aside in memory while counters 430 generate gauging data in a new accumulation cycle.

In one embodiment of method 1500, controller module 145 or gauging module 105 may configure or reconfigure one or more operational parameters of clock module 340 at any appropriate stage of method 1500.

In some embodiments, controller module 145 may switch between manual and auto mode by reconfiguring mode register 448. For example, in one of these embodiments if before executing stage 1406 on an iteration of method 1400, the mode is reconfigured to auto mode, then stage 1506 and subsequent stages of method 1500 can follow instead. As another example, in one of these embodiments, if after executing stage 1506 the mode is reconfigured to manual mode, then stage 1406 and subsequent stages of method 1400 can follow.

In one embodiment stages 1402 and 1404 or stage 1502 and 1504 are performed in parallel with stages 902 and 908 discussed above with reference to FIG. 9.

Referring again to FIG. 1, the processing performed by controller 145 (for example in stage 1412 or 1512) in order to detect presence and/or position of an object and the interdependence, if any, between the reading of gauging data and the processing of gauging data, are not limited by the invention. For further illustration to the reader, however, some examples are now provided. In one embodiment, for example, all read gauging data is processed. In other embodiments, for example, only some of the read gauging data is processed. Continuing with the example in one of these other embodiments where it is assumed that read gauging data includes data related to sensors with disabled charging and discharging, data related to sensors with disabled charging and discharging is ignored. In one embodiment, for example, all gauging data that is read in parallel and designated for processing is processed together. In other embodiments, for example, all gauging data read in parallel and designated for processing is not necessarily processed together. Continuing with the example, in some of these other embodiments, gauging data read in parallel but relating to different subsets may in some cases be processed separately. Some examples of subsets were given above. Continuing with the example, in one of these other embodiments, read gauging data related to X-sensors is processed separately from read gauging data related to Y sensors. In various embodiments, controller module 145 may or may not separately receive gauging data which are to be processed separately (i.e. gauging data which are to be processed separately may in some cases be received in parallel). For example, assuming that gauging data corresponding to X-sensors is processed separately from gauging data corresponding to Y sensors, controller module 145 may receive gauging data corresponding to (one or more) X-sensors prior to processing the X-sensor gauging data, and receive gauging data corresponding to (one or more) Y-sensors prior to processing Y-sensor gauging data. Continuing with the example, in one embodiment controller module 145 may receive the X-sensor (or Y-sensor) gauging data, process the X-sensor (or Y-sensor) gauging data, then receive the Y-sensor (or X-sensor) gauging data prior to processing the Y-sensor (or X-sensor) gauging data, then receive the (new) X-sensor (or Y-sensor) gauging data and so forth. In another embodiment, controller module 145 may receive in parallel at least some gauging data which are processed separately, and separately process the gauging data, either in parallel or sequentially.

Referring again to FIG. 1, in some embodiments where controller module 145 detects the position of an object near capacitive sensing area 115, controller module 145, after detecting the position, translates the detected position into coordinates which are outputted. In these embodiments, the coordinates may be outputted to any appropriate module or modules, within and/or external to capacitive detection system 100, depending on the embodiment. For example, in some of these embodiments, the output may be to at least to a display, in order to display a position (for example of a cursor) on the display. In one of these embodiments, the coordinates may be outputted by controller module 145 via a USB interface, PS/2 interface, parallel interface, serial interface, or via any other appropriate interface. The coordinates outputted by controller module 145 may in some embodiments be converted to display coordinates by a host driver for example a host mouse driver such as Microsoft Windows® driver, a Linux® driver or any other operating system host driver.

In some embodiments where controller module 145 detects the presence of an object near capacitive sensing area 115, controller module 145 additionally or alternatively outputs an indication of whether presence has been detected. In these embodiments, the indication may be outputted to any appropriate module or modules, within and/or external to capacitive detection system 100, depending on the embodiment. For example, in some of these embodiments, the output may be to a display or to an event logger. In one of these embodiments, the indication related to presence detected may be outputted by controller module 145 via a USB interface, PS/2 interface, parallel interface, serial interface, or any other appropriate interface. In one embodiment, if a key on a keypad or keyboard includes capacitive sensing area module 115, then if presence is detected, a code corresponding to the key may be outputted by controller module 145.

In some embodiments, the results of the position and/or presence detection by controller 145 may affect operation of gauging module 105 and/or controller 145.

Figure 16:
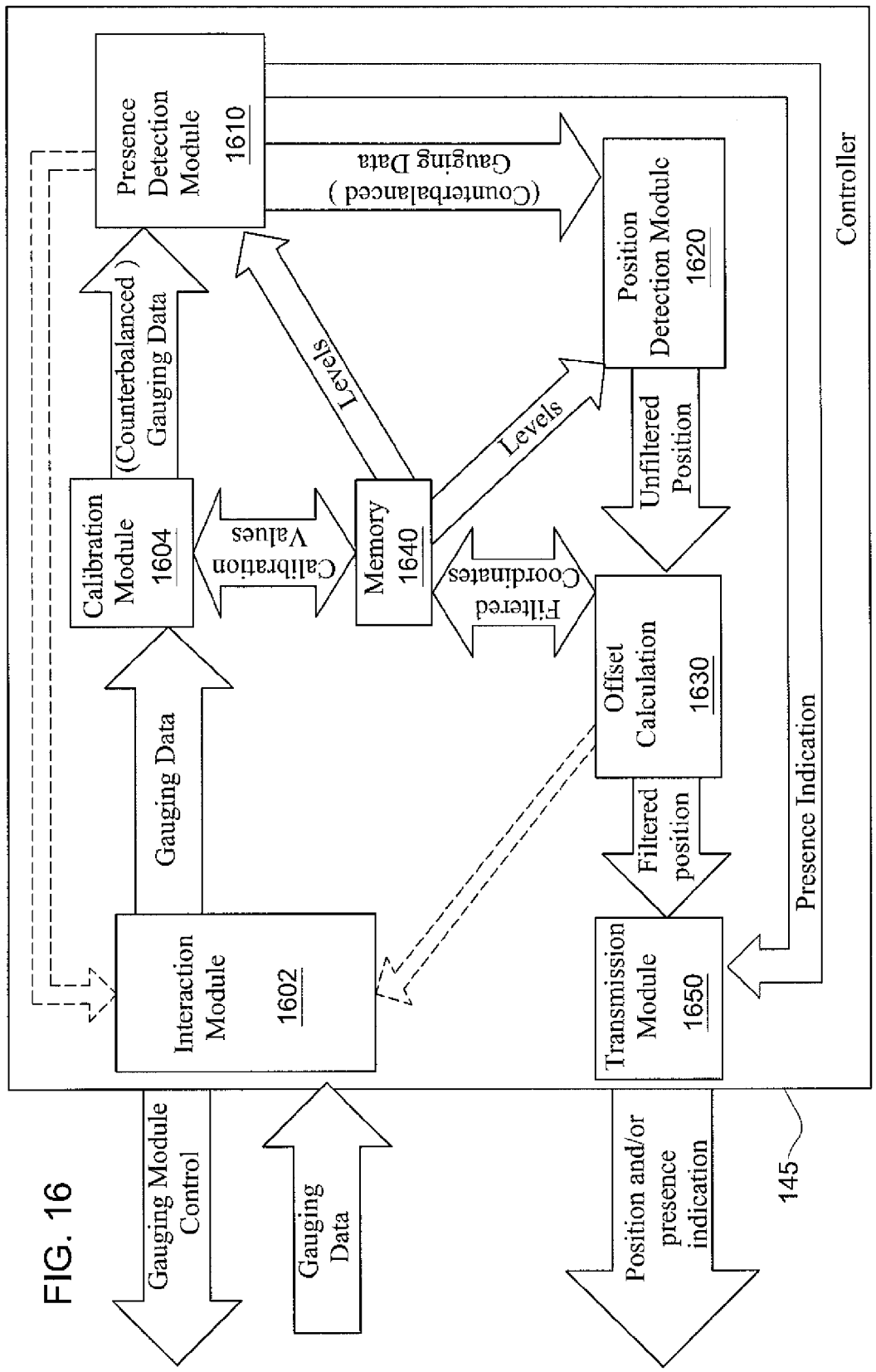
FIG. 16 is a block diagram of a controller module, according to an embodiment of the present invention.

FIG. 16 is a block diagram of controller module 145, according to one embodiment of the present invention. In the embodiment illustrated in FIG. 16, controller module 145 receives gauging data from gauging module 105 and controls gauging module 105, for example by configuring operational parameters in gauging module 105 as described above. In the illustrated embodiment, controller module 145 uses the received gauging data to detect presence and/or position of an object, for example near capacitive sensing module 115. In the illustrated embodiment, controller module 145 outputs data, for example coordinates of the detected position of an object and/or an indication of whether the presence of an object is detected.

It should be noted that in some embodiments of the invention, controller module 145 is configured to detect presence and/or position of an object based on received gauging data, regardless of the functionality included in gauging module 105 and regardless of the format or content of the gauging data. In some of these embodiments, as long as the gauging data are monotonic functions of the capacitances of the sensors, controller module 145 may use the gauging data to detect presence and/or position.

For example, gauging data are monotonic functions of capacitances in the following cases:

$x \geq y$, then $f(x) \geq f(y)$ (y) (monotonically increasing—i.e. gauging data preserves order relations of capacitances) OR $x < y$, then $f(x) \geq f(y)$ (monotonically decreasing—i.e. gauging data reverses order relations of capacitances).

In other of these embodiments, gauging data may be monotonic or non-monotonic functions of capacitances.

In the embodiment illustrated in FIG. 16, controller module 145 includes an interaction module 1602, a calibration module 1604, a presence detection module 1610, a position detection module 1620, an offset calculation module 1630, memory 1640 and a transmission module 1650. In one embodiment interaction module 1602 is configured to interact with gauging module 105 via interface 155, for example configuring operational parameters, optionally beginning and/or halting the charging and discharging, receiving gauging data, etc as described herein. Each of modules 1602, 1604, 1610, 1620, 1630, 1640 and 1650 may be made up of any combination of software, hardware and/or firmware capable of performing the functions as defined and explained herein. Modules 1602, 1604, 1610, 1620, 1630, 1640, and 1650 will be discussed in more detail with reference to FIGS. 17, 22, and 24. It should be recalled that as mentioned above the block diagram of FIG. 16 is but one example and in some embodiments of the invention, controller 145 may comprise fewer, more, and/or different blocks than illustrated in FIG. 16. For example in one of these embodiments, calibration module 1604 is omitted because calibration values are not computed (see below stage 1702 and 1706 of FIG. 17). As another example, in one of these embodiments offset calculation module 1630 is omitted because filtering is not performed (see below stage 1722 of FIG. 17) and/or because position detection is not performed (see below description of method 1700). As another example, in one of these embodiments, position detection module 1620 may be omitted because position detection is not performed (see below description of method 1700). In some embodiments of the invention, the functionality of controller 145 may be divided differently into the blocks illustrated in FIG. 16. In some embodiments of the invention, the functionality of controller 145 may be divided into fewer, more and/or different blocks than shown in FIG. 16. In some embodiments of the invention, controller 145 may include additional, less and/or different functionality than described herein. In some embodiments of the invention, one or more of 1602, 1604, 1610, 1620, 1630, 1640, and/or 1650 herein may have more, less and/or different functionality than described herein.

Figure 18:
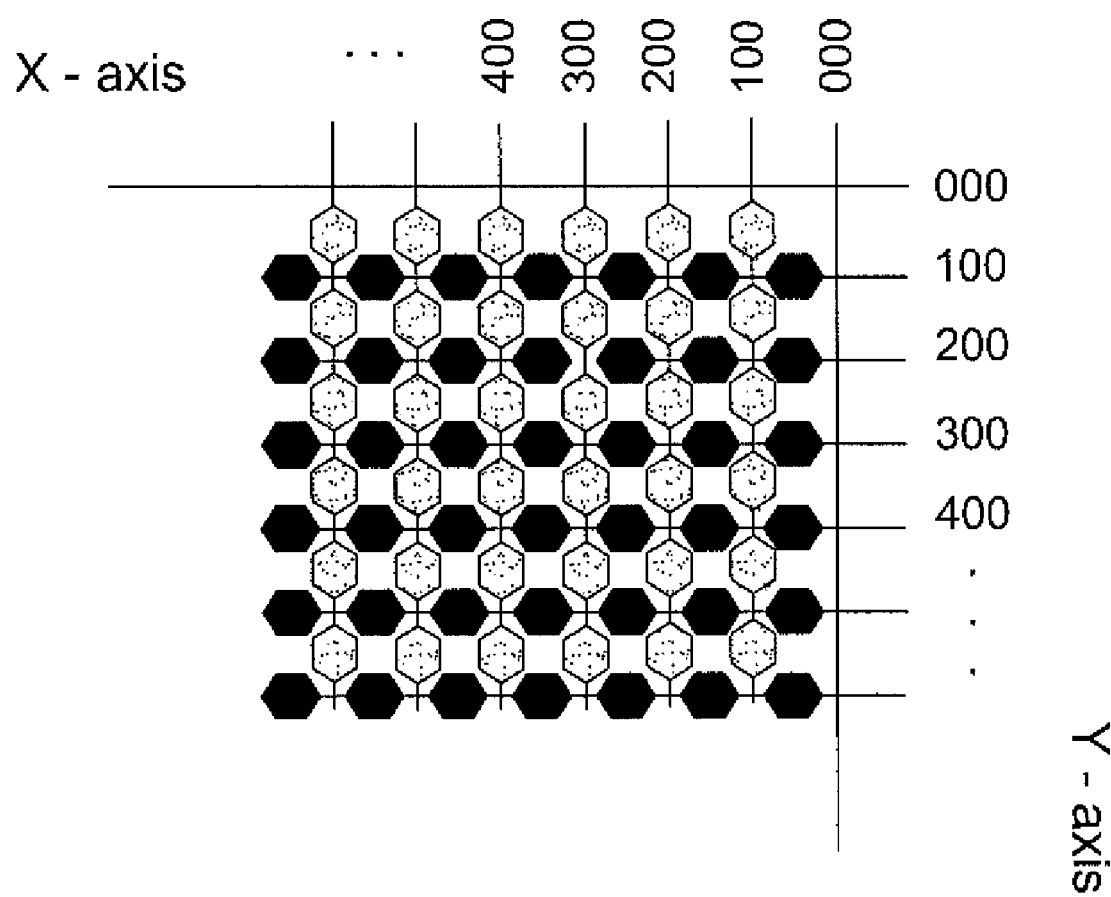
FIG. 18 is an illustration of a logical coordinates grid, according to an embodiment of the present invention.

To ease the understanding of the reader, a (non-binding) convention of logical coordinates will now be described. A logical coordinates grid in some embodiments aids in performing calculations to detect position. Assuming that the plurality of capacitive sensors in capacitive sensing module 115 are laid out as X-sensors and Y-sensors as described above with reference to FIG. 2A, FIG. 18 illustrates a logical coordinates grid applied to the layout of the sensors (or part of the logical coordinates grid applied to part of the layout), according to some embodiments of the present invention. For example, in one embodiment, FIG. 18 may show a logical coordinates grid applied to the layout of sensors within a touchpad's upper right hand corner rotated to the right, or any other grid location. As mentioned above the invention does not limit the number of sensors in capacitive sensing area module 115 and therefore the number of sensors shown in FIG. 18 is but one example. As shown in FIG. 18, the logical coordinates grid maps each sensor to a predetermined number of units where the space between each two sensors in each particular dimension (i.e. the space between each two X-sensors or the space between each two Y sensors) is 100 units. In some embodiments, the space may be divided into any number of units. In some embodiments, the logical coordinates grid may perform any suitable mapping.

Assuming embodiments where there is one capacitive sensor in capacitive sensing area module 115 and/or controller 145 performs presence detection but not position detection, the logical grid convention may not be necessary in some of these embodiments. In embodiments where there is only one array of sensors (i.e. of X-sensors or Y-sensors) in capacitive sensing area module 115 then the logical coordinates grid may assume a separation of 100 or any other appropriate number units between each two sensors in the array, and/or perform any suitable mapping.

Figure 24:
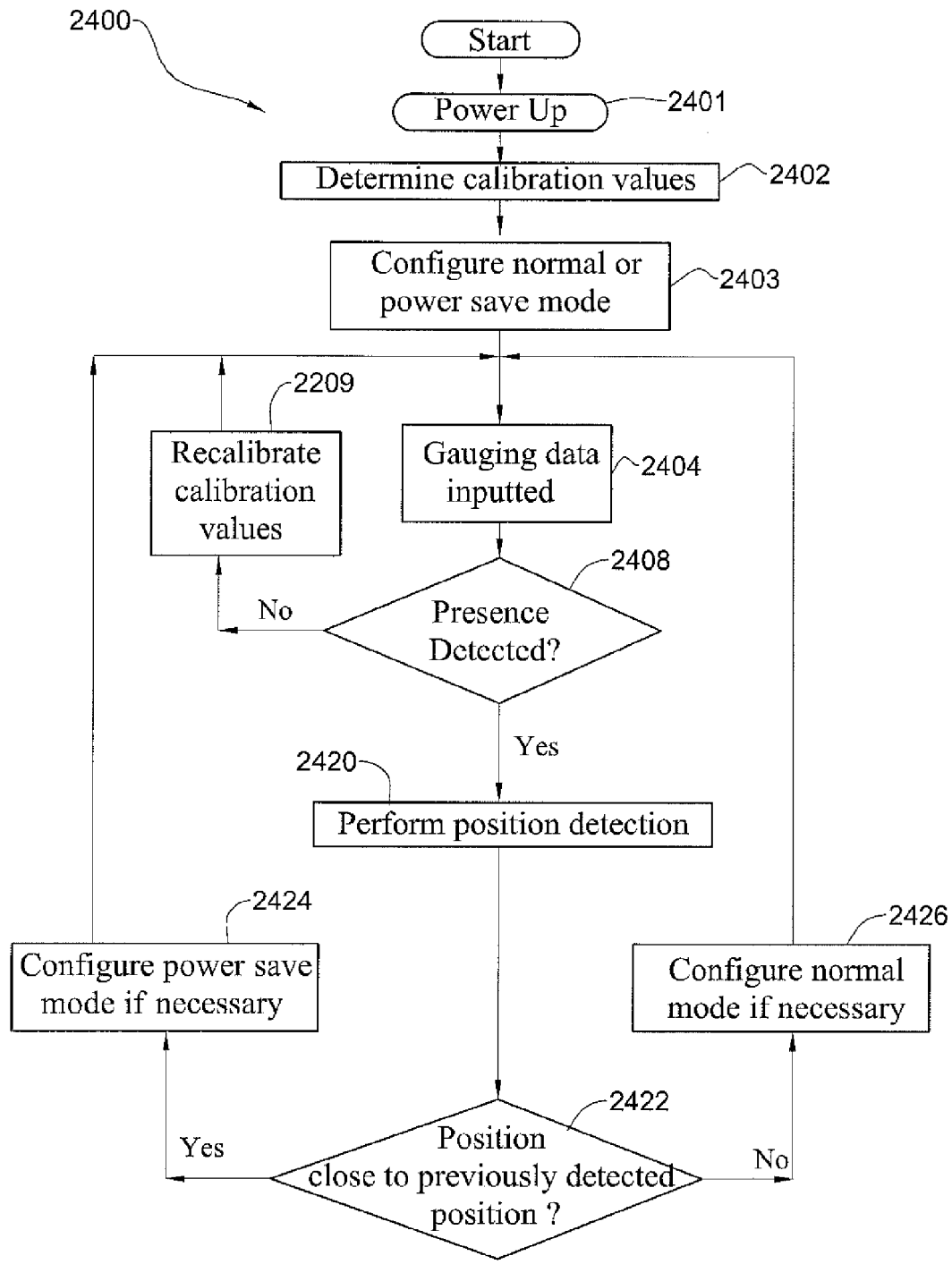
FIG. 24 is a flowchart of a power efficient capacitive detection method, according to an embodiment of the invention.

The reader will understand that the logical coordinates grid is a convention developed in some embodiments in order to facilitate calculations by controller module 145 for detecting position and therefore in some embodiments, the logical coordinates grid convention may be adapted or omitted depending on whether and how controller module 145 is configured to detect position. For ease of understanding of the reader, the logical coordinates grid is assumed in the description of embodiments of methods 1700 (FIG. 17), 2200 (FIG. 22), and 2400 (FIG. 24).

In some embodiments, memory 1640 stores one or more levels and/or values from which the levels may be derived. In some embodiments these levels are used by controller module 145 for detecting the presence of a finger or another object near capacitive sensing area module 115 and/or to detect position of the finger or the object. For example, in some of these embodiments, one or more of these levels (and/or one or more values from these levels may be derived) are determined and stored in memory 1640 during the manufacturing process of the input device. Continuing with the example, additionally or alternatively, in some of these embodiments one or more of these levels (and/or one or more values from these levels may be derived) are determined and stored in memory during the development process. Continuing with the example, depending on the embodiment, each level may or may not change after the initial determination during the life of the input device.

In some embodiments, the one or more levels which are used for presence and/or position detection include any of the following inter-alia: touch low level, touch high level, noise margin level, and/or max_points level.

In some embodiments, the touch low level and touch high level are set as functions of the surface descriptor. The surface descriptor is a value which describes one or more characteristics of the covering which covers at least capacitive sensing area module 115 of system 100, for example the covering of an input device such as a touchpad or key including at least capacitive sensing area 115. Examples of characteristic(s) may include inter-alia: the thickness of the covering and/or the electric properties of the covering. For example a thin layer of good isolative material may be described by a low value for the surface descriptor whereas a thick layer of any material or a thin layer of conductive material may be described by a high value for the surface descriptor or vice versa.

For example, in one embodiment, the touch low level and the touch high level may be calculated using the following equations:

$$\text{TOUCH\_LOW\_level} = \frac{350}{\text{surface\_descriptor}}$$

$$\text{TOUCH\_HIGH\_level} = 2 \times \text{TOUCH\_LOW\_level}$$

In this embodiment, 350 is assumed to be the surface descriptor value when there is no cover at all covering at least the capacitive sensing area module 115 of system 100 when approached by a finger or other object, for example no covering at all on an input device such as a touchpad or key. The equations given here for the touch_low and touch_high levels are but one example and should therefore not be construed as limiting.

In another embodiment, other equations may be used to calculate the touch_low and touch_high levels. In another embodiment, a look-up table may be used in addition to or instead of equations to calculate the touch_low and touch_high levels.

In one embodiment, as long as the covering which covers at least capacitive sensing area module 115 of system 100 remains the same, for example the same plastic (or other material) covering for the touchpad or key, then the touch_low and touch_high levels remain the same.

In some embodiments, the noise margin level depends on the particular implementation of capacitive sensing area module 115 and/or capacitive gauging module 125 in system 100 and/or depends on the physical environment. In these embodiments, the noise margin level may be determined empirically for the particular implementation and physical environment. For example, in one embodiment, over a predetermined period of time when no object is near capacitive sensing area 115, gauging data may be read for each sensor a plurality of times, and for each sensor the difference may be calculated between the maximum reading and the minimum reading. In this embodiment, the average of the differences calculated for all sensors in capacitive sensing area 115 is the noise margin level. This described method to calculate the noise margin level should not be construed as limiting, and in other embodiments other methods may be used to determine the noise margin level.

In some embodiments, the maximum points level is a function of the current touch low level value or the noise margin. For example in one embodiment, the maximum points level is given by the following algorithm:

```
If (TOUCH_LOW level * 3/5) is greater than NOISE_MARGIN level
    Then MAX_POINTS level = TOUCH_LOW level * 3/5
Else
    MAX_POINTS level = NOISE_MARGIN level
```

The algorithm shown here for the maximum points level is but one example and therefore should not be construed as limiting. In another embodiment another algorithm may be used. In another embodiment a look up table may be used in addition to or instead of an algorithm to determine the maximum points level.

In some embodiments where controller module 145 is configured to detect presence but not position, noise margin level and/or maximum points level do not necessarily need to be determined.

In one embodiment, the partial or full dependence of touch low level, touch high level, and/or max_points level on the surface_descriptor value may in some cases prove advantageous, allowing a relatively simple customization to a hardware implementation through the provision of the surface_descriptor value.

In one embodiment where there are two arrays of sensors, for example X sensors and Y sensors, the touch low level, touch high level, noise margin level, and/or max_points level levels may be the same for both arrays.

Figure 17:
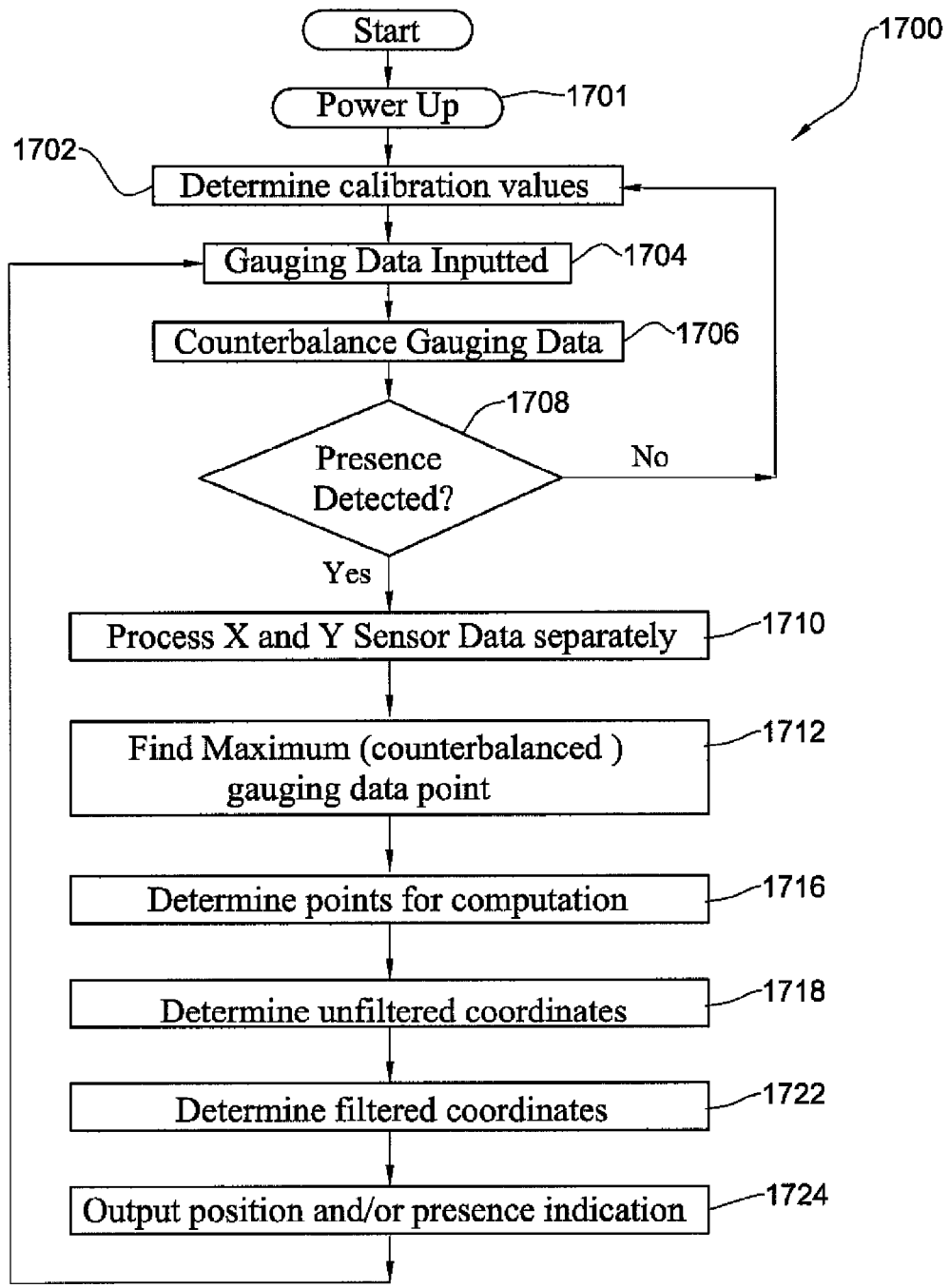
FIG. 17 is a flowchart of a capacitive detection method, according to an embodiment of the present invention.

FIG. 17 is a flowchart of a method 1700 for processing gauging data, performed by controller 145 according to an embodiment of the present invention. Method 1700 may be used for presence detection and/or position detection, depending on the embodiment. The stages illustrated in method 1700 may be performed in a different order than shown in FIG. 7 and/or more than one stage may be performed simultaneously, in other embodiments.

In the embodiment illustrated in FIG. 17, in stage 1701, there is a power up of capacitive detection system 100. In some embodiments, during power up, stage 1702 is performed with controller 145, for example calibration module 1604, determining the calibration values of gauging data related to the sensors in capacitive sensing area 115. In these embodiments, the calibration values of the gauging data are the values of the gauging data when no finger or other object is present near capacitive sensing area 115. For example, in some of these embodiments the calibration values are received by interaction module 1602 and passed to calibration module 1604. In one of these embodiments, calibration module 1604 stores the calibration values in memory 1640. In an embodiment where the calibration values are not used (see below stage 1706), the determination of calibration values may be omitted (i.e. stage 1702 may be omitted).

In one embodiment, during power up (stage 1701) and/or during any other appropriate stage of method 1700, one or more of the levels: touch-low level, touch-high level, maximum points level, and/or noise margin level may be updated, for example to take into account changes in environmental conditions. In another embodiment, updating during method 1700 may be omitted.

In some embodiments, prior to stage 1704, for example in parallel with stages 1701 and 1702, stages 902 to 910, stages 1402 to 1404, and/or stages 1502 to 1504 are performed. For example, in one embodiment prior to stage 1704, one or more operational parameters in clock module 340 may be configured (for example, inter-alia any of the following discussed above: jitter enable/disable, jitter value, clock divider value, high voltage level, low voltage level, counter clock period (frequency), charge/discharge period (frequency), counter enable mode, number of charge/discharge cycles in accumulation cycle, charging and discharging enabling/disabling, auto/manual mode, new set ready, predefined interval between reads, halt state and/or begin cycle. An operational parameter can be configured independently for each sensor, collectively for each subset of sensors, or collectively for all sensors, as discussed above.

In stage 1704, gauging data is provided to controller module 145, for example to interaction module 1602. For example, the various embodiments of charging and discharging and provision of gauging data can occur as described above and can occur in manual_mode or auto_mode depending on the embodiment. For example in one embodiment stage 1704 may correspond to stages 1406 to 1410 or to stages 1506 to 1510.

In one embodiment, stage 1512 or 1412 (processing of gauging data) discussed above may comprise any of stages 1706 to 1724.

In order to simplify the description of the processing herein it is assumed in the described embodiments that the gauging data may be monotonically increasing or monotonically decreasing functions of the capacitances, depending on the embodiment. Therefore the absolute values of the received gauging data (or the absolute values of the received gauging data less calibration values) are described as being used during the processing, in order to allow for embodiments with monotonically increasing or decreasing functions. However, it should be understood that taking the absolute values may not be necessary depending on the embodiment and/or that in some embodiments the gauging data may not be monotonic functions of the capacitances.

In some embodiments, in stage 1706, the received gauging data (or the received gauging data which will be used for position and/or presence detection) are each reduced by the calibration value of the corresponding sensor (as determined in stage 1702) and the absolute value is taken of each difference (and/or a look up table may be used). The term "counterbalanced gauging data" is used herein to refer the absolute values of these differences (i.e. ABS (received value-calibration value)). For example calibration module 1604 may receive the gauging data from interaction module 1602 and the calibration values from memory 1640 and perform the reduction and absolute value calculations in stage 1706 to yield the counterbalanced gauging data. In some embodiments, if a particular calibration value is higher than the received gauging data corresponding to the same sensor then controller 145 recalculates the corresponding calibration value or the calibration values for all sensors, for example by averaging sequential readings corresponding to a sensor for which the recalculation is being performed. In one embodiment, stage 1706 is omitted and the absolute values of the received gauging data are used for subsequent calculations. In order to include both embodiments with and without stage 1706, the subsequent computations of method 1700 will be described as being applied to (counterbalanced) gauging data, where the brackets in this context indicate the optional nature of stage 1706.

In stage 1708, it is checked whether the (counterbalanced) gauging data has a predetermined relationship with one or more levels which indicates that presence is detected (i.e. that the presence of a finger or other object has affected the capacitance of one or more sensors in capacitive sensing area 115). For example, in one embodiment stage 1708 is performed by presence detection module 1610. Depending on the embodiment, the detected presence or absence may be used for any purpose or for no purpose.

Figure 19:
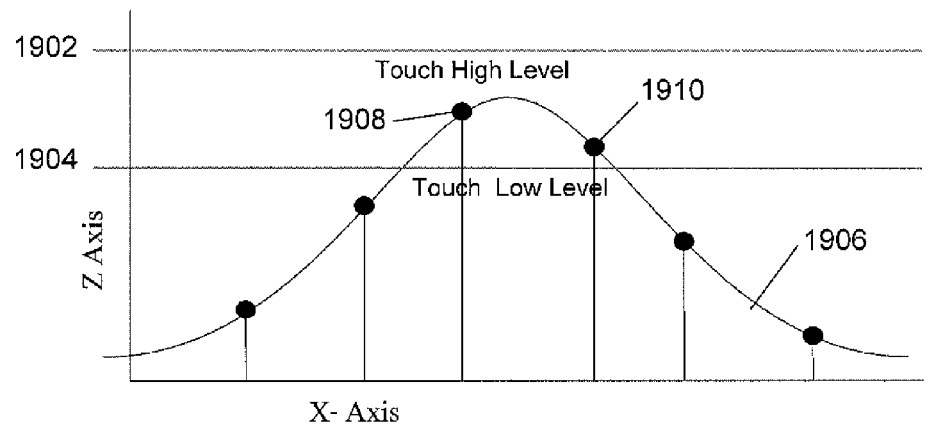
FIG. 19 is a graph illustrating a presence detection algorithm, according to an embodiment of the present invention.

Refer to FIG. 19 which is a graph illustrating presence detection, according to an embodiment of the present invention.

FIG. 19 shows the (counterbalanced) gauging data 1906 plotted on the Z-axis against the X-axis logical coordinates for example because the sensors in capacitive sensing area 115 are arranged in one dimension or because (counterbalanced) gauging data 1906 corresponds to X-sensors. In the latter case, (counterbalanced) gauging data corresponding to Y-sensors may be plotted on the Z axis against the Y-axis logical coordinates additionally or alternatively.

It is noted that in the embodiment of FIG. 19, plotted (counterbalanced) gauging data 1906 resembles the shape of a Gaussian distribution. This shape may in some embodiments result when a finger or another object changes the capacitances of more than one capacitive sensor in capacitive sensing area module 115, but in varying amounts. For example, in the embodiment illustrated in FIG. 19 the capacitive sensor corresponding to point 1908 had capacitance thereof raised more than the capacitive sensor corresponding to point 1910. The (counterbalanced) gauging data of the invention is not bound in shape to the Gaussian distribution or to the amplitudes illustrated in any of the Figures presented herein.

Also shown in the embodiment of FIG. 19 are a touch high level 1902 and a touch low level 1904 for X-sensors (or for one dimension). In another embodiment, additionally or alternatively, touch low level and touch high levels for Y-sensors (or for another dimension) may be plotted.

In one embodiment, in stage 1708 presence detection module 1610 checks (counterbalanced) gauging data against the values of touch_low level and touch_high_level, for example stored in memory 1640. For example, referring to FIG. 19, it may be checked in stage 1708 whether there is at least one point from the (counterbalanced) gauging data which is between touch low level 1904 and touch high level 1902. As shown in FIG. 19, both points 1908 and 1910 are between touch low level 1904 and touch high level 1902 and therefore, presence is detected.

In another embodiment, it may be checked whether there is at least one point from the (counterbalanced) gauging data which is above touch low level 1904 and if yes, presence is detected. In some cases, however, it may be preferable to have two levels 1902 and 1904 so that an outlier point above touch high level 1902 will not influence the detection decision.

In some embodiments, there may be only one point corresponding to the (counterbalanced) gauging data (i.e. not a distribution of points), for example if there is only one sensor in sensing area 115 or if data from only one sensor is processed separately. In these embodiments, the one point is compared to one or more levels to determine if presence is detected. For example in one of these embodiments, if the one point is between the touch low level and touch high level, then presence is detected (i.e. it is detected that the presence of a finger or other object has affected the capacitance of the one sensor).

It is also noted that in some embodiments, stage 1708 may be performed even if the (counterbalanced) gauging data corresponding to one or more sensors does not accurately reflect capacitance (for example because the (counterbalanced) gauging data includes data relating to sensors with disabled charging and discharging). These embodiments assume that the "inaccurate" (counterbalanced) gauging data does not comprise the only point(s) to fall between the touch_low and touch_high levels (or when the check is only against the touch_low level then assuming the "inaccurate" (counterbalanced) gauging data does not comprise the only point(s) to fall above the touch_low level).

If there are (counterbalanced) gauging data corresponding to both X-sensors and Y-sensors, then in one embodiment, stage 1708 may be performed for (counterbalanced) gauging data corresponding to X-sensors and (counterbalanced) gauging data corresponding to Y sensors, separately, and in another embodiment stage 1708 may be performed for either (counterbalanced) gauging data corresponding to X-sensors or (counterbalanced) gauging data corresponding to Y-sensors. For example, in some cases it may be assumed that processing (counterbalanced) gauging data corresponding only to X-sensors or Y-sensors is sufficiently sensitive to detect presence. In embodiments where stage 1708 is performed more than once for (counterbalanced) gauging data (for example separately for X-sensor and Y-sensor data), the plurality of stages 1708 may be performed sequentially or in parallel. In some embodiments, not all the available (counterbalanced) gauging data may be compared to predetermined level(s) in stage 1708 in order to detect presence, perhaps because it is considered sufficiently accurate to compare only part of the available data. For example, in some of these embodiments, assuming X and Y sensors in capacitive sensing area module 115, available (counterbalanced) gauging data corresponding to only some X-sensors and/or to some Y sensors may be compared to level(s) in stage 1708.

Assuming presence is not detected in stage 1708 (no to stage 1708), method 1700 iterates back to stage 1702 or stage 1704, depending on the embodiment. In one embodiment recalibration of calibration values (stage 1702) may be performed each time presence is not detected or occasionally when presence is not detected. In another embodiment, recalibration is not performed and method 1700 iterates back directly to stage 1704. In some embodiments, transmission module 1650 may output an indication of absence (i.e. no detected presence), if presence is not detected in stage 1708.

Assuming presence is detected in stage 1708, then if position detection is also required method 1700 proceeds with position detection starting at stage 1710, where position detection is performed for example by position detection module 1620. For example, in one embodiment, (counterbalanced) gauging data may be passed to position detection module 1620 from calibration module 1604 or from presence detection module 1610. If position detection is not required, and only presence detection is required, then in some embodiments method 1700 skips to stage 1724, assuming an indication of presence is outputted by transmission module 1650. For example an indication of the presence or absence of a finger or other object may be the only desired output in some embodiments of the invention. In one of these embodiments, each capacitive sensor in capacitive sensing area 115 corresponds to a key and it is desired to detect if presence of a finger or another object is detected for that key.

In some embodiments, an indication of presence and/or an indication of absence as detected by presence detection module 1610 in stage 1708 may be provided to interaction module 1602, for example in order to affect operation of gauging module 105 and/or controller module 145. The dotted arrow leading from presence detection module 1610 to interaction module 1602 expresses the optional nature of feedback to interaction module 1602 in embodiments of the invention.

Figure 20:
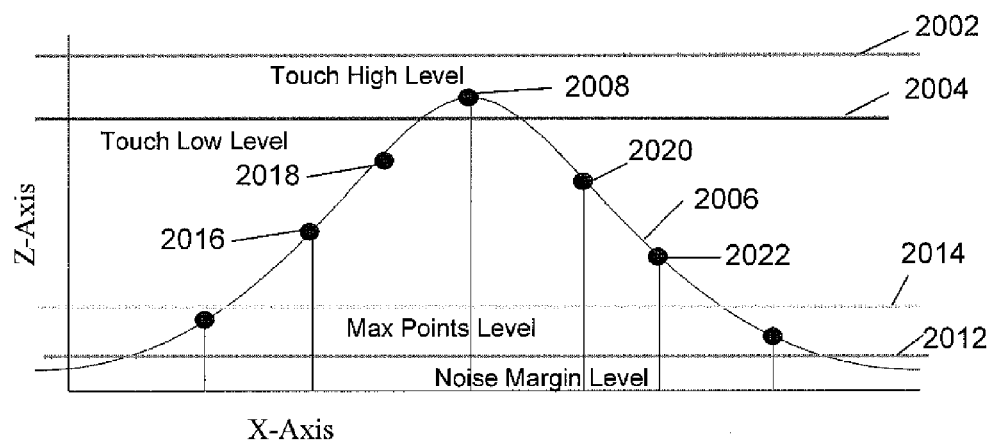
FIG. 20 is a graph illustrating a position detection algorithm, according to an embodiment of the present invention.

Refer to FIG. 20 which is a graph illustrating a position detection algorithm, according to an embodiment of the present invention. Shown in FIG. 20 are touch low level 2004, touch high level 2002 (which were described above with reference to FIG. 19), noise margin level 2012 and maximum points level 2014 for X-sensors (or for one dimension). In another embodiment, additionally or alternatively, touch low level, touch high level, noise margin level and maximum points level for Y-sensors (or for another dimension) may also be plotted.

In the embodiment of FIG. 20, (counterbalanced) gauging data 2006 is plotted on the Z-axis against the X-axis logical coordinates for example because sensors in sensing area 115 are arranged in one dimension or because (counterbalanced) gauging data 2006 corresponds to X-sensors. In the latter case, (counterbalanced) gauging data corresponding to Y-sensors may be plotted against the Y-axis logical coordinates additionally or alternatively.

Figure 21:
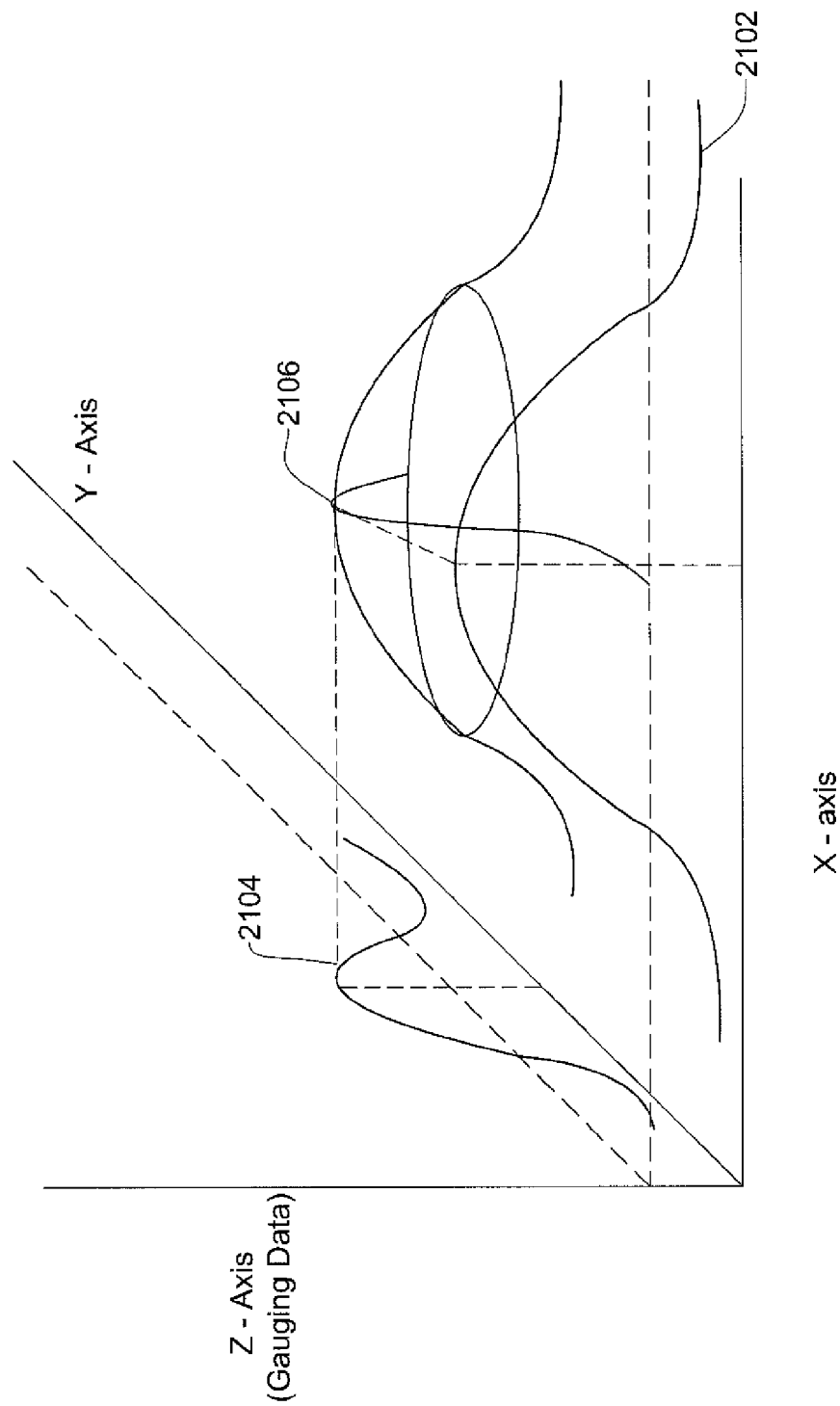
FIG. 21 is a graph of (counterbalanced) gauging data, according to an embodiment of the present invention.

Refer now to FIG. 21, which illustrates (counterbalanced) gauging data, according to an embodiment of the present invention, where there is a plurality of X-sensors and Y-sensors in capacitive sensing area 115. FIG. 21 illustrates (counterbalanced) gauging data 2102 on the Z-axis corresponding to X-sensors (as plotted against the X-axis) and (counterbalanced) gauging data 2104 on the Z-axis corresponding to Y sensors (as plotted against the Y-axis). The pairs of values (x, z) or (y, z) are referred to below as points of data on each axis, where the calculated x or y value for each point on plots 2102 or 2104 respectively are the logical coordinates on the layout of the sensors in capacitive sensing area 115 as described above with reference to FIG. 18. Plot 2106 shows the intersection of (counterbalanced) gauging data 2102 and (counterbalanced) gauging data 2104.

The invention is not limited by the graphs illustrated in FIGS. 19, 20, and 21 and in other embodiments the (counterbalanced) gauging data when plotted may not necessarily resemble the graphs in FIGS. 19, 20 and 21.

It is noted that position detection may be performed in some cases even if the (counterbalanced) gauging data corresponding to one or more sensors does not accurately reflect capacitance (for example because the (counterbalanced) gauging data includes data relating to sensors with disabled charging and discharging), assuming the "inaccurate" (counterbalanced) gauging data do not affect the calculations discussed herein with reference to position detection.

In stage 1710, assuming that there are both X-sensors and Y sensors in capacitive sensing area module 115, then in some embodiments (counterbalanced) gauging data corresponding to the X-sensors is processed separately from (counterbalanced) gauging data corresponding to the Y sensors in order to determine separately the X logical coordinate and Y logical coordinate of the linger or other object. If there is separate processing then depending on the embodiment, (counterbalanced) gauging data corresponding to X-sensors and (counterbalanced) gauging data corresponding to Y-sensors may be processed in parallel or sequentially. If the position will be expressed in only one dimension (i.e. X or Y logical coordinate), then in one embodiment (counterbalanced) gauging data corresponding to sensors in one dimension (for example X-sensors or Y-sensors) are processed in stage 1710 in order to detect position.

For example in one embodiment, position detection module 1620 retrieves one or more levels from memory 1640 to be used for position detection.

Referring again to FIG. 20, in stage 1712, the maximum point of the (counterbalanced) gauging data (for each dimension) which is between the touch low level 2004 and touch high level 2002 is determined. (For the discussion of stage 1712, it is assumed that any data points above touch high level 2002 are outliers and are therefore ignored).

For example, in the embodiment of FIG. 20, the maximum point of (counterbalanced) gauging data 2006 for the X-dimension is point 2008.

In stage 1716, it is determined how many and which points will be used for calculating the position of the object (for each dimension). On the one hand, using fewer points may in some cases lead to faster calculation and/or may in some cases reduce power consumption. On the other hand, using more points may in some cases lead to more accurate calculations. Therefore in stage 1716 it is determined the minimum number of points needed for accurate calculation and which points. In one embodiment with a display, the position should be determined by controller module 145 with sufficient resolution so that if desired, a host driver (or any other module) can convert the determined position to display coordinates (for example in pixels) having a resolution appropriate for the implemented display.

The number of points from the (counterbalanced) gauging data which are above the maximum points level in either direction away from the maximum point are counted. For example, assuming a dimension (for example X axis or Y axis) is plotted horizontally, the number of points to the right of the maximum point and the number of points which are above the maximum points level to the left of the maximum point are counted.

Referring again to FIG. 20, points 2020 and 2022 to the right of maximum point 2008 are above maximum points level 2014 (i.e. two points are to the right), and points 2016 and 2018 to the left of maximum point 2008 are above maximum points level 2014 (i.e. two points are to the left).

The number of points which will be used in the calculation in the illustrated embodiment is given by 2×Max(leftpo int s, rightpo int s)+1. In other words, in the illustrated embodiment, the same number of points to the right and left of the maximum point are used in the calculation, where the number used is dependent on the higher number of points above the maximum points level on either side. Refer again to FIG. 20 where there are two points to the right and two points to the left. Using the equation above, (2×Max (2, 2)+1=2×2+1=5) and therefore for the embodiment of FIG. 20, five points are used for calculating the position in the X dimension, i.e. the maximum point, the two highest points to the left of the maximum point and the two points highest points to the right of the maximum point are used in the calculation. Referring to FIG. 20, points 2008, 2016, 2018, 2020, and 2022 are used.

In another embodiment, there may be a different equation used to determine the number of points used in the calculation. In another embodiment a predetermined number of points are used in the calculation.

In one embodiment, in stage 1718, the position in each dimension (i.e. the unfiltered logical coordinate) is calculated using the weighted average:

$$\frac{\sum_{i=1}^{\#calc\_points}(\text{counterbalanced})\text{gauging\_data\_point} \times \text{logical\_position}}{\sum_{i=1}^{\#calc\_points}(\text{counterbalanced})\text{gauging\_data\_point}}$$

In the above weighted average equation, for each of the points (selected in stage 1716) the logical coordinate of the corresponding sensor is weighted by (i.e. multiplied by) the (counterbalanced) gauging data value of the point.

If it is desired to calculate the position in more than one dimension (for example, X and Y axes), then in one embodiment the weighted average calculation is performed separately for each axis (for example performing two weighted averages, one for X-sensor data and one for Y sensor data separately).

Assuming the weighted average calculation was performed twice in stage 1718, once for X sensor data and once for the Y sensor data, then in one embodiment the (unfiltered) position of the finger or other object is detected as being at the (x, y) unfiltered coordinates determined by the two weighted average calculations. If there is only one dimension, then in one embodiment the (unfiltered) position of the finger or other object is detected at being at the unfiltered coordinate determined by the one weighted average calculation.

The equation presented above for calculating unfiltered coordinate(s) should not be construed as limiting. In another embodiment, the unfiltered position may be calculated differently, for example using a Gaussian approximation.

In some embodiments the unfiltered position is provided by detection module 1620 to offset calculation module 1630 and/or stored in memory 1640.

In some embodiments, the (unfiltered) weighted logical coordinate in each dimension is smoothed in stage 1722 by offset calculation module 1630 using a filtering algorithm in order to minimize the effects of electrical noise and/or other obstacles. For example in some of these embodiments, the weighted decaying algorithm (i.e. a weighted average) is used to calculate a filtered coordinate in each dimension. In these embodiments in order to calculate the (new) filtered coordinate, an average is calculated between the new unfiltered coordinate (determined in stage 1718) and the previous filtered coordinate (determined in a previous iteration of stage 1722). In some of these embodiments, if the (new) unfiltered coordinate (from 1718) is marked by "U", the previous filtered coordinate is marked by "$X_{prev}$" the new filtered coordinate is marked by "$X_{new}$", and the weights of the (new) unfiltered and previous filtered coordinates are respectively $\alpha$ and $\beta$, one gets: $X_{new}=\alpha U_{new}+\beta X_{prev}$. In these embodiments $\alpha$ and $\beta$ are scalable and can be chosen based on the implementation, for example in one of these embodiments so as to produce the smoothest movement of an input device cursor on a display. For example, in one of these embodiments $\alpha$ and $\beta$ may be customized for the surface cover of the input device (such as the covering of a touchpad) and/or customized for the electrical components of the input device producing a distinct amount of noise.

If it is desired to calculate the position in more than one dimension (for example, X and Y axes), then in one embodiment the filtering is performed separately for each axis (for example performing two weighted decaying algorithm, one for X-sensor data and one for Y sensor data separately).

Assuming the filtering was performed twice in stage 1722, once for X sensor data and once for the Y sensor data, then in one embodiment the filtered position of the finger or other object is detected as being at the (x, y) filtered coordinates determined by the two weighted decaying algorithms. If there is only one dimension, then the filtered position of the finger or other object is detected as being at the filtered coordinate determined by the one weighted decaying algorithm.

Stage 1722 may in some cases prove advantageous in smoothing any position movement however in other embodiments, stage 1722 may be omitted. For example, in one embodiment stage 1722 is omitted if presence was detected in stage 1708 after not being detected in the previous iteration of stage 1708. In some cases, this embodiment thereby prevents smoothing of non-continuous position movement.

Depending on the embodiment, the unfiltered and/or filtered position determined in stage 1718/1722 may be used for any purpose or for no purpose. For example, in one embodiment the unfiltered and/or filtered position may be outputted in stage 1724 by transmission module 1650 to a host driver which converts the (filtered or unfiltered weighted logical) coordinate(s) to display coordinate(s) so that a position may be displayed on a screen. (As mentioned above, if presence was not detected in stage 1708 and position detection was not required then in some embodiments method 1700 skips from stage 1708 to stage 1724, and in stage 1724, an indication of presence may be outputted by transmission module 1650).

In some embodiments, the unfiltered and/or filtered position determined in stage 1718/1722 or a function thereof may be provided to interaction module 1602, for example in order to affect operation of gauging module 105 and/or controller module 145. In some embodiments, an indication of failure to detect position may be provided to interaction module 1602 if no position was detected. The dotted arrow leading from offset calculation module 1630 to interaction module 1602 expresses the optional nature of feedback to interaction module 1602 in embodiments of the invention.

In some embodiments, an indication of failure to detect position may be outputted by transmission module 1650 in stage 1724, if no position was detected.

After stage 1724, method 1700 iterates back to stage 1704.

Referring again to FIG. 1, in some embodiments the results of the presence and/or position detection may affect the charging and discharging (for example via feedback arrow from presence detection module 1610 to interaction module 1602 and/or via feedback arrow from offset calculation module 1630 to interaction module 1602). For example, in some of these embodiments the configuration of operational parameters may be affected by the results of the presence and/or position detection. Continuing with the example, in one of these embodiments there may be a default mode of operation prior to the initial presence and/or position detection results, and depending on initial results, the operation may or may not switch to a non-default mode of operation. Assuming the operation changes to a non-default mode of operation based on initial or subsequent results, the operation may or may not change back to a default mode depending on later results.

For simplicity of description it is assumed in the described embodiments that there may be one or more power save (i.e. power saving) modes as well as one or more normal (non power saving) modes. Depending on the embodiment, the default mode may be a power save mode or a normal mode. In one embodiment, a power save mode is configured instead of a normal mode in order to save power when there is a lower likelihood of the power save mode detrimentally affecting position and/or presence detection. In one embodiment, a normal mode is configured instead of a power save mode when there is a higher likelihood of a power-save mode detrimentally affecting position and/or presence detection. In one embodiment, a power save mode may additionally or alternatively reduce electromagnetic interference (EMI) from gauging module 105.

In one embodiment, it is configurable whether charging and discharging are performed in a normal mode or in a power save mode. For example, in one embodiment normal mode or power save mode may be configured via mode register 448 (see FIG. 4), for example by controller 145.

In some embodiments, the gauging clock frequency (period) is higher (lower) in normal mode than in power save mode. As mentioned above with reference to FIGS. 8 and 9, gauging clock 846 may or may not include jitter and therefore the discussion herein below of the gauging clock in normal and power save mode should be considered to include as appropriate embodiments with and without jitter. For example, in some of these embodiments a clock divider value, "Z", for example in clock control register 450 (see FIG. 4 or 5) may be used to configure the frequency of transformed clock 849 (see FIG. 8) in power save mode in relation to the frequency of input clock 375 (for example the frequency of transformed clock 849 signal in power save mode=frequency of input clock 375 signal/Z). In embodiments with a configurable clock divider value, the clock divider value may be set independently for each sensor in capacitive sensing area 115 or collectively for each subset of sensors in capacitive sensing area 115, whereas in another of these embodiments the clock divider value may be set collectively for all sensors in capacitive sensing area 115. Examples of subsets were given further above.

In one embodiment, there may be different configurable clock divider values for normal and power save mode (i.e. a smaller Z for normal mode than for power save mode), whereas in another of these embodiments there may be no configurable clock divider for normal mode (i.e. transformed clock 849 frequency=frequency of input clock 375 signal).

As mentioned above, in some embodiments the frequency of counter clock 542 equals or is some other function of the frequency of gauging clock 846. In some embodiments, additionally or alternatively, the frequency of charge/discharge control 560 equals or is some other function of the frequency of gauging clock 846. For example, the frequency of counter clock 542 and/or the frequency of charge discharge control 560 may increase with increased frequency of gauging clock 846, in some embodiments.

For example, in one embodiment, a slowed down frequency for counter clock 542 in power save mode lowers the gauging data amplitude. For example, in one embodiment, a slowed down frequency for charge discharge control 560 in power save mode lowers the frequency of charging and discharging capacitive sensors in a capacitive sensing area 115 and therefore lowers the frequency of gauging data generation.

In other embodiments, there may not be a slowed down gauging clock 846 for power save mode compared to normal mode. For example in some of these embodiments there may be the same clock divider value for both power save and normal modes or no clock divider value for either power save and normal modes. In these embodiments power saving in power save mode may result due to other operational parameters for example less sensors with enabled charging and discharging in power save mode than in normal mode and/or reduced controller clock frequency—as discussed below.

In some embodiments, in power save mode, the clock used for controller 145 operations may be slowed down compared to normal mode in addition to or instead of a slowed down gauging clock 846. For example, in one of these embodiments, the slowed down controller clock may reduce the gauging data read rate (i.e. increase the predefined interval between reads of gauging data). As another example, in one of these embodiments, additionally or alternatively the slowed down controller clock may reduce the rate of processing the gauging data, resulting in less frequent transfers of position and/or presence indications by transmission module 1650. In other embodiments, the clock used for controller 145 operations may not be slowed down in power save mode compared to normal mode. In these other embodiments, power saving in power save mode may result due to other operational parameters for example less sensors with enabled charging and discharging in power save mode than in normal mode and/or reduced gauging clock frequency in power save mode than in normal mode.

In some embodiments, the enabling or disabling of charging and discharging for sensors is configurable for power save mode, for example via setup/status register 454. In some of these embodiments, for power save mode, the charging and discharging of each sensor in capacitive sensing area 115 may be independently enabled or disabled or the charging and discharging for each subset of sensors in capacitive sensing area 115 may be collectively enabled or disabled, whereas in another of these embodiments charging and discharging for all sensors in capacitive sensing area 115 may be collectively enabled or disabled. Examples of subsets were given above. In other embodiments, the enabling or disabling of charging and discharging for sensors for power save mode may be implemented (for example hardcoded/hardwired).

In some embodiments, the enabling or disabling of charging and discharging for sensors in normal mode is configurable, for example via setup/status register 454. For example in some of these embodiments the configuration can allow for normal mode and power save mode to have up to the same number of sensors with enabled charging and discharging or require less sensors with enabled charging and discharging during power save mode than during normal mode. In some of these embodiments, for normal mode, the charging and discharging of each sensor in capacitive sensing area 115 may be independently enabled or disabled or the charging and discharging for each subset of sensors in capacitive sensing area 115 may be collectively enabled or disabled, whereas in another of these embodiments charging and discharging for all sensors in capacitive sensing area 115 may be collectively enabled or disabled. Examples of subsets were given above. In other embodiments the enabling or disabling of charging and discharging of sensors in normal mode may be implemented (for example hard-coded/hardwired). For example, in one of these other embodiments all sensors may have enabled charging and discharging in normal mode.

In embodiments where there is the same number of sensors with enabled charging and discharging in normal mode and in power save mode, power saving in power save mode may result due to other operational parameters, for example lower gauging clock frequency and/or controller clock frequency in power save mode than in normal mode as discussed above.

In one embodiment in normal mode all sensors in capacitive sensing area 115 (are implemented or configured to) have charging and discharging enabled. In this embodiment, any of the following charging and discharging collections of sensors inter-alia may be implemented or configured to have charging and discharging enabled for power save mode: all of X sensors only, all of Y sensors only, even X sensors only, even Y sensors only, odd X sensors only, odd Y sensors only, all X and Y even sensors only, all X and Y odd sensors only, even X and odd Y sensors only, even Y and odd X sensors only, sensors in a particular area of the layout in capacitive sensing module 115, X sensors in a particular area of the layout, Y sensors in a particular area of the layout, interleaving of any of the above (for example in one accumulation period X sensors and in the next accumulation period Y sensors, and repeat), any combination of the above etc. These examples of collections should not be construed as limiting.

Refer again to FIGS. 11, 12, and 13 discussed above. In one embodiment, FIGS. 11 and 12 illustrate examples of normal modes where charging and discharging are enabled for X and Y sensors, while FIG. 13 illustrates an example of power save mode with charging and discharging enabled for (at least one) X sensors and disabled for Y sensors. It should be evident to the reader that FIGS. 11, 12, and 13 are but examples of normal and power save mode and that depending on the embodiment, the charging and discharging configurations may vary.

Figure 22:
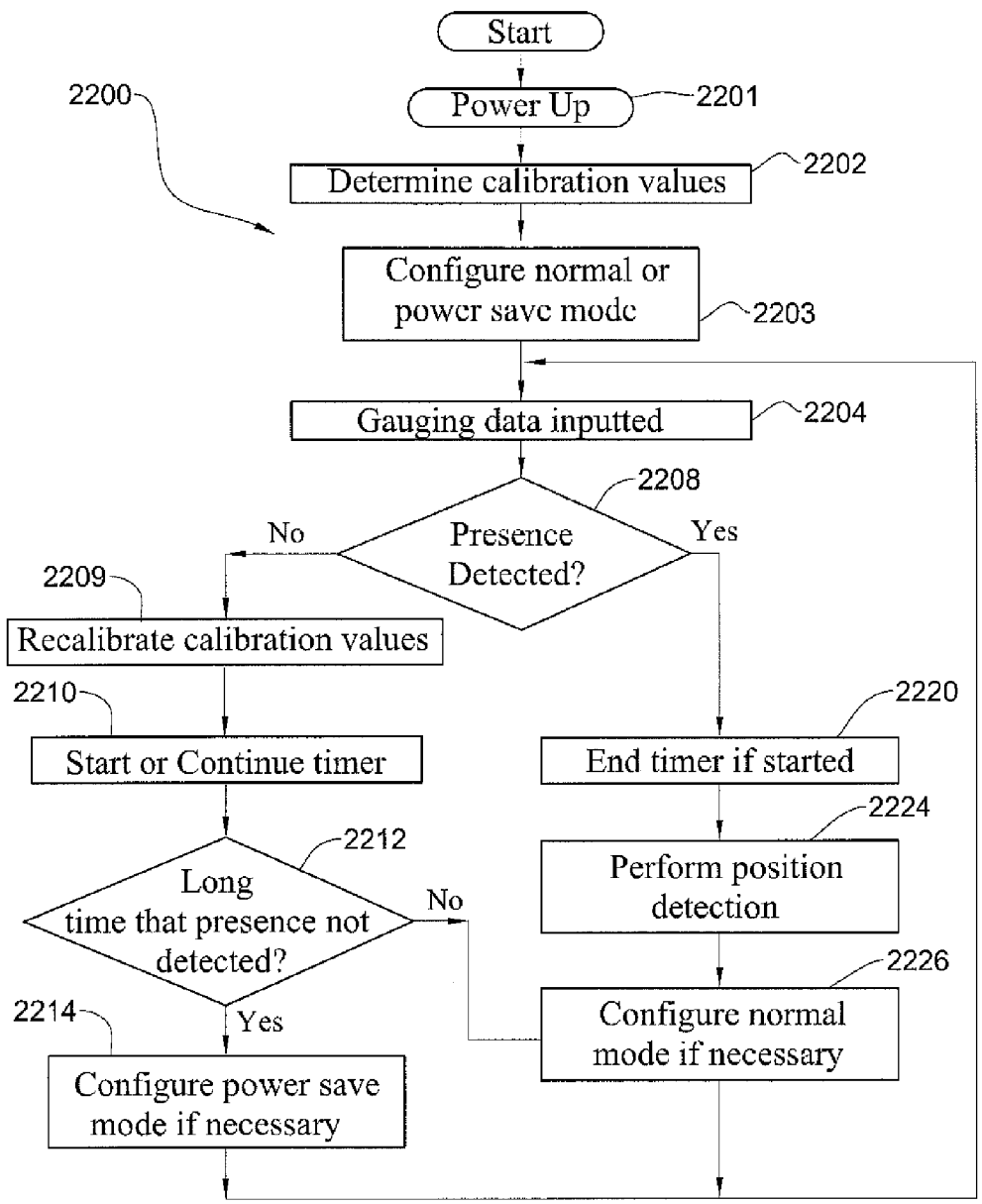
FIG. 22 is a flowchart of a power efficient capacitive detection method, according to an embodiment of the present invention.

Refer now to FIG. 22 which illustrates a capacitive detection method 2200 according to an embodiment of the present invention. The stages illustrated in method 2200 may be performed in a different order than shown in FIG. 22 and/or more than one stage may be performed simultaneously, in other embodiments. Method 2200 may be performed by controller 145, in one embodiment.

Stage 2201, 2202, and 2204 correspond to stages 1701, 1702 and 1704 respectively, therefore the reader is referred to the discussion above with reference to FIG. 17.

As mentioned above, prior to stage 1704 (corresponding with stage 2204), one or more operational parameters in clock module 340 may be configured. In the embodiments illustrated in FIG. 22, at least the default mode (normal or power save depending on the embodiment) is configured in stage 2203. For example in some embodiments, any of the following may be configured: the default mode being normal or power save mode may be configured via mode register 448, a clock divider value for the default mode may be configured via clock control register 450, a controller clock frequency for default mode may be configured, the charging and discharging of sensor(s) in the default mode may be enabled/disabled via setup/status register 454, and/or other operational parameters suitable for the default mode may be configured. Continuing with the example in some embodiments one or more operational parameters associated with the default mode may instead be implemented (e.g. hardcoded/hardwired) so as to take effect under the default mode. As another example, in some embodiments, configurable values of operational parameters associated with power save mode and/or normal mode (whether or not the default mode) may be configured in stage 2203 (for example configurable clock divider value, if any, configurable controller clock frequency, and/or configurable collection of sensors having charging and discharging enabled in power save mode and/or normal mode). Continuing with the example, in some embodiments one or more operational parameters associated with power save mode and/or normal mode may instead be implemented (e.g. hard-coded/hardwired) so as to take effect under the associated mode. Still continuing with the example, in some of these embodiments, any subsequent changes in the mode (see stages 2214 and 2226), for example via mode register 448, will cause the operational parameter values (which were implemented or in stage 2203 previously configured) that are associated with the current mode to take effect. Stage 2203 may be performed for example by interaction module 1602.

Assume for the sake of example that the default mode is a normal mode. Further assume that in contrast with power save mode, in normal mode there is no clock divider value (i.e. transformed clock 849=input clock 375, see FIG. 8) and therefore no need to configure clock register 450. Also assume that when the mode in mode register 448 is configured to "normal mode" in stage 2203, the charging and discharging are enabled for all n sensors in capacitive sensing area 115 due to the configured "normal mode" in mode register 448, without necessarily requiring separate configuration of setup/status register 454 in stage 2203. This example should not be construed as limiting stage 2203.

In one embodiment, stage 1512 or 1412 (processing of gauging data) discussed above may comprise any of stages 2208 to 2226.

In stage 2208, controller module 135 determines whether presence of a finger or other object is detected. For example, in one embodiment stage 2208 may correspond to stage 1708 described above.

If presence is not detected in stage 2208, then optionally in stage 2209 calibration values may be recalibrated as discussed above with reference to method 1700. In another embodiment stage 2209 may be omitted. In stage 2210, a timer (for example in presence detection module 1610—see FIG. 16) is started or allowed to continue to run to time the amount of time that presence has not been detected. In stage 2212, controller module 145 (for example presence detection module 1610) determines whether it has been a long time that presence has not been detected. For example, the timer may generate an interrupt or the timer may be polled. For example, if the timer value is above in one embodiment (or in another embodiment, greater than or equal to) a predetermined time amount floor, it is considered to be a long time. Depending on the embodiment, the predetermined time amount floor may vary and therefore the invention does not limit the value of the time amount floor. In one embodiment, the time amount floor is configurable, and therefore may be adjusted for optimal performance.

If it has not been a long time since presence was not detected, then method 2200 proceeds to stage 2226, configuring normal mode (see description stage 2226 below) and subsequently iterates back to stage 2204. If normal mode has already been configured (for example as the default mode) then method 2200 may skip stage 2226 and directly iterate back to stage 2204.

If it has been a long time, then in stage 2214, power save mode is configured if not already configured (for example as the default mode). For example, in one embodiment, a power save mode indication may be set in mode register 448. For example, in some embodiments, additionally or alternatively, a clock divider value for power save mode may be configured or take effect so that the frequency of gauging clock 846 (affecting for example the frequency of counter clock 542 and/or the frequency of charge/discharge control 560) is less in power save mode than in normal mode. The value of a clock divider (if any) for power save mode may vary depending on the embodiment and is not limited herein. For example in some embodiments, additionally or alternatively, a controller clock frequency may be configured or take effect with a reduced frequency compared to normal mode. The frequency of the controller clock in power save mode may vary depending on the embodiment and is not limited herein. For example, in some embodiments, additionally or alternatively, selected sensors may have charging and discharging enabled/disabled so that less sensors are charged and discharged in power save mode than in normal mode. Continuing with the example, in one of these embodiments, in stage 2214 certain sensor(s) which may be enabled in normal mode have charging and discharging disabled in power save mode. The difference (if any) in the number of sensors charged and discharged in normal and power save modes and the identity of sensors charged and discharged in power save mode are not limited by the invention. In one embodiment, the number of sensors charged and discharged in power save mode, which sensors are charged and discharged during power save mode, the clock divider value in power save mode, and/or the controller clock frequency in power save mode are determined based on a tradeoff between power savings and accuracy in detection of presence and/or position of an object near capacitive sensing area 115. Stage 2214 may be performed for example by interaction module 1602.

In one embodiment, the power save mode may comprise less sensors with enabled charging and discharging compared to normal mode. In another embodiment, the power save mode may comprise a lower gauging clock frequency than in normal mode. In another embodiment, the power save mode may comprise a lower controller clock frequency. In another embodiment, the power save mode may comprise a lower (or the same) number of sensors with enabled charging and discharging compared to normal mode, lower (or the same) gauging clock frequency compared to normal mode and/or lower (or the same) controller clock frequency compared to normal mode. In another embodiment, other operational parameters may differ between power save mode and normal mode in addition to or instead of gauging clock frequency, controller clock frequency, and/or number of sensors with enabled charging and discharging.

In some embodiments, the power save mode may differ for different executions of stage 2214. For example, in some of these embodiments, there may be a plurality of appropriate power modes, in which charging and discharging for different collections of sensors are enabled, in which different controller clock frequencies are applied and/or in which different gauging clock frequencies are applied, and therefore each time stage 2214 is executed, not necessarily the same power mode is configured. Continuing with the example, in one of these embodiments, the first time stage 2214 is executed, only all X sensors (or less than all X sensors) have charging and discharging enabled, but the next time stage 2214 is executed only all Y sensors (or less than all Y sensors) having charging and discharging enabled with the process repeating for subsequent iterations.

Examples of collections of sensors whose charging and discharging may be enabled in power save mode in stage 2214 include inter-alia any of the following: all of X sensors only, all of Y sensors only, even X sensors only, even Y sensors only, odd X sensors only, odd Y sensors only, all X and Y even sensors only, all X and Y odd sensors only, even X and odd Y sensors only, even Y and odd X sensors only, interleaving of any of the above (for example in one accumulation period X sensors and in the next accumulation period Y sensors, and repeat), any combination of the above etc. These examples of collections should not be construed as limiting.

If the mode is already configured as power save mode, then stage 2214 may be skipped.

Method 2200 then iterates to stage 2204, performing a charging and discharging which in this case will be in accordance with power save mode. For example, assume that in one embodiment power save mode includes only all X sensors (or less than all X sensors) or only all Y sensors (or less than all Y sensors). Continuing with the example, assuming only X sensors (or only Y sensors) are charged and discharged (and ignoring any changes in gauging clock frequency and/or controller clock frequency), in some cases there may be a 50% reduction in power consumption compared to a mode where all X and Y sensors are charged and discharged. As another example, assuming only a subset of X-sensors (or Y sensors) are charged and discharged, in some cases there may be a reduction greater than 50% in power consumption compared to a mode where all X and Y sensors are charged and discharged. Continuing with the example, if only half the X-sensors (or Y sensors) are charged and discharged (and ignoring any changes in gauging clock frequency and/or controller clock frequency), power consumption may be reduced in some cases to 25% of the level when all X and Y sensors are charged and discharged. These levels of power saving should not be construed as limiting.

Figure 23:
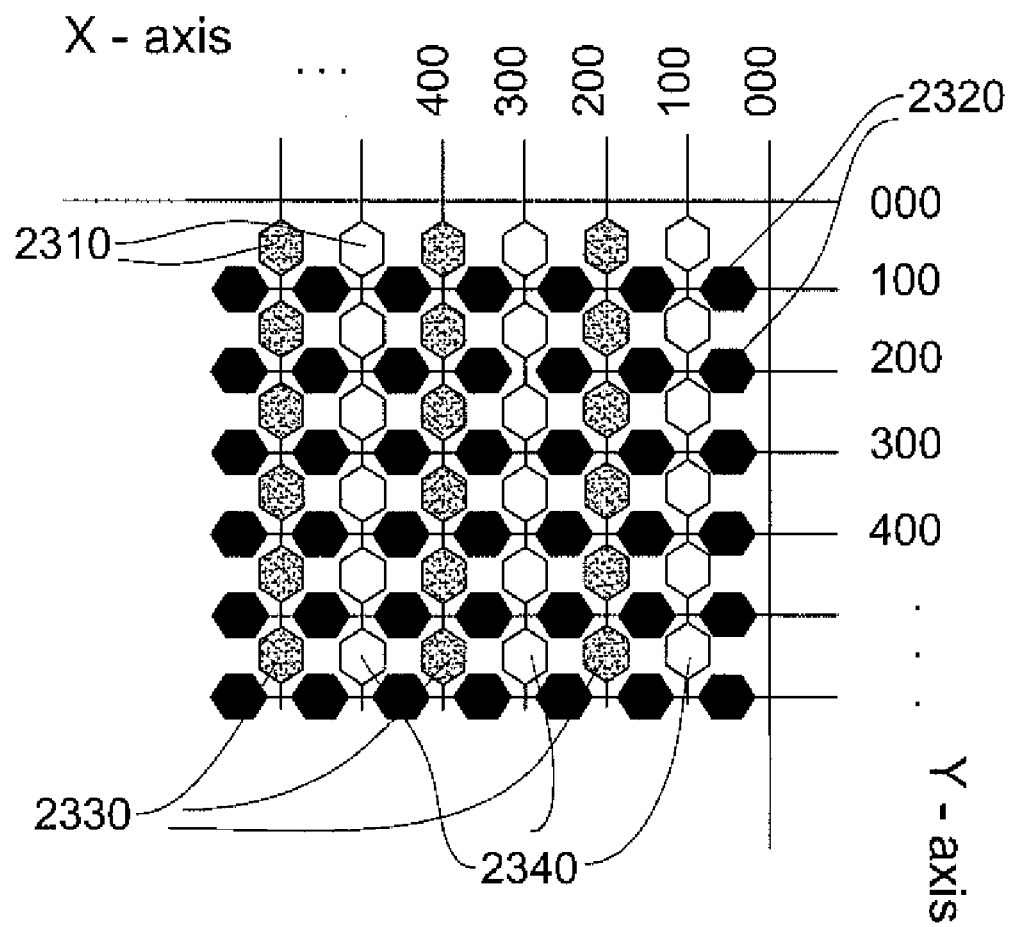
FIG. 23 is an illustration of a layout of sensors, according to an embodiment of the present invention.

Refer to FIG. 23 which illustrates a layout of sensors according to an embodiment of the invention. As shown in FIG. 23, there are six rows of six X-sensors 2310 each and seven columns of six Y-sensors 2320 each. There are therefore less X-sensors than Y sensors. (In another embodiment, it may be assumed that FIG. 23 shows only a small part of the layout. In this embodiment it is also assumed that the pattern will continue so that in the total layout there will be less X-sensors than Y sensors).

In one embodiment, the axis with the least amount of sensors is selected (here the X-axis), and a power save mode charging and discharging is performed on the even number (or odd number) sensors on that axis (here the X axis). For the sake of example, it is assumed that in this embodiment the even X-sensors are charged and discharged in power-save mode while the charging and discharging of odd X-sensors and all Y sensors 2320 are disabled. Therefore referring to the sixth row of X-sensors in FIG. 23, in this embodiment even X sensors 2330 are charged and discharged, whereas charging and discharging for odd X sensors 2340 are disabled in the power save mode.

After any execution of stage 2208 where presence is detected (i.e. yes to stage 2208), the timer which keeps track of the amount of time since presence was last detected is stopped in stage 2220, if the timer had been previously started. Then, in stage 2224, position detection is performed, for example as described above with reference to any of stages 1710 to 1724. Additionally or alternatively an indication of detection and/or absence may be outputted as described above.

A normal mode is configured if necessary in stage 2226, assuming not already configured (for example as the default mode). For example, in one embodiment, a normal mode indication may be set in mode register 448. For example, in some embodiments, additionally or alternatively, a clock divider value for normal mode may be configured or take effect so that the frequency of gauging clock 846 is more in normal mode than in power save mode. In another embodiment, in normal mode, transformed clock frequency 849 equals the frequency of input clock 375. The value of the clock divider (if any) for normal mode may vary depending on the embodiment and is not limited herein. For example, in some embodiments, additionally or alternatively, a controller clock frequency for normal mode may be configured or take effect. The frequency of the controller clock for normal mode may vary depending on the limitation and is not limited herein. For example, in some embodiments, additionally or alternatively, charging and discharging may be enabled so that more sensors are charged and discharged in normal mode than in power save mode. In one of these embodiments, all n sensors are charged and discharged in normal mode. The difference (if any) in the number of sensors charged and discharged in normal and power save mode and the identity of sensors charged and discharged in normal mode are not limited herein. Stage 2226 may be performed for example by interaction module 1602. If normal mode has already been configured, stage 2226 may be omitted.

Method 2200 then iterates back to stage 2204, where stage 2204 is executed in this case in accordance with normal mode.

It should be noted that in one embodiment the result of stage 2212 and/or stage 2208 may be provided by presence detection module 1610 to interaction module 1602, for example if it is required to change between power save mode and normal mode.

FIG. 24 illustrates a capacitive detection method 2400 according to an embodiment of the present invention. The stages illustrated in method 2400 may be performed in a different order than shown in FIG. 24 and/or more than one stage may be performed simultaneously, in other embodiments. Method 2400 may be performed by controller 145, in one embodiment.

Stages 2401, 2402 and 2404 correspond to stages 1701, 1702 and 1704 respectively, therefore the reader is referred to the discussion above with reference to FIG. 17.

As mentioned above, prior to stage 1704 (corresponding with stage 2404), one or more operational parameters in clock module 340 may be configured. In the embodiments illustrated in FIG. 24, at least the default mode (normal or power save depending on the embodiment) is configured in stage 2403. For example in some embodiments, any of the following may be configured: the default mode being normal or power save mode may be configured via mode register 448, a clock divider value for the default mode may be configured via clock control register 450, a controller clock frequency may be configured, the charging and discharging of sensor(s) in the default mode may be enabled/disabled via setup/status register 454, and/or other operational parameters suitable for the default mode may be configured. Continuing with the example, in some embodiments one or more operational parameters associated with the default mode may instead be implemented (e.g. hardcoded/hardwired) so as to take effect under the default mode. As another example, in some embodiments, configurable values of operational parameters associated with power save mode and/or normal mode (whether or not the default mode) may be configured in stage 2403 (for example configurable clock divider value, if any, configurable controller clock frequency, and/or configurable collection of sensors having charging and discharging enabled in power save mode and/or normal mode). Continuing with the example, in some embodiments one or more operational parameters may instead be implemented (e.g. hardcoded/hardwired) so as to take effect under the associated mode. In some of these embodiments, any subsequent changes in the mode (see stages 2414 and 2426), for example via mode register 448, will cause the operational parameter values (which were implemented or in stage 2403 previously configured) that are associated with the current mode, to take effect. Stage 2403 may be performed for example by interaction module 1602.

Assume for the sake of example that the default mode is a normal mode. Further assume that in contrast with power save mode, in normal mode there is no clock divider value (i.e. transformed clock 849=input clock 375, see FIG. 8) and therefore no need to configure clock register 450. Also assume that when the mode in mode register 448 is configured to "normal mode" in stage 2403, the charging and discharging are enabled for all n sensors in capacitive sensing area 115 due to the configured "normal mode" in mode register 448, without necessarily requiring separate configuration of setup/status register 454 in stage 2403. This example should not be construed as limiting stage 2403.

In one embodiment, stage 1512 or 1412 (processing of gauging data) discussed above may comprise any of stages 2408 to 2426.

In stage 2408, controller module 135 determines whether presence of a finger or other object is detected. For example, in one embodiment stage 2408 may correspond to stage 1708 described above.

If presence is not detected, then optionally in stage 2409 calibration values may be recalibrated as discussed above with reference to method 1700. In another embodiment, stage 2409 may be omitted. Method 2400 then iterates back to stage 2404.

If presence is detected in stage 2408 (i.e. yes to 2408), then in stage 2420, position detection is performed, for example as described above with reference to any of stages 1710 to 1724. Additionally or alternatively an indication of detection and/or absence may be outputted as described above.

In stage 2422 it is determined if the detected position is "close" to the previously detected position in an earlier iteration of stage 2422. For example, stage 2422 may be performed by position detection module 1620 or offset calculation module 1630. For example, the unfiltered and/or filtered position of this iteration and the previous iteration may be compared to see if the positions are close. Continuing with the example, the length vector between the previous (filtered or unfiltered) position and the current (filtered or unfiltered) position may be compared to a predetermined length ceiling. In this example, if the length of the vector is less than in one embodiment (or in another embodiment less than or equal to) the length ceiling then the detected position is close to the previously detected position. Depending on the embodiment, the predetermined length ceiling may vary and therefore the invention does not limit the value of the length ceiling. In one embodiment, the length ceiling is configurable, and therefore may be adjusted for optimal performance.

In another embodiment, in stage 2422 it is determined if the detected finger or other object is moving "slowly". In this embodiment, a determination may be made of the change in position (for example change in filtered and/or unfiltered position from previous iteration) divided by the time elapsed during the change in position. Depending on the embodiment, the rate which is considered to be "slow" may vary and therefore the invention does not limit the definition of "slowly".

If the detected position is close to the previously detected position (or the rate of movement is slow), then stage 2424 is performed. In stage 2424, power save mode is configured if not already configured (for example as the default mode). For example, in one embodiment, a power save mode indication may be set in mode register 448. For example, in some embodiments, additionally or alternatively, a clock divider value for power save mode may be configured or take effect so that the frequency of gauging clock 846 (affecting for example the frequency of counter clock 542 and/or the frequency of charge/discharge control 560) is less in power save mode than in normal mode. The value of a clock divider (if any) for power save mode may vary depending on the embodiment and is not limited herein. For example in some embodiments, additionally or alternatively a controller clock frequency may be configured or take effect with a reduced frequency than in normal mode. The frequency of the controller clock may vary depending on the embodiment and is not limited herein. For example, in some embodiments, additionally or alternatively, selected sensors may have charging and discharging enabled/disabled so that less sensors are charged and discharged in power save mode than in normal mode. Continuing with the example, in one of these embodiments, in stage 2424 certain sensor(s) which are enabled in normal mode have charging and discharging disabled in power save mode. Still continuing with the example, in one of these embodiments only sensors in a particular area surrounding, say, the sensor corresponding to the maximum point (see stage 1712 of FIG. 17) have charging and discharging enabled. The dimensions of such an area are not limited by the invention and may in some cases be configurable and therefore adjustable to obtain optimal performance. The difference in the number of sensors charged and discharged in normal and power save modes (if any) and the identity of sensors charged and discharged in power save mode are also not limited by the invention. In one embodiment, the number of sensors charged and discharged in power save mode, which sensors are charged and discharged during power save mode, the controller clock frequency in power save mode and/or a clock divider value in power save mode are determined based on a tradeoff between power savings and accuracy in detection of presence and/or position of an object near capacitive sensing area 115. Stage 2424 may be performed for example by interaction module 1602.

In one embodiment, the power save mode may comprise less sensors with enabled charging and discharging compared to normal mode. In another embodiment, power save mode may comprise a lower gauging clock frequency than in normal mode. In another embodiment, the power save mode may comprise a lower controller clock frequency. In another embodiment, the power save mode may comprise a lower (or the same) number of sensors with enabled charging and discharging compared to normal mode, a lower (or the same) gauging clock compared to normal mode, and/or a lower (or the same) controller clock frequency compared to normal mode. In another embodiment, other operational parameters may differ between power save mode and normal mode in addition to or instead of gauging clock frequency, controller clock frequency and/or the number of sensors with enabled charging and discharging.

In some embodiments, the power save mode may differ for different executions of stage 2424. For example, in some of these embodiments, there may be a plurality of appropriate power modes, in which charging and discharging for different collections of sensors are enabled, in which different controller clock frequencies are applied, and/or in which different gauging clock frequencies are applied, and therefore each time stage 2424 is executed, not necessarily the same power mode is configured.

Assume embodiments where power save mode of stage 2424 includes a reduced gauging clock frequency. In one embodiment, the mode may be configured as power save mode by setting a power save mode indication in mode register 448 in stage 2424. For example, in one embodiment, during stage 2424, the gauging clock frequency (period) is configured, for example by configuring a clock divider for power save mode so that the input clock is divided by the clock divider value. As another example, in one embodiment, a clock divider for power save mode may have been previously defined for example in stage 2403 and once power save mode is configured in stage 2424, the clock divider for power save mode is used so that the input clock is divided by the clock divider value and possibly summed with jitter.

If the mode is already power save mode then stage 2424 may be omitted.

Method 2400 then iterates to stage 2404 performing a charging and discharging which in this case will correspond to power save mode. For example, assume that in one embodiment, the clock divider value is Z for power save mode and that there is no clock divider value for normal mode (i.e. transformed clock 849=input clock 375). Ignoring any differences in sensors whose charging and discharging are enabled in normal mode and not in power save mode and/or any difference in controller clock frequency, in some cases power consumption in power save mode may equal 1/Z of the power consumption in normal mode. This level of power saving should not be construed as limiting.

If the detected position is not close, then in stage 2426, normal mode is configured, if not already configured (for example as the default mode). For example, in one embodiment, a normal mode indication may be set in mode register 448. For example, in some embodiments, additionally or alternatively, a clock divider value for normal mode may be configured or take effect so that the frequency of gauging clock 846 is more in normal mode than in power save mode, although the value of the clock divider for normal mode is not limited herein. In another embodiment, in normal mode, transformed clock frequency 849 equals the frequency of input clock 375. The value of the clock divider (if any) for normal mode may vary depending on the embodiment and is not limited herein. For example, in some embodiments, additionally or alternatively, a controller clock frequency for normal mode may be configured or take effect. The frequency of the controller clock for normal mode may vary depending on the limitation and is not limited herein. For example, in some embodiments, additionally or alternatively, charging and discharging may be enabled so that more sensors are charged and discharged in normal mode than in power save mode. In one of these embodiments, all sensors are charged and discharged in normal mode. The difference (if any) in the number of sensors charged and discharged in normal mode and power save mode and the identity of sensors charged and discharged in normal mode are not limited herein. Stage 2426 may be performed for example by interaction module 1602. If normal mode has already been configured, stage 2426 may be omitted.

Method 2400 then iterates back to stage 2404, where stage 2404 is executed in this case accordance with normal mode.

It should be noted that in one embodiment the result of stage 2422 may be provided by position detection module 1620 or offset calculation module 1630 to interaction module 1602, for example if it is required to change between power save mode and normal mode.

In some embodiments, there may be the possibility of two types of power save mode, one triggered when it has been a long time that presence was not detected as in the embodiment of FIG. 22, and one triggered when the detected position is close to the previously detected position (or the rate of movement is slow) as in the embodiment of FIG. 24. Similarly, there may be the possibility of two types of normal mode, one triggered when it has not been a long time that presence was not detected as in the embodiment of FIG. 22, and one triggered when the detected position is not close to the previously detected position (or the rate of movement is not slow) as in the embodiment of FIG. 24. For example, in one of these embodiments, referring to FIG. 22, method 2200 may be modified as follows to include both a power save mode as described with reference to FIG. 22 and a power save mode as described with reference to FIG. 24. In modified 2200, after stage 2224, instead of continuing to stage 2226, stage 2422 may be executed. If the answer to stage 2422 is yes (i.e. position close to previously detected position or the rate of movement is slow), stage 2424 is performed (i.e. power save mode is configured, if necessary, as described in the embodiment of FIG. 24). If the answer to stage 2422 is no (i.e. position not close to previously detected position or the rate of movement is not slow), then stage 2426 is performed (i.e. normal mode is configured, if necessary as described in the embodiment of FIG. 24). Modified method 2200 continues to stage 2226 (i.e. normal mode is configured, if necessary, as described in the embodiment of FIG. 22) before iterating back to stage 2204.

Assume for the sake of example, that in one embodiment the difference between normal mode and power save mode, which results depending on whether or not it has been a long time since presence was detected (as in the embodiment of FIG. 22), is represented in the number of sensors with enabled charging and discharging (i.e. reduced number of sensors with charging and discharging enabled in power save mode). Further assume in this example, that in this embodiment the difference between normal mode and power save mode, which results depending on whether or not the detected position is close to the previously detected position or whether or not the rate of movement is slow (as in the embodiment of FIG. 24) is represented in the gauging clock frequency and/or controller clock frequency (i.e. reduced frequency in power save mode). Therefore in this embodiment, there may be the following combinations of values for clock frequency (gauging clock and/or controller clock) and sensors with enabled charging and discharging inter-alia: reduced clock frequency/reduced number of sensors with charging and discharging enabled, reduced clock frequency/normal number of sensors with charging and discharging enabled, normal clock frequency/reduced number of sensors with charging and discharging enabled, and normal clock frequency/normal number of sensors with charging and discharging enabled. In some cases, each of these combinations may be further subdivided based on the number/selection of sensors with enabled charging and discharging, and/or the clock frequency (i.e. there may be a plurality of possible gauging clock frequencies, controller clock frequencies and/or collections of sensors with enabled charging and discharging corresponding to different normal and/or power save modes).

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

While the invention has been shown and described with respect to particular embodiments, it is not thus limited. Numerous modifications, changes and improvements within the scope of the invention will now occur to the reader.

We claim:

1. A capacitive detection method, comprising:
determining whether a predetermined amount of time has elapsed since detection of presence of an object near a capacitive sensing area including at least one capacitive sensor; and
if said predetermined amount of time is determined to have elapsed, causing a subsequent attempt for detecting whether an object is near said capacitive sensor area to consume less power, than if said predetermined amount of time had been determined to not have elapsed.

2. The method of claim 1, wherein said causing includes:
causing less capacitive sensors in said capacitive sensing area to be charged and discharged during said subsequent attempt than if said predetermined amount of time had been determined to not have elapsed.

3. The method of claim 2, wherein said capacitive sensing area includes two arrays of capacitive sensors arranged in two dimensions, and wherein said capacitive sensors charged and discharged in said subsequent attempt are all from one of said arrays.

4. The method of claim 3, wherein said sensors charged and discharged in said subsequent attempt include all sensors in one of said arrays.

5. The method of claim 3, wherein said sensors charged and discharged in said subsequent attempt include less than all sensors in one of said arrays.

6. The method of claim 2, wherein said capacitive sensing area includes two arrays of capacitive sensors arranged in two dimensions, further comprising: if said predetermined amount of time is determined to not have elapsed, then said capacitive sensors charged and discharged in said subsequent attempt include sensors from each of said arrays.

7. The method of claim 6, wherein if said predetermined amount of time is determined to not have elapsed, then said capacitive sensors charged and discharged in said subsequent attempt include all sensors in said capacitive sensing area.

8. The method of claim 1, further comprising:
if said predetermined amount of time is determined to not have elapsed, causing a subsequent attempt for detecting whether an object is near said capacitive sensor area to consume more power, than if said predetermined amount of time had been determined to have elapsed.

9. The method of claim 1, wherein said causing includes:
causing said subsequent attempt to occur at a later time than if said predetermined amount of time had been determined to not have elapsed.

10. The method of claim 9, wherein said causing includes:
causing charging and discharging of at least one capacitive sensor in said capacitive sensing area, in said subsequent attempt, to occur at a later time than if said predetermined amount of time had been determined to not have elapsed.

11. The method of claim 9, wherein said causing includes:
in said subsequent attempt, receiving or processing data at a later time than if said predetermined amount of time had been determined to not have elapsed, wherein said data is processed in order to detect presence of said object.

12. The method of claim 1, wherein said causing includes: causing data corresponding to at least one capacitive sensor in said capacitive sensing area, which is processed in said subsequent attempt in order to detect presence of said object, to be of a lower value than if said predetermined amount of time had been determined to not have elapsed.

13. The method of claim 1, further comprising:
receiving data corresponding to a plurality of capacitive sensors; and
using said received data to detect whether said object is present by checking whether said received data or a function thereof has a predetermined relationship with at least one predetermined level;
wherein said causing includes:
if presence has not been detected for said predetermined amount of time, causing received data in said subsequent attempt to correspond to less than all of said plurality of sensors.

14. The method of claim 1, further comprising:
receiving data corresponding to less than all capacitive sensors in said capacitive sensing area; and
using said received data to detect whether said object is present by checking whether said received data or a function thereof has a predetermined relationship with at least one predetermined level;
wherein said causing includes:
if presence has not been detected for said predetermined amount of time, causing received data in said subsequent attempt to correspond to said less than all capacitive sensors.

15. A capacitive detection method, comprising:
charging and discharging at least one time a first plurality of capacitive sensors in a capacitive sensing area whose charging and discharging are enabled;
generating data relating to capacitances of said first plurality of charged and discharged sensors; and
subsequently, charging and discharging at least one more time a second plurality of capacitive sensors in said capacitive sensing area whose charging and discharging remain enabled after an analysis of said generated data or a function thereof, said first and second pluralities including different numbers of sensors.

16. The method of claim 15, wherein said charging and discharging at least one more time is performed at a different frequency than said charging and discharging at least one time.

17. The method of claim 16, further comprising: generating data relating to capacitances of said second plurality of sensors, wherein data for a sensor included in both pluralities is generated at a different frequency during said charging and discharging at least one more time, than data was generated for said sensor during said charging and discharging at least one time.

18. The method of claim 15, further comprising: generating data relating to capacitances of said second plurality of sensors, wherein a change in value of data, generated for a sensor included in both pluralities, from said charging and discharging at least one time to said charging and discharging at least one more time, is at least partly unrelated to any variance in sensor capacitance.

19. A capacitive detection method, comprising:
charging and discharging at least one time at least one capacitive sensor in a capacitive sensing area;
generating data relating to capacitances of said charged and discharged at least one sensor; and
subsequently, due to an analysis of said generated data or a function thereof, generating data for each at least one capacitive sensor in said capacitive sensing area, at a value whose change from said previous generating is at least partly unrelated to any variance in sensor capacitance, or at a different frequency than during said previous generating.

20. A controller module comprising:
an interaction module configured to receive data corresponding to at least one capacitive sensor in a capacitive sensing area; and
a presence detection module configured to determine whether a predetermined amount of time has elapsed since presence of an object near said capacitive sensing area was detected based on said received data or a function thereof;
said interaction module being configured, depending on whether or not said predetermined time has elapsed, to configure, if not already configured, a power saving mode or a normal mode.

21. The module of claim 20, wherein said power saving mode reduces a number of capacitive sensors in said capacitive sensing area for which data is subsequently received compared to said normal mode.

22. The module of claim 20, wherein for at least one sensor in said capacitive sensing area said power saving mode reduces value of data subsequently received compared to said normal mode.

23. The module of claim 20, wherein said power saving mode reduces a frequency of subsequent generation, receipt, or processing of data corresponding to at least one sensor in said capacitive sensing area, compared to said normal mode.

24. A capacitive detection module comprising:
at least one configuration register for configuring power saving mode or normal mode;
a charge/discharge module configured to charge and discharge at least one capacitive sensor in a capacitive sensing area whose charging and discharging are enabled; and
a counter module configured to measure, for each capacitive sensor whose charging and discharging are enabled, a time interval measurement relating to a capacitance of a corresponding capacitive sensor;
wherein power save mode differs from normal mode in at least one variable selected from a group comprising: number of capacitive sensors with enabled charging and discharging, frequency of counter clock provided to said counter module, and frequency of charging and discharging.

25. The module of claim 24, wherein said at least one configuration register includes an indication of which capacitive sensors in said capacitive sensing module have charging and discharging enabled or disabled.

26. The module of claim 24, wherein said at least one configuration register includes a clock divider used to divide a frequency of a clock in normal mode to derive a frequency of said clock in power saving mode, wherein said counter clock equals or is another function of said clock.

27. A capacitive detection computer program product comprising a computer useable medium having computer readable program code embodied therein, the computer program product comprising:

computer readable program code for causing the computer to determine whether a predetermined amount of time has elapsed since detection of presence of an object near a capacitive sensing area including at least one capacitive sensor; and computer readable program code for causing the computer, if said predetermined amount of time is determined to have elapsed, to cause a subsequent attempt for detecting whether an object is near said capacitive sensor area to consume less power, than if said predetermined amount of time had been determined to not have elapsed.

* * * * *